(12) United States Patent
Suda

(10) Patent No.: US 6,388,707 B1
(45) Date of Patent: *May 14, 2002

(54) IMAGE PICKUP APPARATUS HAVING MEANS FOR APPOINTING AN ARBITRARY POSITION ON THE DISPLAY FRAME AND PERFORMING A PREDETERMINED SIGNAL PROCESS THEREON

(75) Inventor: Hirofumi Suda, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/419,619

(22) Filed: Apr. 10, 1995

(30) Foreign Application Priority Data

Apr. 12, 1994 (JP) ............................................. 6-073643
Jun. 17, 1994 (JP) ............................................. 6-135693

(51) Int. Cl.⁷ ............................................... H04N 5/222
(52) U.S. Cl. ............................................... 348/333.03
(58) Field of Search ........................... 348/333, 78, 345, 348/346, 350, 333.03; 396/51, 104, 121, 122, 123, 124; 351/205, 206, 207, 208, 209, 210, 211, 212; 128/661.06, 676, 745

(56) References Cited

U.S. PATENT DOCUMENTS

| | | | | |
|---|---|---|---|---|
| 3,728,484 A | * | 4/1973 | Hawkey et al. ............. 375/340 |
| 5,001,507 A | * | 3/1991 | Iida et al. .................... 396/104 |
| 5,121,152 A | * | 6/1992 | Wagner ........................ 396/121 |
| 5,541,655 A | * | 7/1996 | Kaneda ......................... 348/333 |
| 5,546,158 A | * | 8/1996 | Konishi et al. ................ 396/51 |
| 5,561,289 A | * | 10/1996 | Yamada et al. ............. 250/221 |
| 5,594,500 A | * | 1/1997 | Tanaka et al. ............... 348/345 |
| 5,606,390 A | * | 2/1997 | Arai et al. .................... 396/51 |
| 5,748,992 A | * | 5/1998 | Tsukahara et al. ............ 396/51 |
| 5,765,045 A | * | 6/1998 | Takagi et al. .................. 396/51 |
| 5,857,120 A | * | 1/1999 | Konishi ........................ 396/51 |

FOREIGN PATENT DOCUMENTS

| JP | 5-64061 | 3/1993 | .......... H04N/5/232 |
|---|---|---|---|
| JP | 5-328197 | 12/1993 | .......... H04N/5/232 |

\* cited by examiner

Primary Examiner—Wendy R Garber
Assistant Examiner—Aung S. Moe
(74) Attorney, Agent, or Firm—Fitzpatrick, Cella, Harper & Scinto

(57) ABSTRACT

An image pickup apparatus having a first area-setting circuit for setting, at an arbitrary position in a frame, an area for performing a predetermined image signal process, a second area-setting circuit for fixing the area at a predetermined position in the frame, and a control circuit arranged in such a manner that if an area setting operation of the first area-setting circuit makes an error, then the second area-setting circuit is operated.

25 Claims, 63 Drawing Sheets

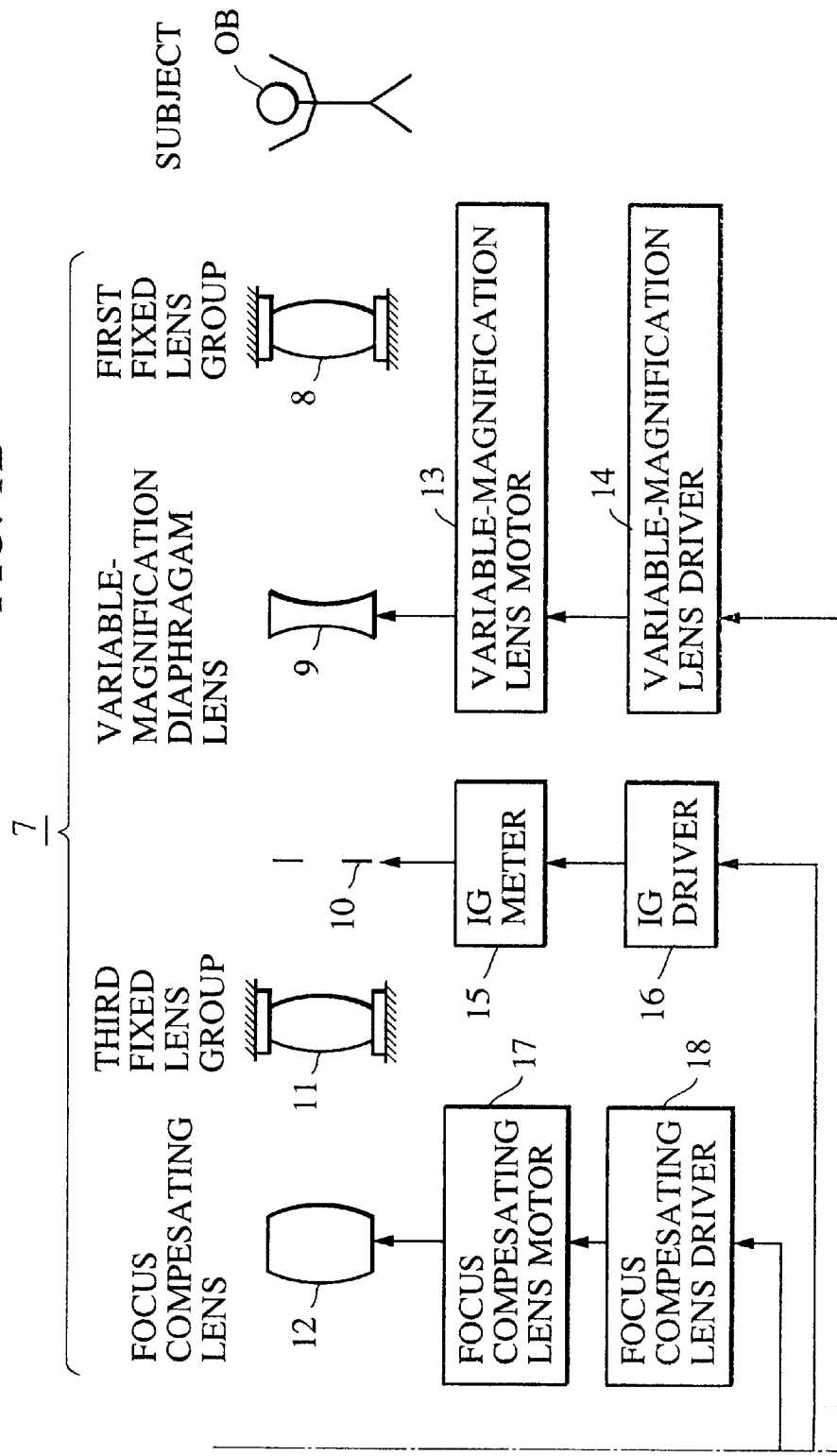

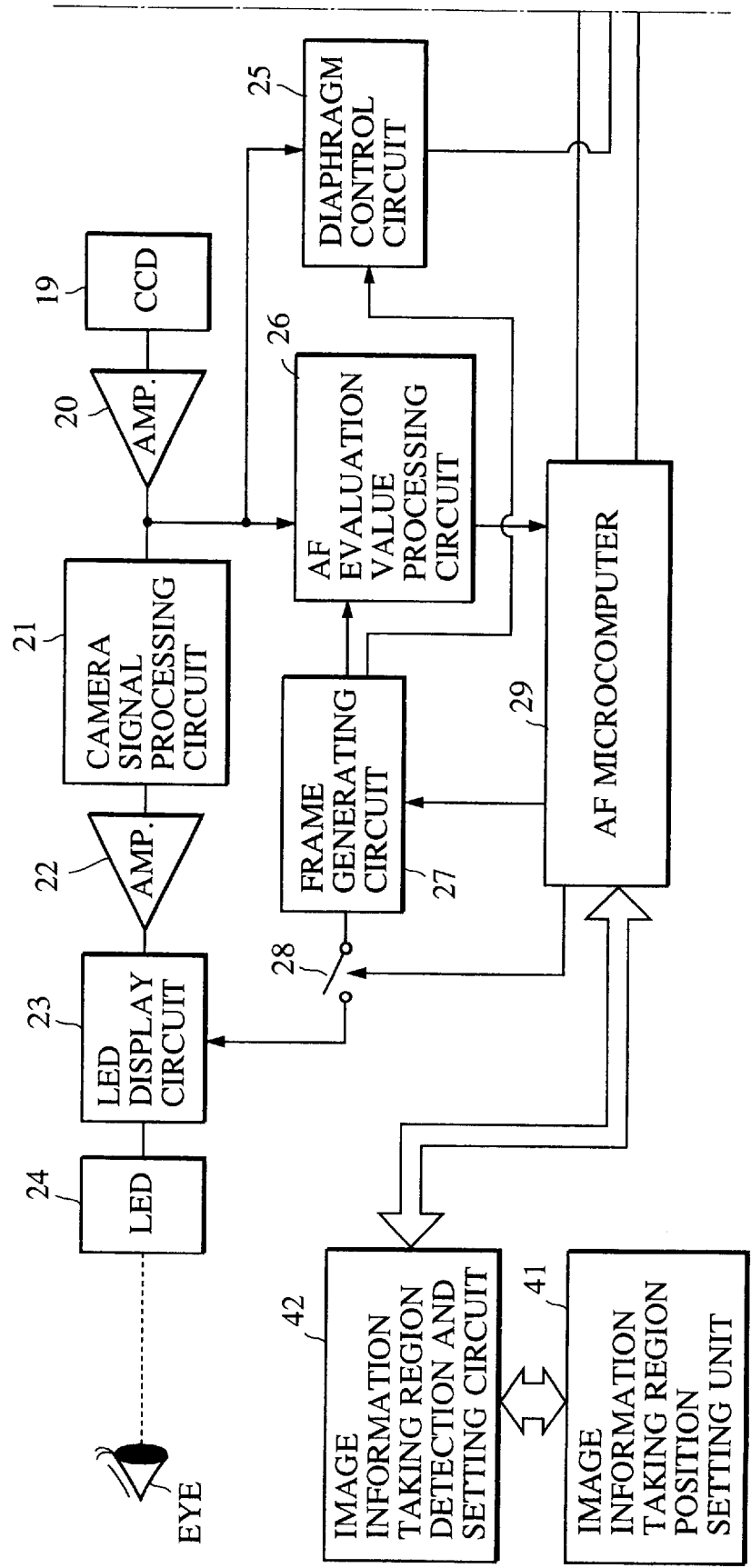

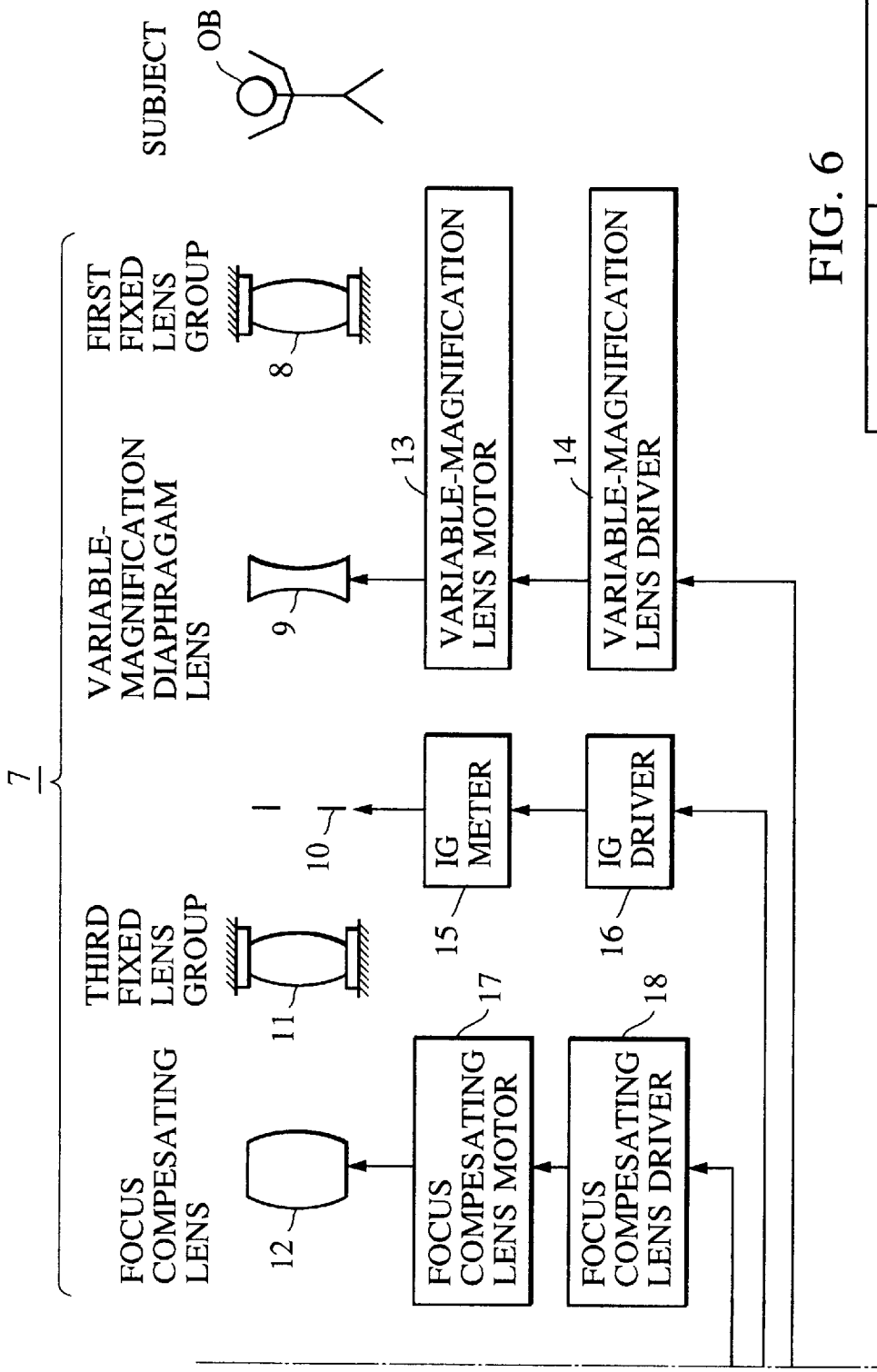

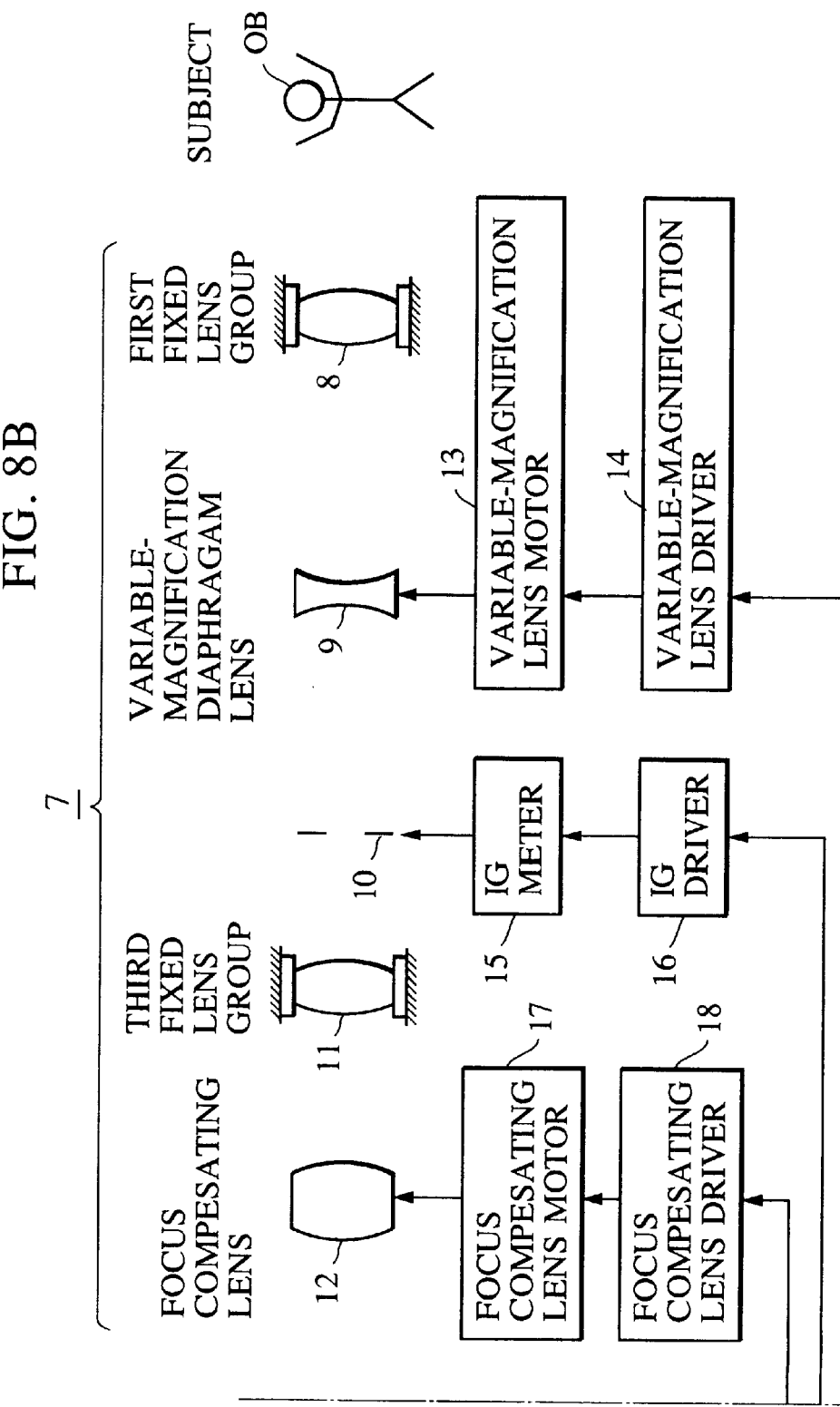

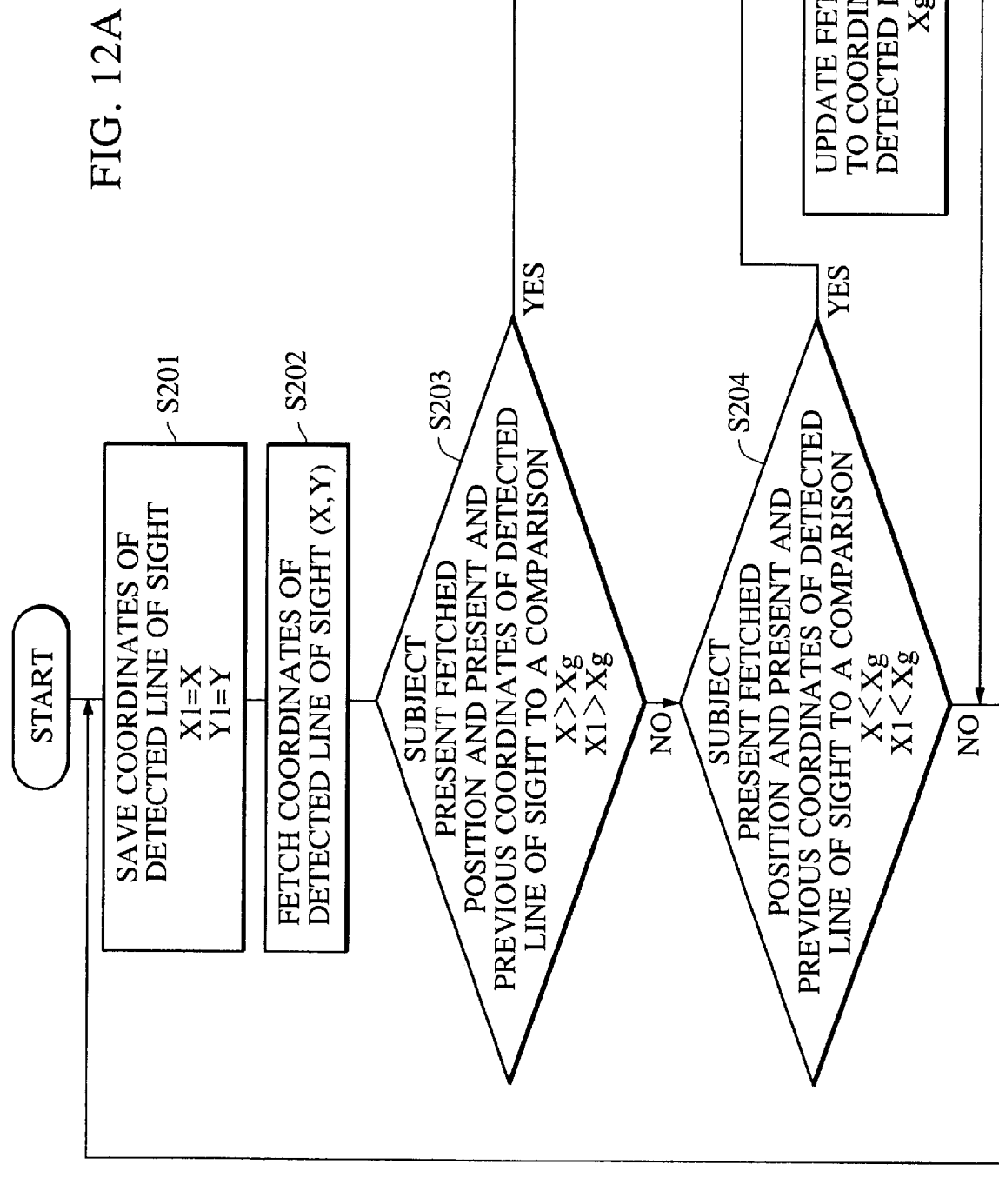

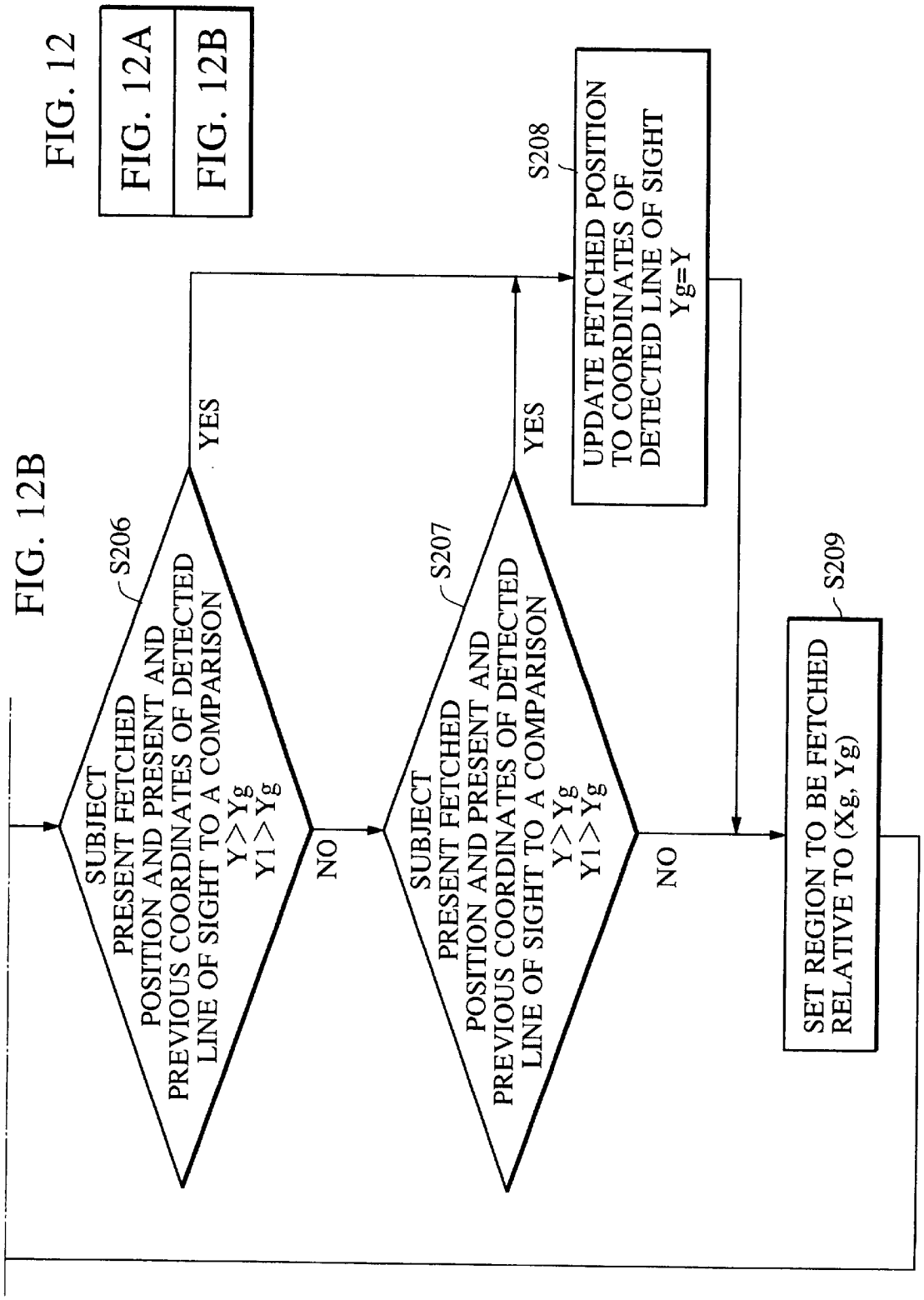

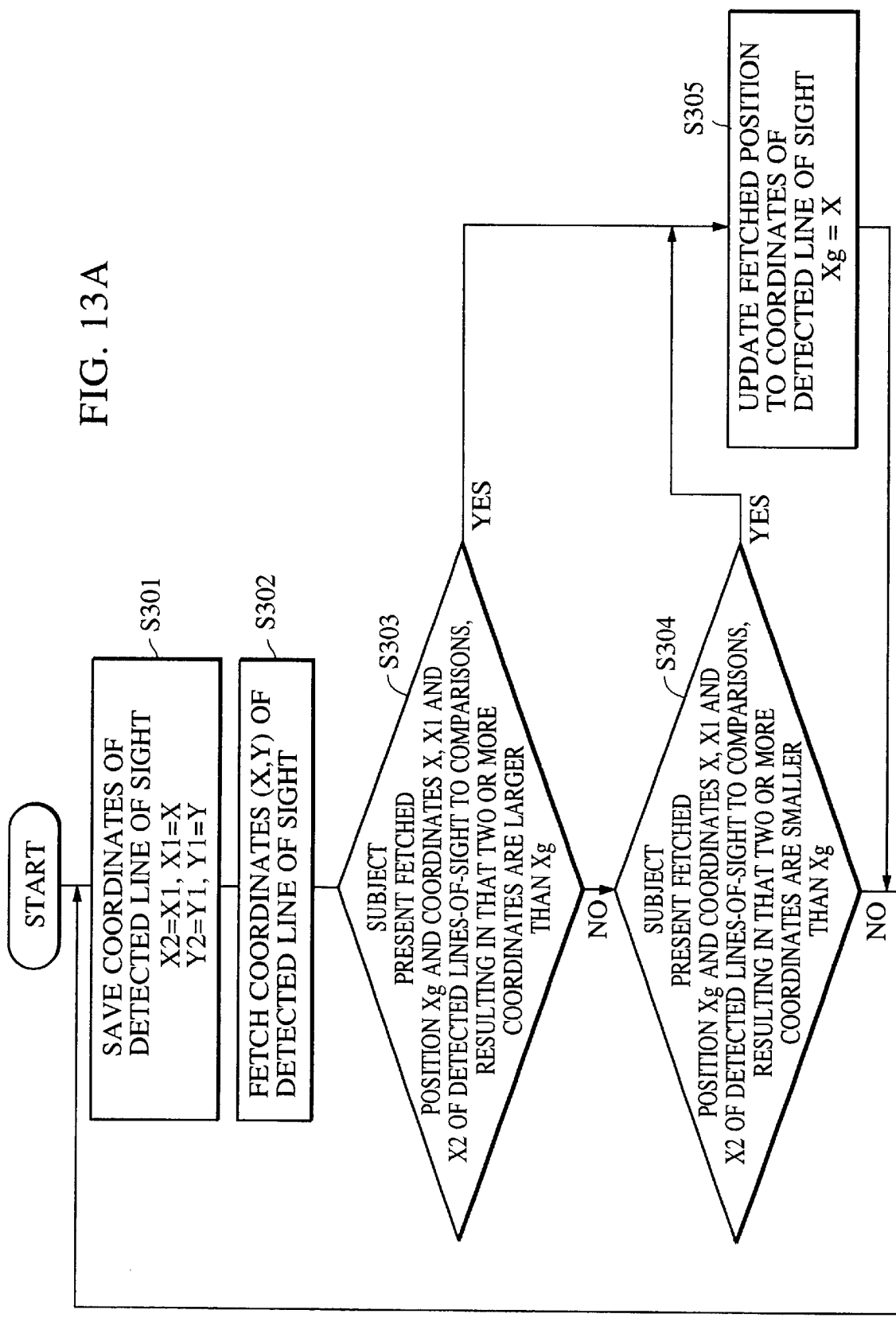

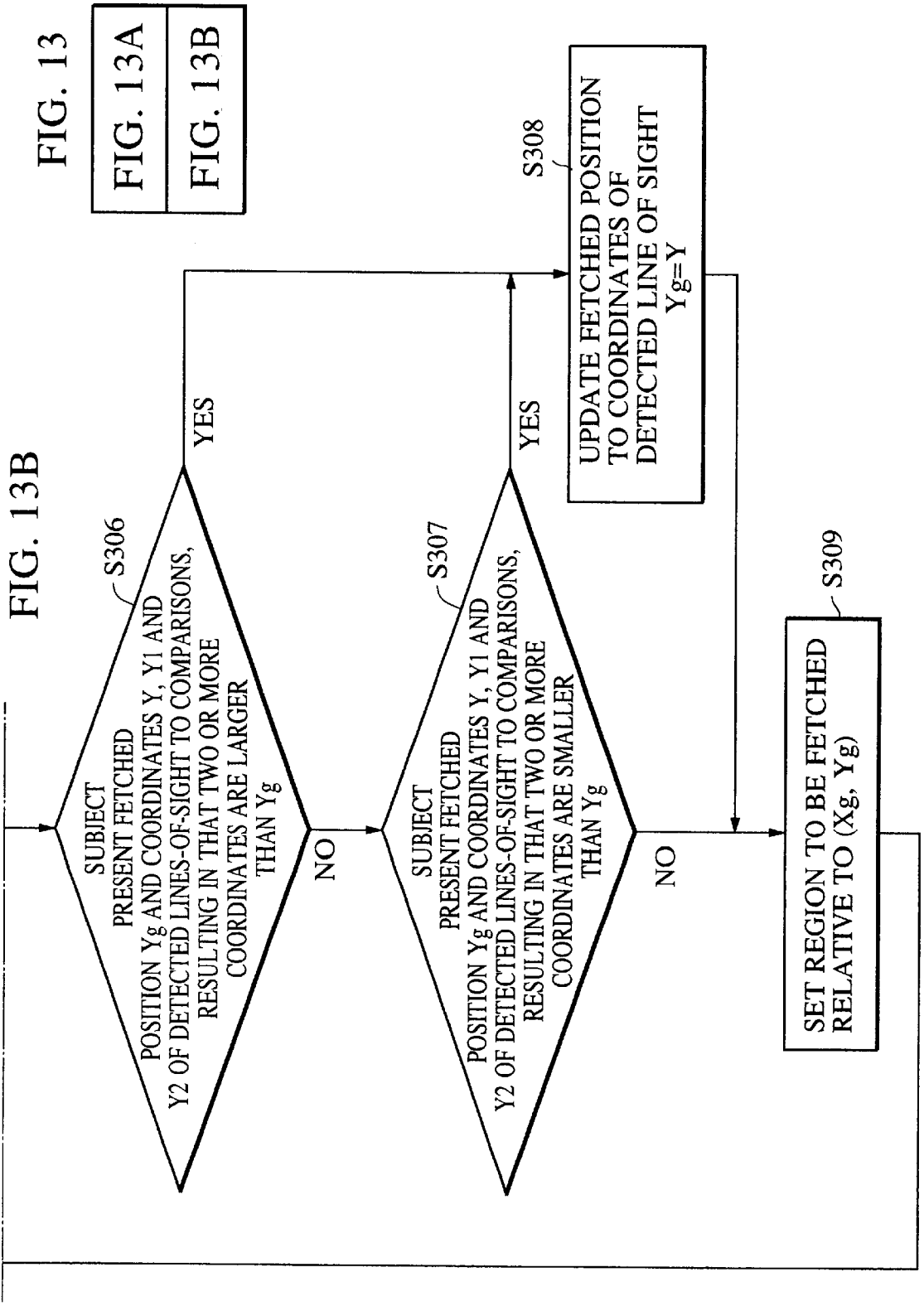

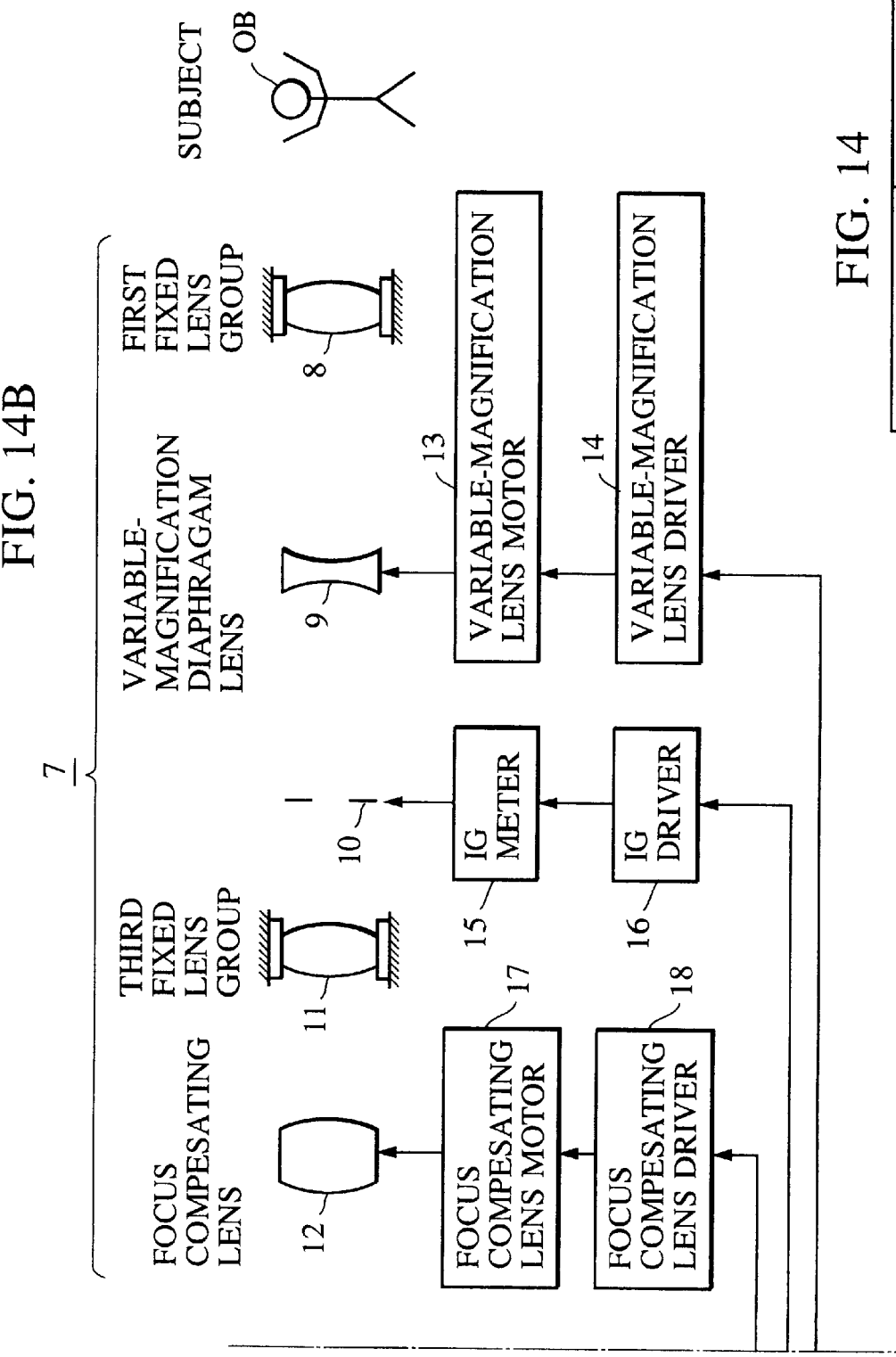

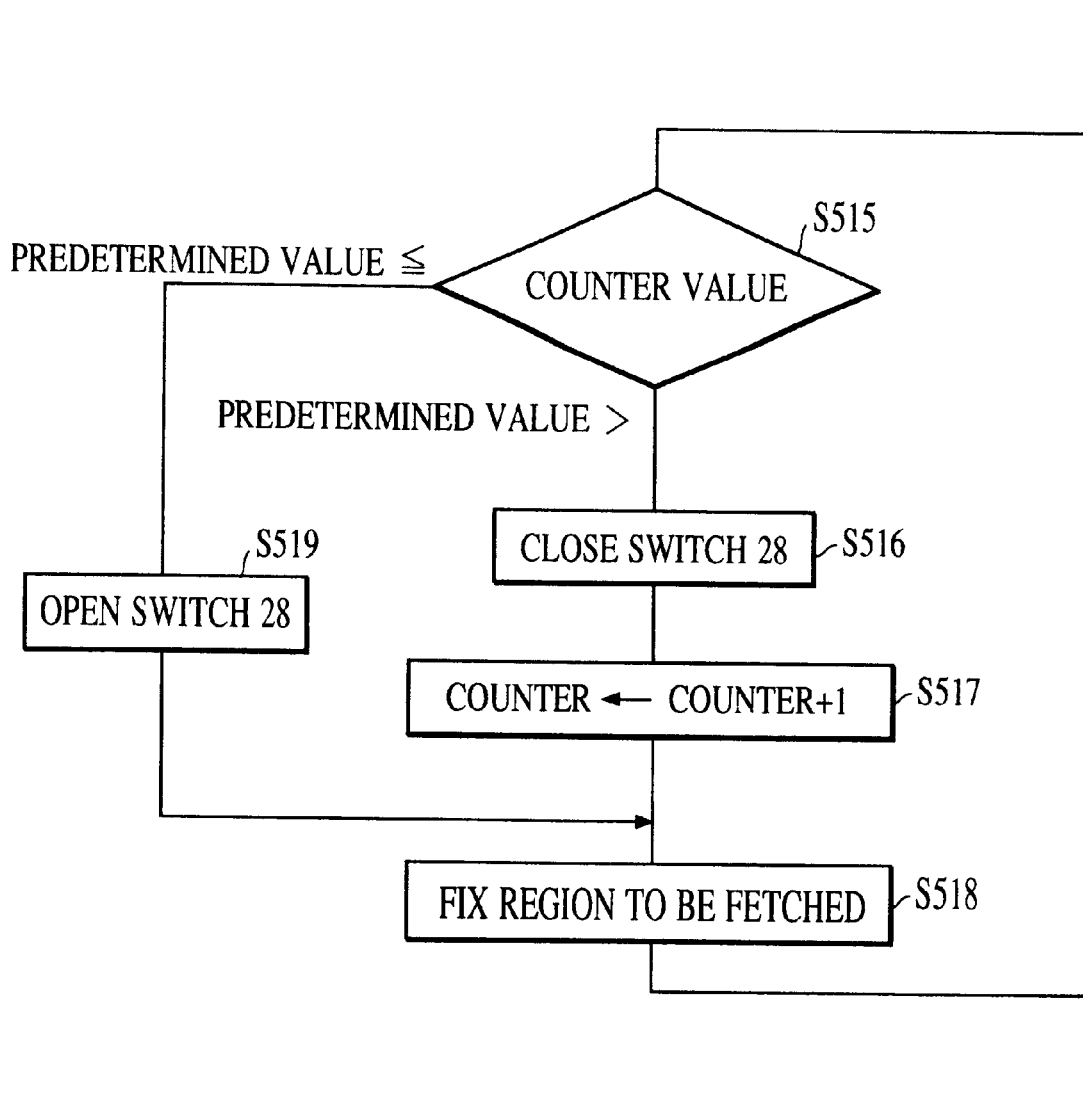

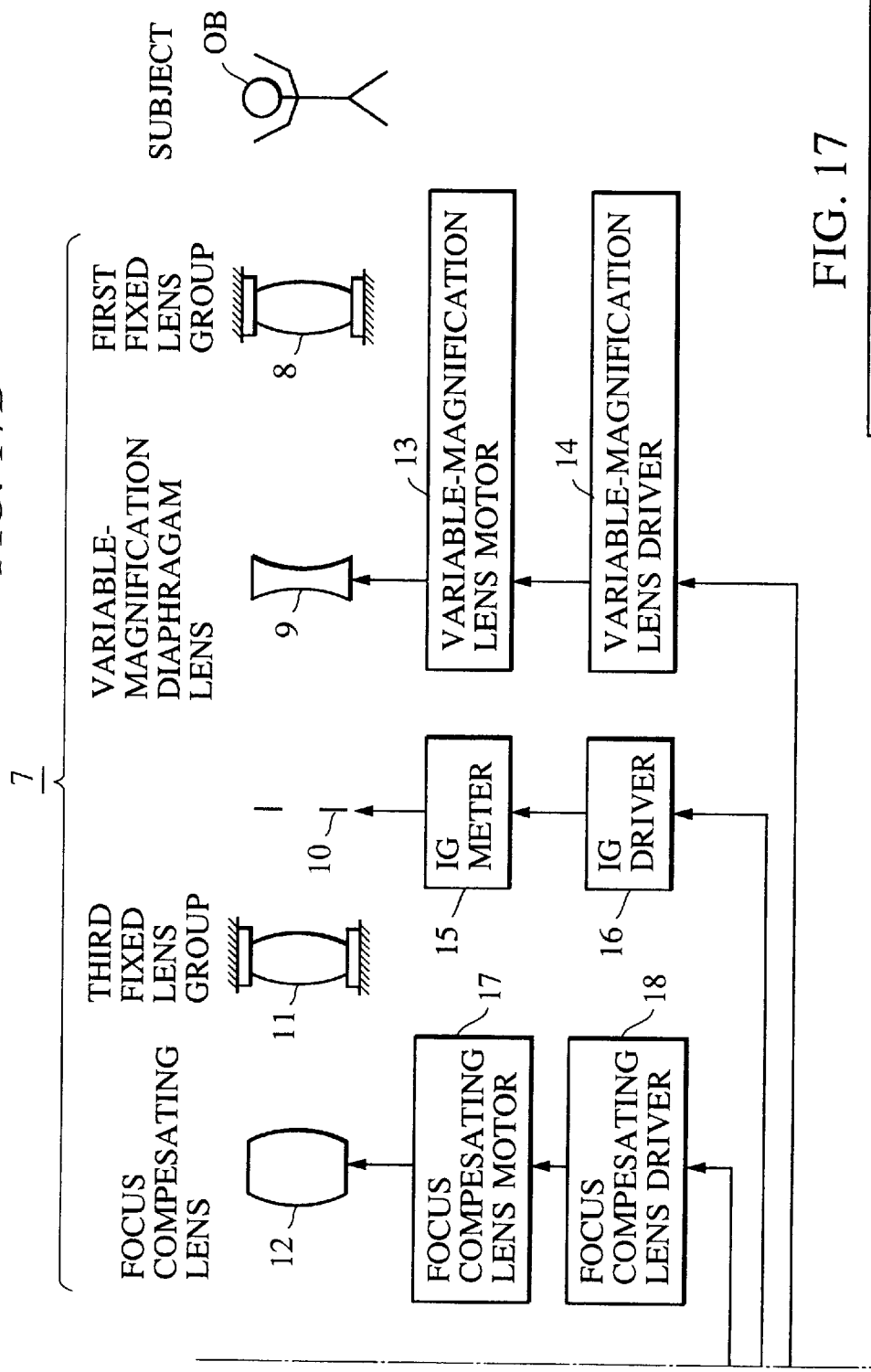

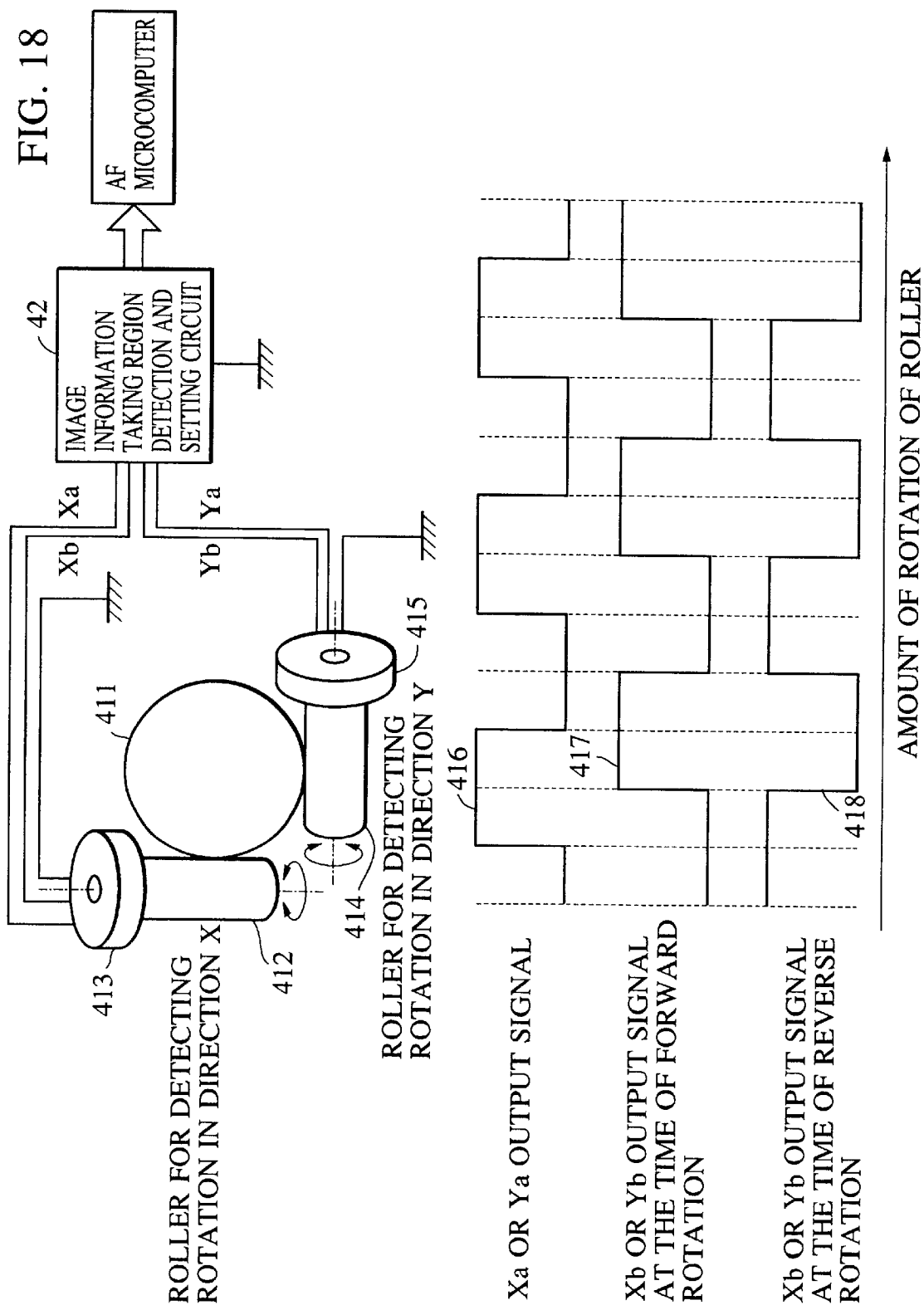

FIG. 20
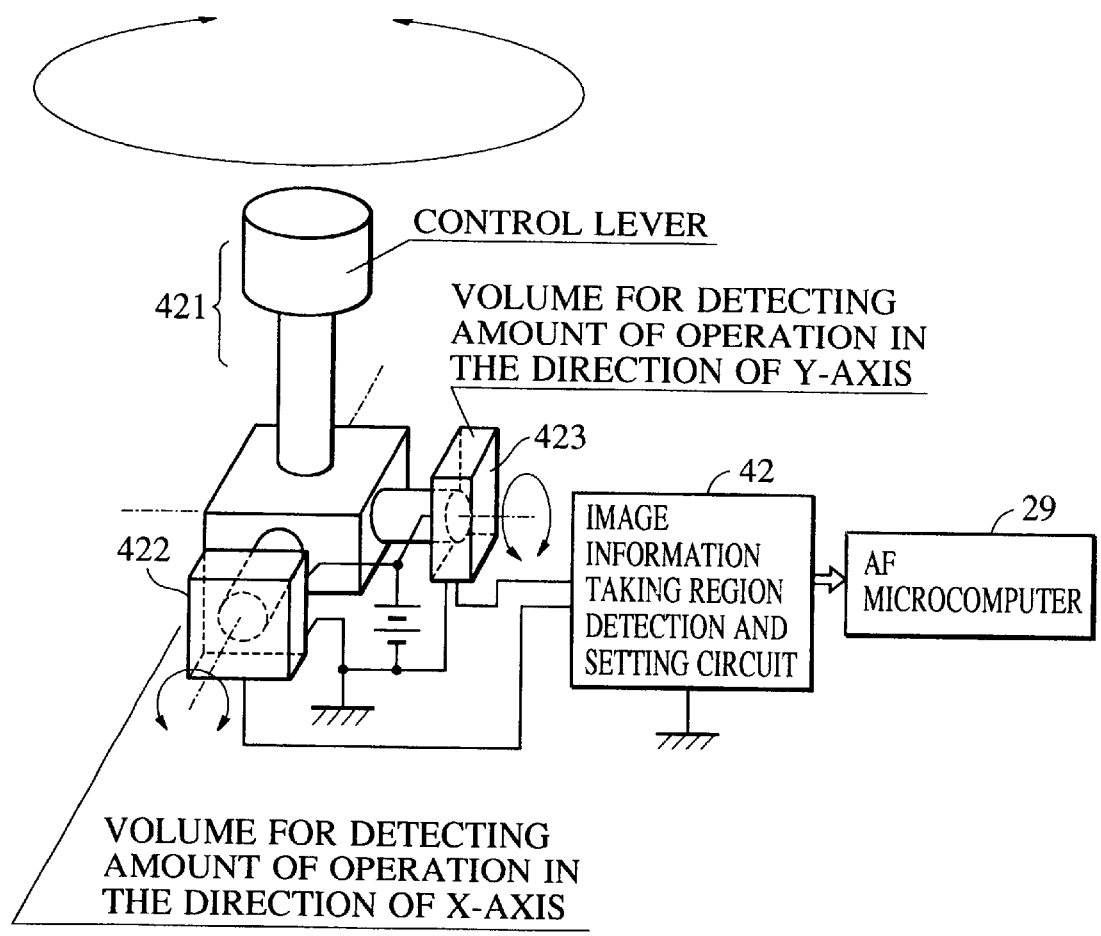
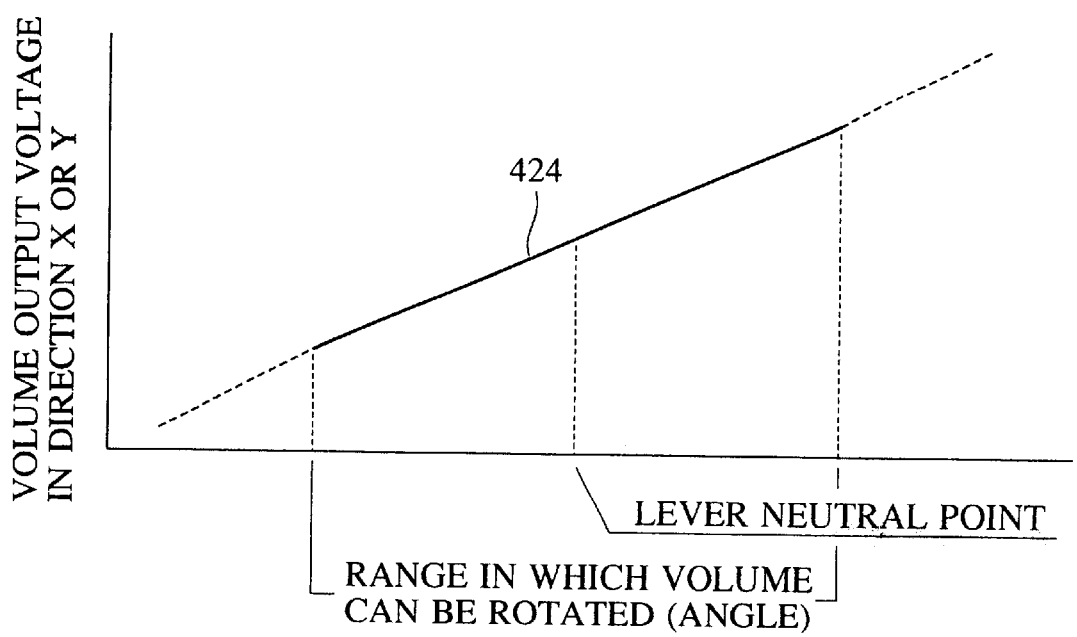

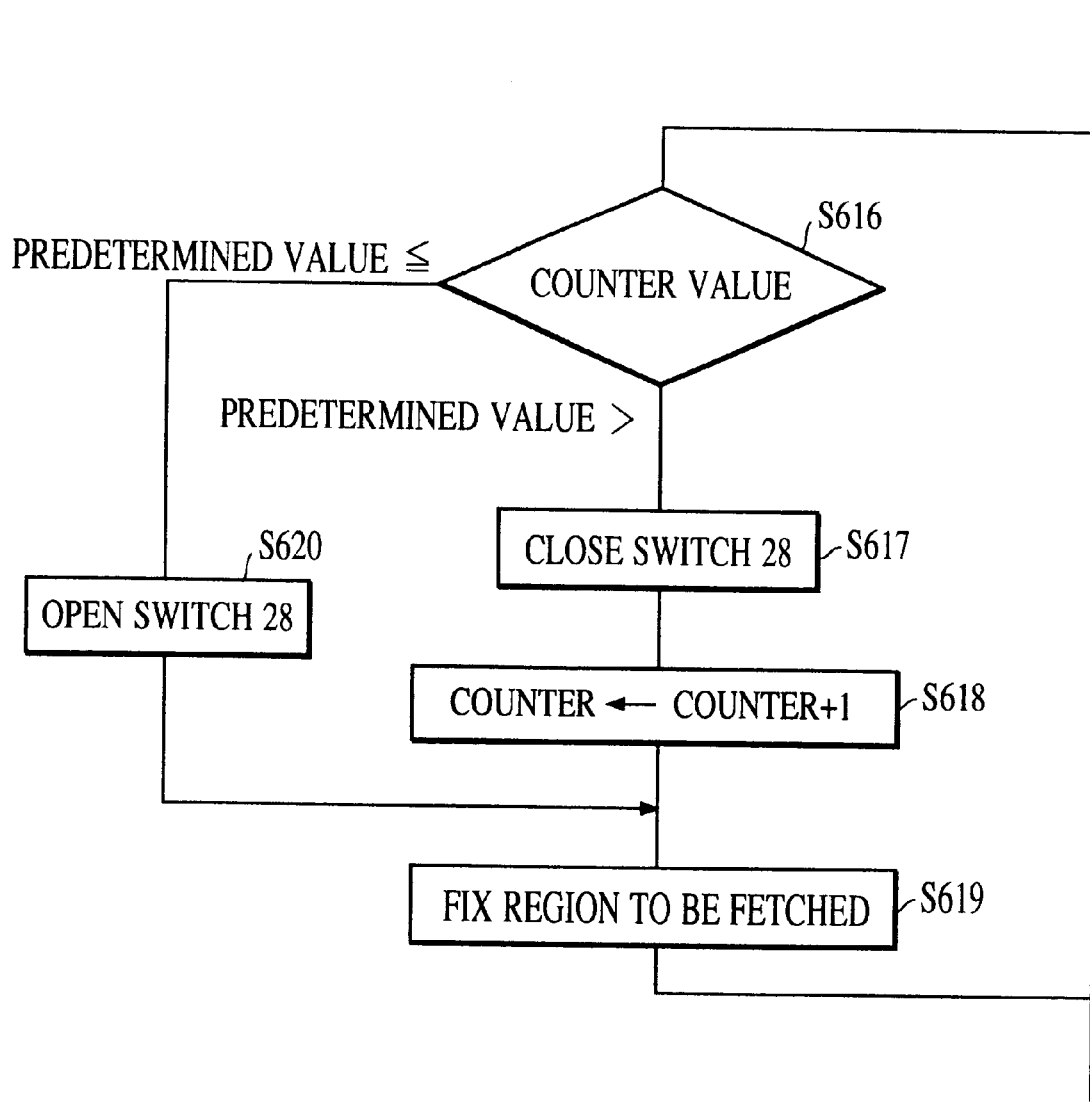

| FIG. 24B | FIG. 24A |

| FIG. 25B | FIG. 25A |

| FIG. 27B | FIG. 27A |

| FIG. 28B | FIG. 28A |

FIG. 29
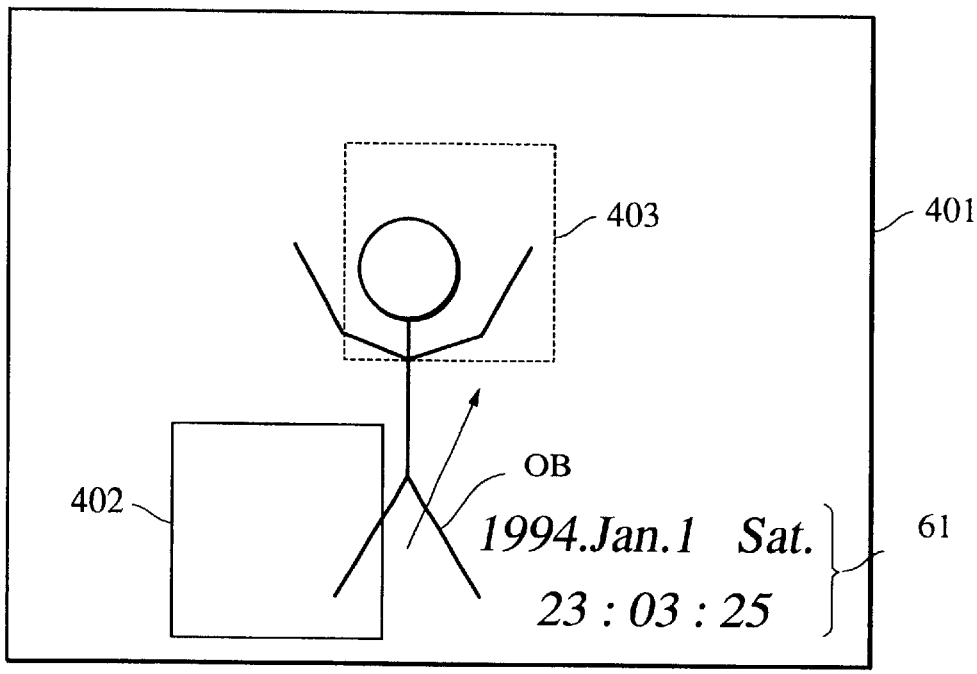
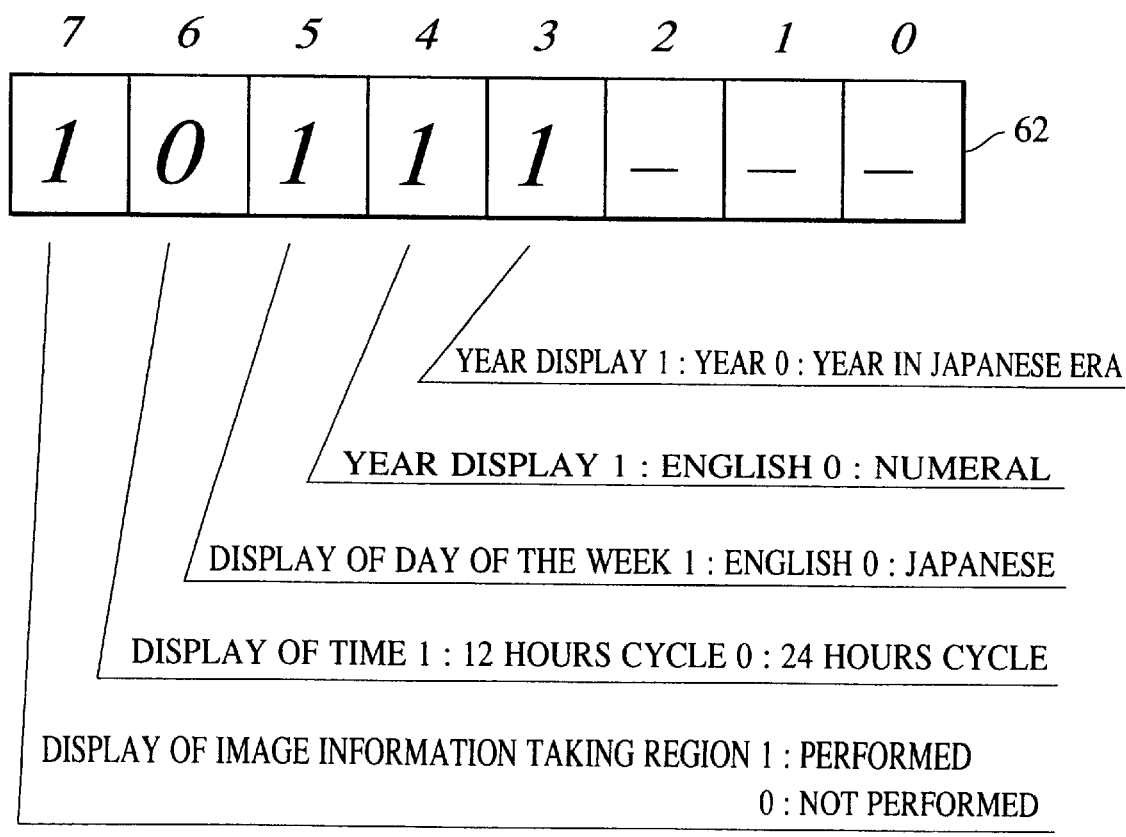

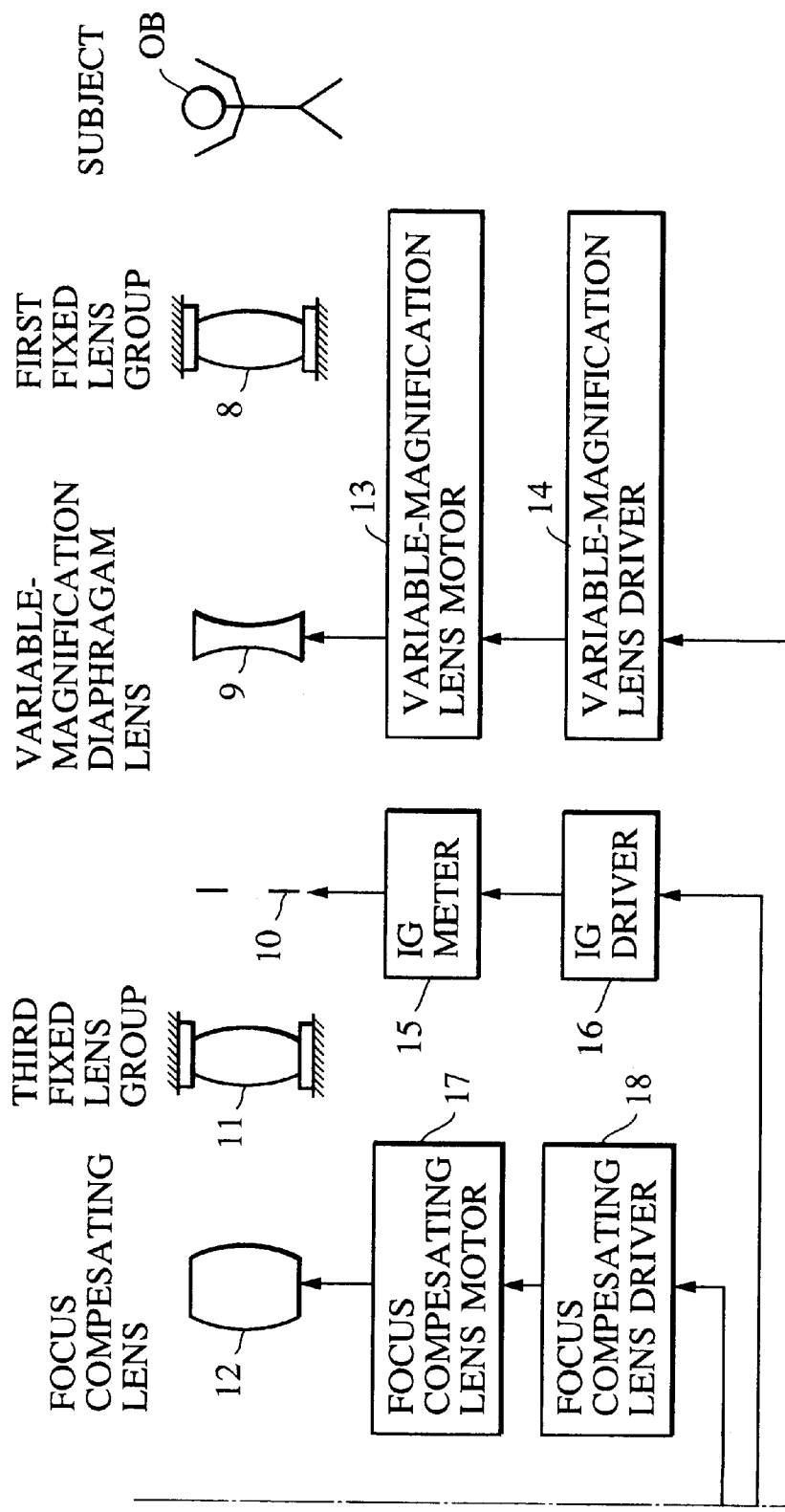

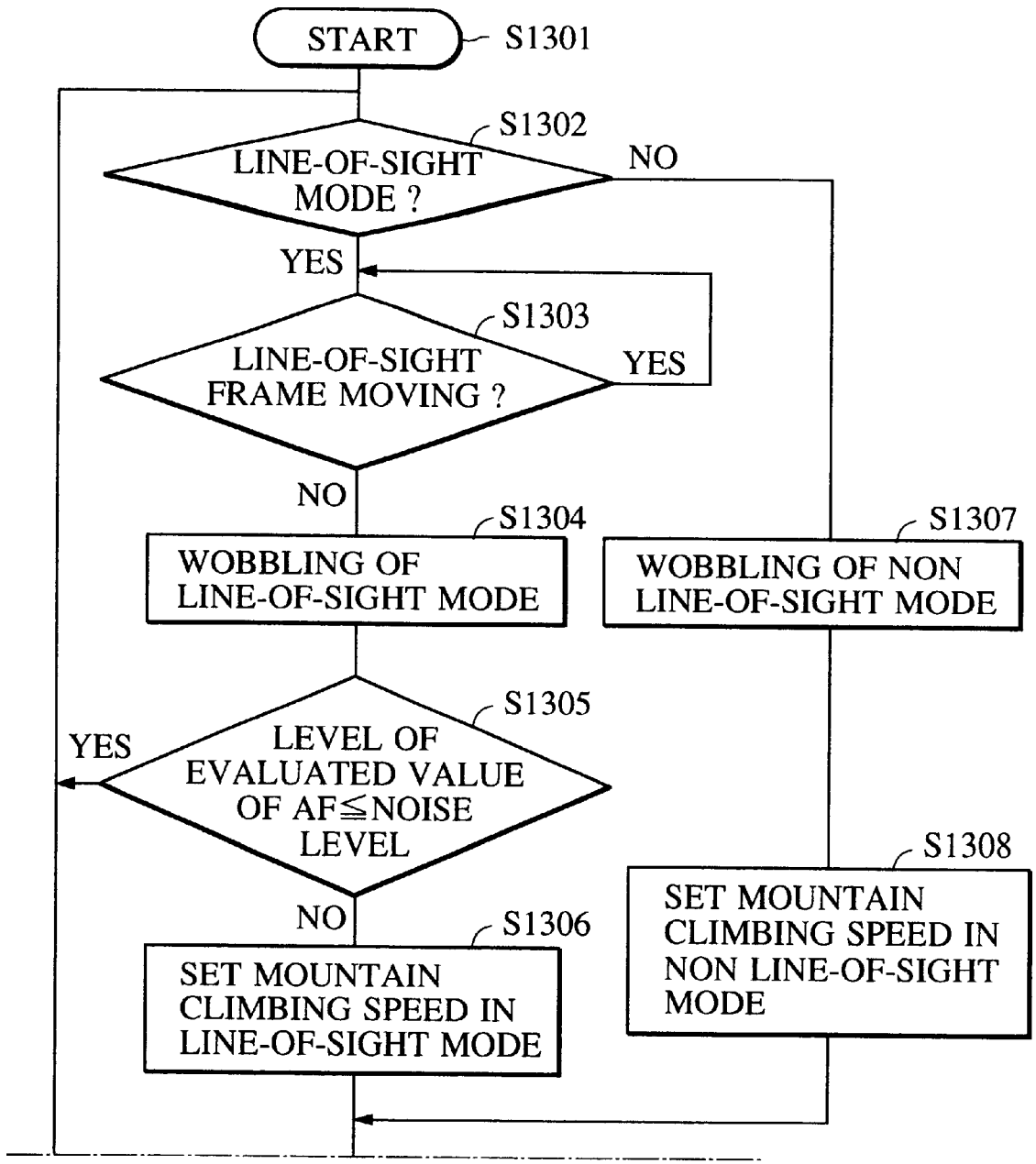

FIG. 35(b)

| DIAPHRAGM VALUE | 0 | 1 | 2 | 3 | 4 | 5 | 6 | 7 OR LARGER |
|---|---|---|---|---|---|---|---|---|
| α AT NON LINE-OF-SIGHT | δ | 1.4δ | 2.0δ | 2.8δ | 4δ | 5.7δ | 8δ | 11.3δ |
| α AT LINE-OF-SIGHT | 0.5δ | 0.7δ | δ | 1.4δ | 2δ | 2.8δ | 4δ | 5.7δ |

δ : MINIMUM CIRCLE OF CONFUSION
α : AMOUNT OF WOBBLING AMPLITUDE

FIG. 35(c)

| MODE | NON LINE-OF-SIGHT MODE | LINE-OF-SIGHT MODE |
|---|---|---|
| β | 20% | 40% |

β : THRESHOLD VALUE FOR DISCRIMINATING RESTART

FIG. 35(d)

| MODE | NON LINE-OF-SIGHT MODE | LINE-OF-SIGHT MODE |
|---|---|---|
| CLIMBING SPEED | HIGHEST SPEED | 40% OF THE HIGHEST SPEED |

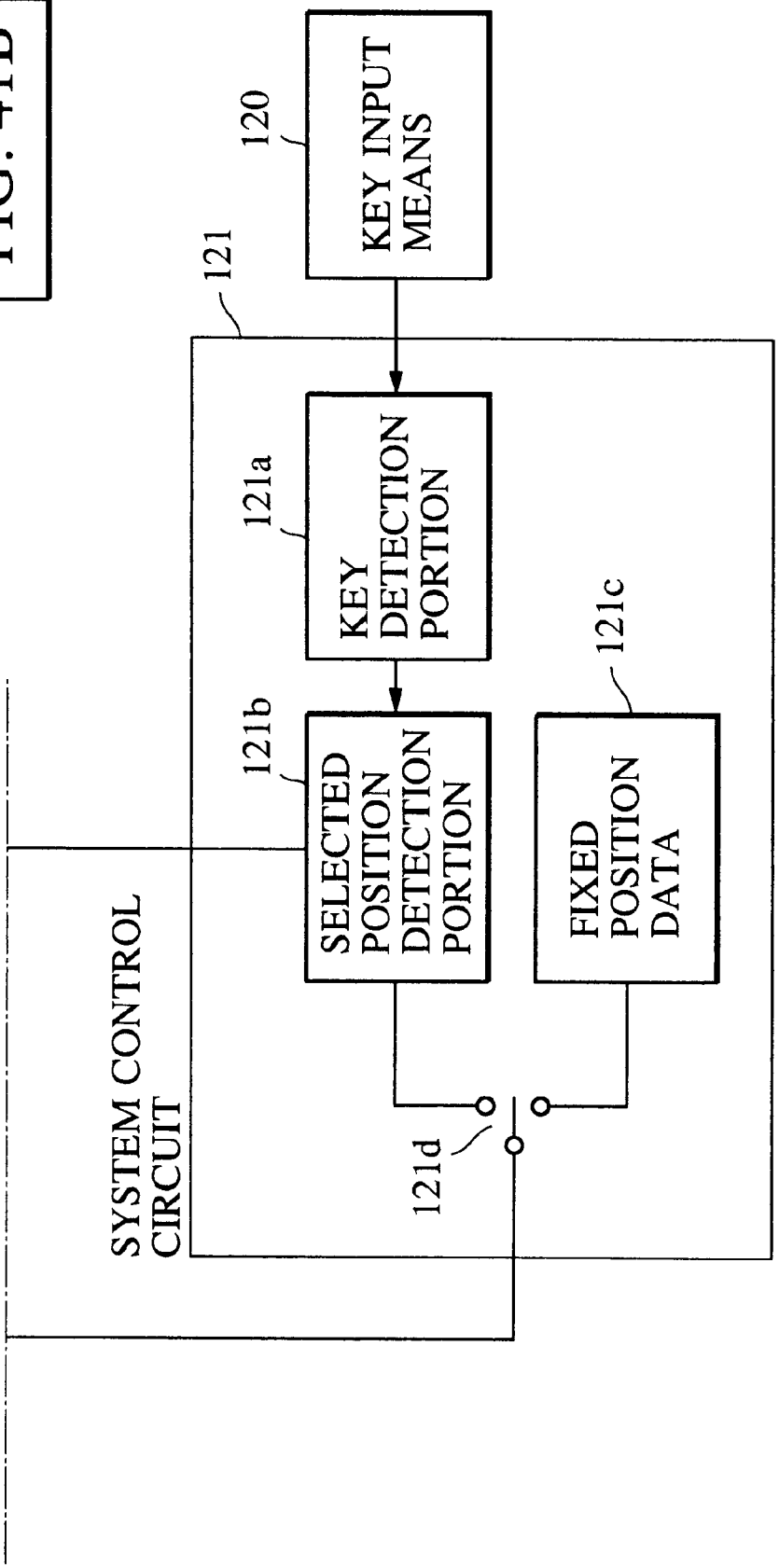

PHOTOMETRY OF DIVIDED FRAME

PHOTOMETRY OF WEIGHTED CENTER

PHOTOMETRY OF ENTIRE SURFACE

PHOTOMETRY FOLLOWING DETECTED POSITION INFORMATION

PHOTOMETRY FOLLOWING DETECTED POSITION INFORMATION

IMAGE DETECTION REGION IN EACH PHOTOMETRY METHOD

OPTICAL SYSTEM FOR DETECTING
POINT OF INTEREST

INTENSITY OF OUTPUT SIGNAL FROM
PHOTOELECTRIC DEVICE ARRAY

IMAGE REFLECTED BY EYEBALL ON
PHOTOELECTRIC DEVICE ARRAY

IMAGE PICKUP APPARATUS HAVING MEANS FOR APPOINTING AN ARBITRARY POSITION ON THE DISPLAY FRAME AND PERFORMING A PREDETERMINED SIGNAL PROCESS THEREON

BACKGROUND OF THE INVENTION

1. Field of the Invention

The present invention relates to an image pickup apparatus having appointing means for, in an image frame to be picked up, appointing a point or a region to be subjected to a predetermined image process.

2. Related Background Art

In the industrial field of image pickup apparatuses for the general user, such as a camera having a video tape recorder integrated therewith, a variety of techniques have been employed in order to easily obtain excellent images. In recent years, the automatic focusing (AF) function and the automatic exposure (AE) function have been provided as standard functions to eliminate complex operations such as focusing and exposure that must be adjusted whenever the photographing operation is performed. The foregoing functions are typical examples of functions for easily obtaining an image of excellent quality. Since the AF and AE functions are mechanisms with which an image pickup apparatus such as a camera, spontaneously discriminates the photographing state to adjust the position of the lens and diaphragm to be suitable to the discriminated state, the desire of the photographer is not always is correctly reflected in the image. In a case where both a remote subject and a near subject coexist in the frame to be photographed, execution of the AF operation in accordance with information about the overall image pickup frame results in that although focusing of any of the plural subjects can be established, the image pickup apparatus cannot discriminate that the focused subject is the main subject intended to be focused by the photographer. In a case where the main subject is photographed with a background which is the bright sky, execution of the AE operation in accordance with information about the overall frame causes the diaphragm to be adjusted in accordance with the brightness of the sky. As a result, the photographed main subject is undesirably blackened.

In order to overcome the foregoing problems, a method has usually been employed in which range finding and photometry of a subject positioned in the central portion of the frame is performed and the AF and AE operations are performed in accordance with the results of the range finding and photometry. The foregoing methods are based on the fact that a photographer usually places the main subject in the central portion of the frame. However, the foregoing method creates a problem because focusing and exposure of a main subject cannot be performed appropriately if the main subject is placed outside the central portion of the frame.

Accordingly, the applicant of the present invention has disclosed an image pickup apparatus in Japanese Patent Application No. 04-154165. In order to establish optimum focusing and exposure regardless of the position of the main subject in the frame to be picked up, the foregoing image pickup apparatus having a structure where the line of sight of a photographer who is observing the finder is detected; and a main subject can be selected in accordance with the position of the detected line of sight. The foregoing image pickup apparatus enables the position of the main subject to be changed freely in a manner limited to the range finding and photometry region. The position appointing means for selecting the main subject is not limited to the line-of-sight detection means. For example, it might be considered feasible to employ a means, such as a joy stick or a mouse, in which the amounts of movement in two or more axes are synthesized to determine the direction and position of the movement.

In the foregoing case, the image pickup apparatus detects the position of the line of sight of the photographer and moves the range finding and photometry region correspondingly to the detected position. Therefore, it is accurate and convenient when the image pickup apparatus notifies the photographer of the result of the position detection of the photographer's line of sight and the range finding and photometry region is moved on the basis of the foregoing result so as to be confirmed by the photographer. Accordingly, the applicant of the present invention has suggested a video camera in Japanese Patent Application No. 3-218574 that comprises a means for superimposing the result of the position detection of the photographer's line of sight on the finder screen.

However, the foregoing conventional line-of-sight detection/range finding and photometry method suffers from a problem that if the line of sight cannot be detected due to spacing of the photographer's eye from the finder or external noise, the detection of the position of the line of sight is performed undesirably, resulting in range finding and photometry being performed at the wrong position, not aimed by the photographer. Another problem arises in that if the detection of the line of sight has ended in failure due to external noise or the like, the range finding and photometry of a position, which is different from the viewpoint of the photographer who is observing the finder, is performed creating the feeling of incongruity in the photographer.

SUMMARY OF THE INVENTION

Accordingly, a first object of the present invention is to provide an image pickup apparatus which is capable of overcoming the foregoing problems and performing the most suitable range finding and photometry process under any photographing condition.

A second object of the present invention is to enable the portion of a region to be subjected to the range finding and photometry processes to be arbitrarily appointed in the frame and to continue the photographing operation even if an error is made in appointing the position.

In order to achieve the foregoing objects, according to one aspect of the present invention, there is provided an image pickup apparatus comprising: position appointing means for appointing an arbitrary position on a display frame of monitor means; detection means for detecting an error in appointment made by the position appointing means; image signal extracting control means for fetching an image signal in a predetermined fixed region in the display frame if the detection means has detected an error in appointment and for extracting an image signal in a region including the position appointed by the position appointing means if the detection means has detected that the state is normal; and adjustment means for adjusting photographing conditions of the image pickup means in accordance with the image signal fetched by the image-signal fetching control means.

According to another aspect of the present invention, there is provided an image processing apparatus comprising: line-of-sight position detection means for detecting the line of sight of an operator in a display frame; region setting means for setting a region, in which a signal is processed at a position of the line of sight in the display frame detected by the line-of-sight position detection means; and a control means for fixing the region, in which the signal is processed at a predetermined position in the frame if the line-of-sight position detection means produces an error in detecting the position of the line of sight.

Thus, the frame for range finding and photometry is moved to follow the photographing position appointed by a photographer of, for example, a video camera. If an error has been produced in appointing the photographing position, the foregoing frame can be fixed to a predetermined position, so that the photographing operation is continued.

According to another aspect of the present invention, there is provided an image processing apparatus comprising: gate means for fetching an image signal corresponding to the inside of a predetermined region in a frame; appointing means for inputting position setting information for appointing a set position of the predetermined region in the frame; position setting means that controls the gate means in accordance with an output from the appointing means to control the position of the predetermined region in the frame; and control means for maintaining the predetermined region at a state immediately before an error is made if the error is made in an operation of setting the position of the predetermined region by the appointing means.

As a result, even if the appointing means has produced an error, the operation state is not immediately changed. However, if the error ends in a short time, the state of the gate means is maintained on the basis that information about the latest set position obtained is correct such that the system is stabilized.

According to another aspect of the present invention, there is provided an image processing apparatus comprising: gate means for processing an image signal corresponding to the inside of a predetermined region in a frame; appointing means for inputting set position information for appointing a set position of the predetermined region in the frame; position setting means that controls the gate means in accordance with an output from the appointing means to control the position of the predetermined region in the frame; and control means for forcibly moving the predetermined region to a predetermined position in the frame regardless of setting performed by the appointing means if an error is made over a predetermined period in an operation for setting the position of the predetermined region by the appointing means.

As a result, if an error in the operation for setting the region, in which image is fetched, has been produced for a long time, the predetermined region is forcibly fixed to a predetermined position so that the image processing operation is stabilized.

A third object of the present invention is to provide an image pickup apparatus and an image processing apparatus, such as a video camera using a region setting means using detection of the line of sight or the like, which is capable of overcoming the problem that the set position has undesirably moved and an error is therefore produced due to blinking, looking the other way or the like.

If the result of the detection has a probability of an error being made due to scattering of the line of sight, blinking of the photographer, or noise and the like and therefore the result is not reliable, updating the present central coordinates is inhibited. Therefore, undesirable movement of the fetched region, such as the focal point detection region or the photometry region due to scattering of the line of sight, blinking of the photographer, or noise and the like can be prevented. Thus, focal-point control, exposure control and display of the region in the frame can be stabilized.

A fourth object of the present invention is to provide an image-signal processing apparatus in which the region display for an operator is optimized in a mode in which a region to be processed in the screen, such as the range-finding frame or the photometry frame, is made variable in a mode in which the range finding and the photometry are performed in a fixed region.

A fifth object of the present invention is to provide a video camera apparatus in which the AF characteristic is made different between a mode in which detection of the line of sight is performed to vary the position of the range-finding frame at the time of performing the AF operation and a mode in which the AF operation is performed in a fixed range-finding frame so as to be optimized for the selected mode.

A sixth object of the present invention is to provide a video camera apparatus using a position setting means, which employs detection of the line of sight or uses a joy stick or a track ball to move the photometry frame to optimize the exposure control.

Other and further objects, features, and advantages of the invention will be evident from the following detailed description of the preferred embodiments in conjunction with the attached drawings.

BRIEF DESCRIPTION OF THE DRAWINGS

FIG. 6 is a block diagram showing a second embodiment of the present invention;

FIG. 12 is a flow chart of a process according to a fifth embodiment;

FIG. 13 is a flow chart of a process according to a sixth embodiment;

FIG. 18 is a diagram showing the structure in a case where a mouse is used as an image-information fetching region position setting apparatus according to the eighth embodiment of the present invention;

FIG. 20 is a diagram showing the structure in which a joy stick is used as the image-information fetching region position setting apparatus according to the eighth embodiment of the present invention;

FIG. 29 is a diagram showin a thirteenth embodiment of the present invention;

DESCRIPTION OF THE PREFERRED EMBODIMENTS

Figure 1A:
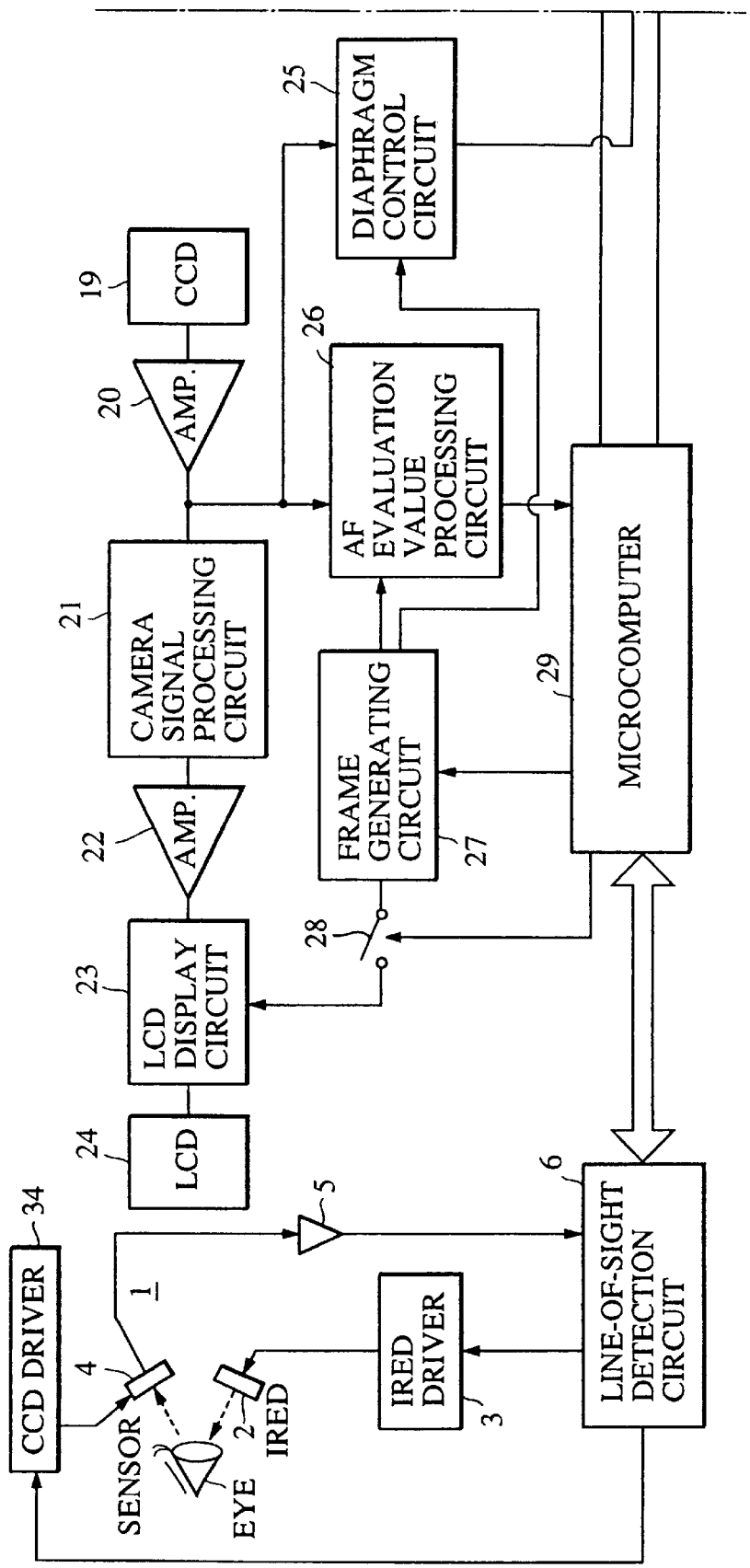
FIG. 1 is a block diagram showing a first embodiment of the present invention.

Preferred embodiments of an image pickup apparatus according to the present invention will now be described with reference to the drawings.

First Embodiment

FIG. 1 is a block diagram of the basic structure of a first embodiment of the present invention. In this embodiment, the present invention is adapted to a camera having a video tape recorder integrated therewith.

Referring to FIG. 1, symbols EYE represent an eyeball of an operator who observes a finder of the camera having a video tape recorder integrated therewith. Reference numeral 2 represents an infrared ray emitting diode (IRED) that emits infrared rays with which the eyeball is irradiated for the purpose of detecting the position of a line of sight of the operator in the finder. Reference numeral 3 represents a driver for operating the IRED 2. Reference numeral 4 represents a light receiving sensor for receiving infrared rays emitted by the IRED 2 and reflected by the eyeball EYE, where the light receiving sensor 4 comprises, for example, a CCD. Reference numeral 5 represents an amplifier for amplifying an output signal from the light receiving sensor 4. Reference numeral 6 represents a line-of-sight detection circuit for analyzing the position of the line of sight of the eye EYE of the operator in accordance with an output signal from the amplifier 5.

The line-of-sight detection apparatus has a structure such that the eyeball of the operator is irradiated with an infrared ray from the IRED 2; light reflected by the eyeball is received by the CCD 4; and the image of the eyeball is analyzed by the line-of-sight detection circuit 6 so that a point of interest in the frame of the finder is detected.

The foregoing line-of-sight detection apparatus is formed into an unit disposed in the finder (represented by symbol F shown in FIG. 19) of the camera having a video tape recorder integrated therewith. Therefore, a view finder unit having the line-of-sight detection apparatus is formed in which an image displayed on the finder frame is observed. As a result, a variety of controls are enabled, thus resulting in excellent general purpose characteristics that can be used as a line-of-sight detection unit used in fields other than the video camera and which comprises a display frame for displaying images for use in control and selection, and the line-of-sight detection apparatus for detecting the point of interest in the frame.

Symbols OB represent a subject. Reference numeral 7 represents a photographing lens optical system, 8 represents a first fixed lens group, 9 represents a magnification-variable lens, 10 represents a diaphragm, 11 represents a third fixed lens group, and 12 represents a focus compensating lens which adjusts the focal point and which has a compensating function for compensating movement of the focal plane at the time of varying the magnification. The foregoing elements compose a photographing optical system.

Reference numeral 13 represents a lens motor for varying the magnification by moving lens 9. Reference numeral 14 represents a lens driver for varying the magnification by rotating lens motor 9. Reference numeral 15 represents an IG meter for controlling the amount of aperture by operating the diaphragm 10. Reference numeral 16 represents an IG driver for operating the IG meter 15. Reference numeral 17 represents a focus-compensating-lens motor for moving the focus compensating lens 12. Reference numeral 18 represents a focus compensating lens driver for rotating the focus compensating lens motor 17.

In Figure GA, reference numeral 19 represents an image pickup device, such as a CCD, 20 represents an amplifier for amplifying an image pickup signal output from the image pickup device 19, and 21 represents a camera signal processing block for generating, from the output signal from the amplifier 20, a brightness signal and a color signal and subjecting the output signal to signal processing, such as a blanking process, and the addition of a synchronizing signal and gamma correction to convert the same into a specified television signal. Reference numeral 22 represents an amplifier, and 23 represents an LCD display circuit that causes an electronic view finder comprising a liquid crystal monitor to display the television signal output from the amplifier 22. Reference numeral 24 represents the electronic view finder comprising the liquid crystal monitor. The electronic view finder 24 may be, for example, a CRT. The LCD display circuit 23 mixes a frame signal for display output from a frame-signal generating circuit 273 contained within a frame generating circuit 27 to be described later with the foregoing television signal to display the mixed signal on the liquid crystal electronic view finder 24.

The television signal output from the camera signal processing block 21 is supplied to a video tape recorder VTR so as to be recorded on a magnetic tape or the like (not shown). By supplying image information reproduced by the VTR to the LCD display circuit 23, an image can be reproduced by the liquid crystal view finder 24. The foregoing recording and reproducing operations are switched by a microcomputer system to be described later in the ensuing embodiment that is operated by the operator.

Reference numeral 25 represents a diaphragm control circuit that samples a portion of the image pickup signal output of the image pickup device 19 that corresponds to a predetermined photometry region set in the frame on the basis of an appointment from a frame generating circuit to be described later. The diaphragm control circuit also controls the IG driver 16 to make the brightness level constant in order to adjust the size of the aperture of the diaphragm 10 so as to make the image pick up light of an appropriate quantity.

The diaphragm control circuit 25 includes a gate circuit for sampling the image pickup signal corresponding to the foregoing photometry region and an integrating circuit for obtaining the average value of brightness levels of the image pickup signals in the photometry region. The diaphragm control is performed by partial photometry or spot photometry if only the image pickup signal in the photometry region is used, while diaphragm control is performed by center-weighted photometry if a method is employed in which the signal in the photometry region is weighted and the weights of regions except the photometry region are reduced. If a plurality of photometry regions are set in the frame they are weighted variously as well, and so-called multi-division photometry is performed.

Reference numeral 26 represents a circuit for processing an evaluated AF value for generating, from the image pickup signal output of the image pickup device 19 through the amplifier 20, a signal for evaluating the focal point, such as a high frequency component, the level of which is changed on the basis of the state of a focal point. The circuit 26 for processing the evaluated AF value includes a band-pass filter for extracting the foregoing high frequency component in the image pickup signal and a gate circuit that allows only the image pickup signal that corresponds to the inside of a predetermined region to detect a focal point set in the frame. The inside of the focal point detection region (region in which the range is found) passes through in accordance with an appointment from a frame generating circuit to be described later so as to sample the image pickup signal.

Reference numeral 27 represents the frame generating circuit for generating gate signals for controlling the opening and closing timing of gate circuits which are respectively disposed in the circuit 26 for processing the evaluated AF values, and also diaphragm control circuit 25 which respectively sets the focal point detection region and the photometry region. By controlling the opening and closing timing of each gate circuit, the position and size of a region to be fetched for fetching image information of the image pickup frame can be arbitrarily set.

The frame generating circuit 27 outputs a region display signal to the LCD display circuit 23 in order to display the focal point detection region and the photometry region in the finder. Thus, the display signals of the focal point detection region and the photometry region are superimposed on the image signal from the amplifier 22 so as to be displayed on the frame of the electronic view finder. Between the frame generating circuit 27 and the LCD display circuit 23, a switch 28 is disposed which switches on/off the supply of a region signal output from the frame generating circuit 27 to the LCD display circuit 23. By switching on the switch 28, the region can be displayed on the finder frame. By switching off the switch 28, the region can be cut from the finder frame.

Reference numeral 29 represents an AF control microcomputer (hereinafter called an "AF microcomputer") that controls the focus compensating lens 12 in accordance with the output signal from the circuit 26 for processing the evaluated AF value and the lens 9 for varying the magnification. The AF microcomputer performs the focusing and corrects the focusing when the magnification has been changed. The microcomputer 29 also controls the frame generating circuit 27 in order to change the positions of the focal point detection region and the photometry region based on the information about the detected line of sight to be described later. The AF microcomputer 29 controls the line-of-sight detection circuit 6 as well as receiving information about the position of the line of sight of the operator from the line-of-sight detection circuit 6 so as to move the focal point detection region and the photometry region and perform a control using the detected line of sight. The AF microcomputer 29 controls the operation of the switch 28 to turn on/off the displays of the focal point detection region and the photometry region in the view finder frame.

The AF microcomputer 29 discriminates whether or not the detection of the line of sight is being performed normally on the basis of information indicating an error in the detection of the line of sight supplied from the line-of-sight detection circuit 6. If the detection is being performed normally, the AF microcomputer 29 outputs to the frame generating circuit 27 an appointment for creating a frame in accordance with information about the position in the frame supplied from the line-of-sight detection circuit to be described later. If the detection of the line of sight results in an error, the AF microcomputer 29 outputs an appointment for creating a frame in the central portion of the frame. Each frame has a size that corresponds to an employed mode. In accordance with the appointment from the microcomputer 29, the frame generating circuit 27, through a gate timing generating circuit 274 shown in FIG. 3 as described later, causes the display frame generating circuit 273 to create a frame to be displayed and switches on/off the switch 28 to output the frame to the LCD display circuit 23. A frame for automatic focusing is created in a gate-frame generating circuit 271 for automatic focusing shown in FIG. 3 so as to be outputted to an automatic focusing evaluation value processing circuit 26. Furthermore, a frame for a photometry gate is created by a gate-frame generating circuit 272 for photometry so as to be output to the diaphragm control circuit 25. Reference numeral 34 represents a driver for operating the image pickup device 19 and a CCD which is a sensor for detecting the line of sight.

Figure 2:
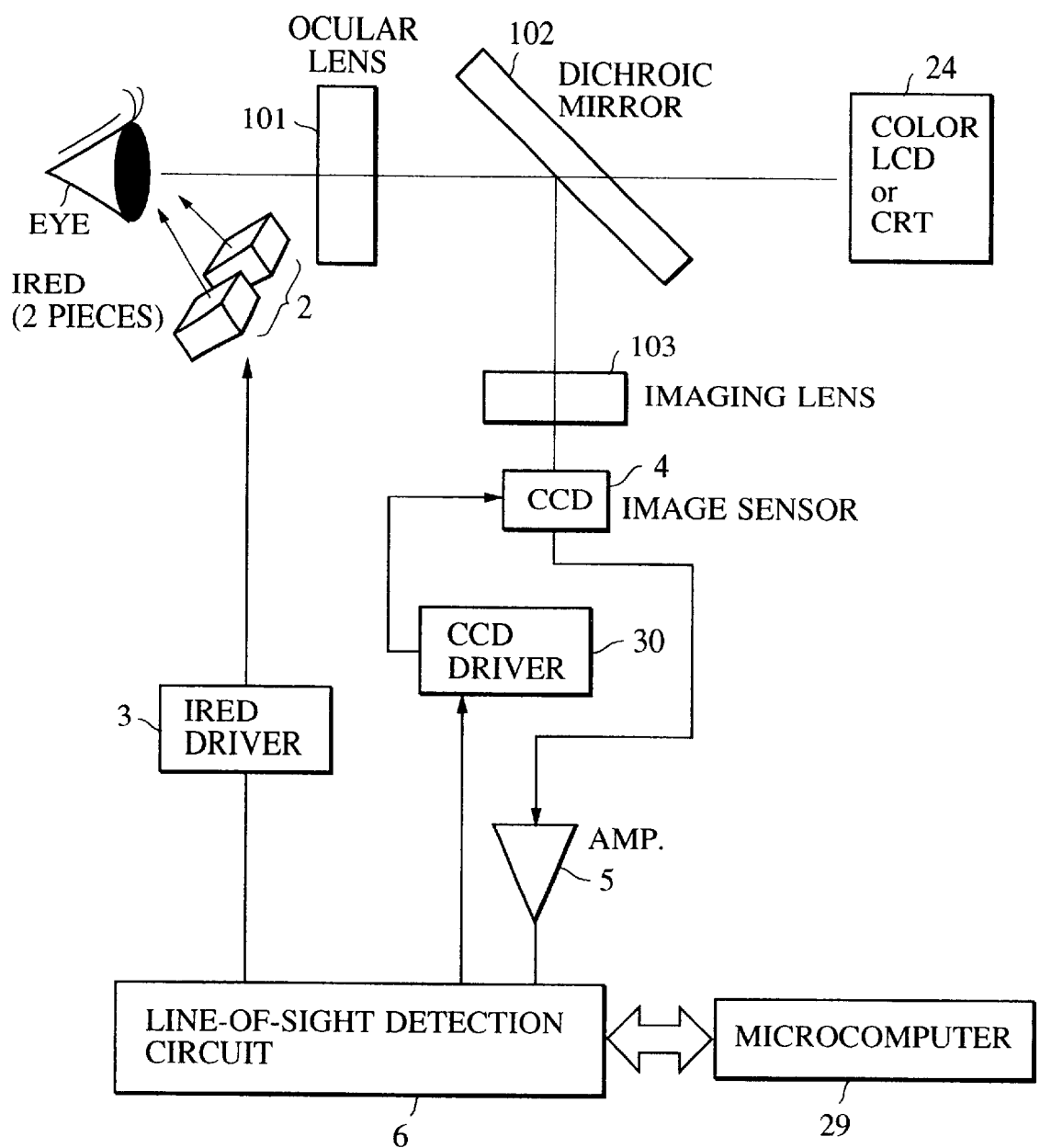
FIG. 2 is a diagram showing the structure for detecting the line of sight.

FIG. 2 is a detailed diagram of the line-of-sight detection apparatus block 1. Referring to FIG. 2, blocks having the same functions as those shown in FIG. 1 are given the same reference numerals and their descriptions are omitted.

The eye EYE of the photographer, through a dichroic mirror 102, observes an image displayed on the liquid crystal view finder 24, the image being observed while being enlarged by an ocular lens 101.

The IRED driver 3 operates the IRED 2 and causes the same to emit light in response to a control signal from the line-of-sight detection circuit 6. Two infrared-ray emitting diodes 2 are disposed. Infrared rays emitted by the IRED 2 are used to irradiate the eyeball EYE and are also reflected by the cornea. Reflected infrared rays pass through the ocular lens 101, reach the dichroic mirror 102 that reflects only infrared ray and that permits visible light to pass. The reflected infrared ray, that is, an image of the eyeball EYE, which has been reflected by the dichroic mirror 102 and the passage of which has been changed, is imaged on an imaging surface of the CCD image sensor 4 through an imaging lens 103, where the CCD image sensor 4 serves as a line-of-sight detection sensor. Reference numeral 127 represents a circuit for operating the CCD serving as the image sensor.

Light reflected by the eyeball EYE and made incident on the CCD 4 is converted into an electric signal to be supplied to the line-of-sight detection circuit 6 through the amplifier 5. The eyeball EYE observes the displayed frame of the electronic view finder 24. Since the image pickup frame of the CCD 4 and the frame of the electronic view finder 24 correspond to each other, obtaining a point of interest in the image pickup frame of the CCD 4 enables a point of interest in the displayed frame on the electronic view finder 24 to be detected.

In the thus-constituted line-of-sight detection block, the line-of-sight detection circuit 6 detects the coordinates of the position of the line of sight in the displayed frame of the electronic view finder 24 in response to the output signal from the amplifier 5.

Information about the coordinates of the detected position of the line of sight is transmitted to the AF microcomputer 29.

A variety of methods can be employed to calculate the coordinates of the position of the line of sight in accordance with the output from the CCD 4. For example, any one of the methods may be employed which have been disclosed by the applicant of the present invention in Japanese Patent Application No. 3-218574 or Japanese Patent Application No. 4-154165.

The camera having a video tape recorder integrated therewith employs a so-called television AF method,(called a "TV-AF method"). The TV-AF method contains a focal-point adjustment method having the steps of: causing the band-pass filter in the circuit 26 for processing the evaluated AF value to take the high frequency component from the image pickup signal; causing the AF microcomputer 29 to calculate the direction in which the focusing motor is rotated and the rotational speed in such a manner that the level of the high frequency component is made maximum; and rotating the focus compensating lens motor 17 through the focus compensating lens driver 18 so that the focus compensating lens 12 is moved in the direction of the optical axis thereof.

The AF method is able to detect the high frequency component contained in the image signal only when the image signal to be fetched by the circuit 26 for processing the evaluated AF value includes an edge portion (a level changed portion). That is, image signals for one or more horizontal scanning lines must be used. Generally, a region having a predetermined area must be fetched. The foregoing region is a focal point detection region (the range finding region).

Figure 3:
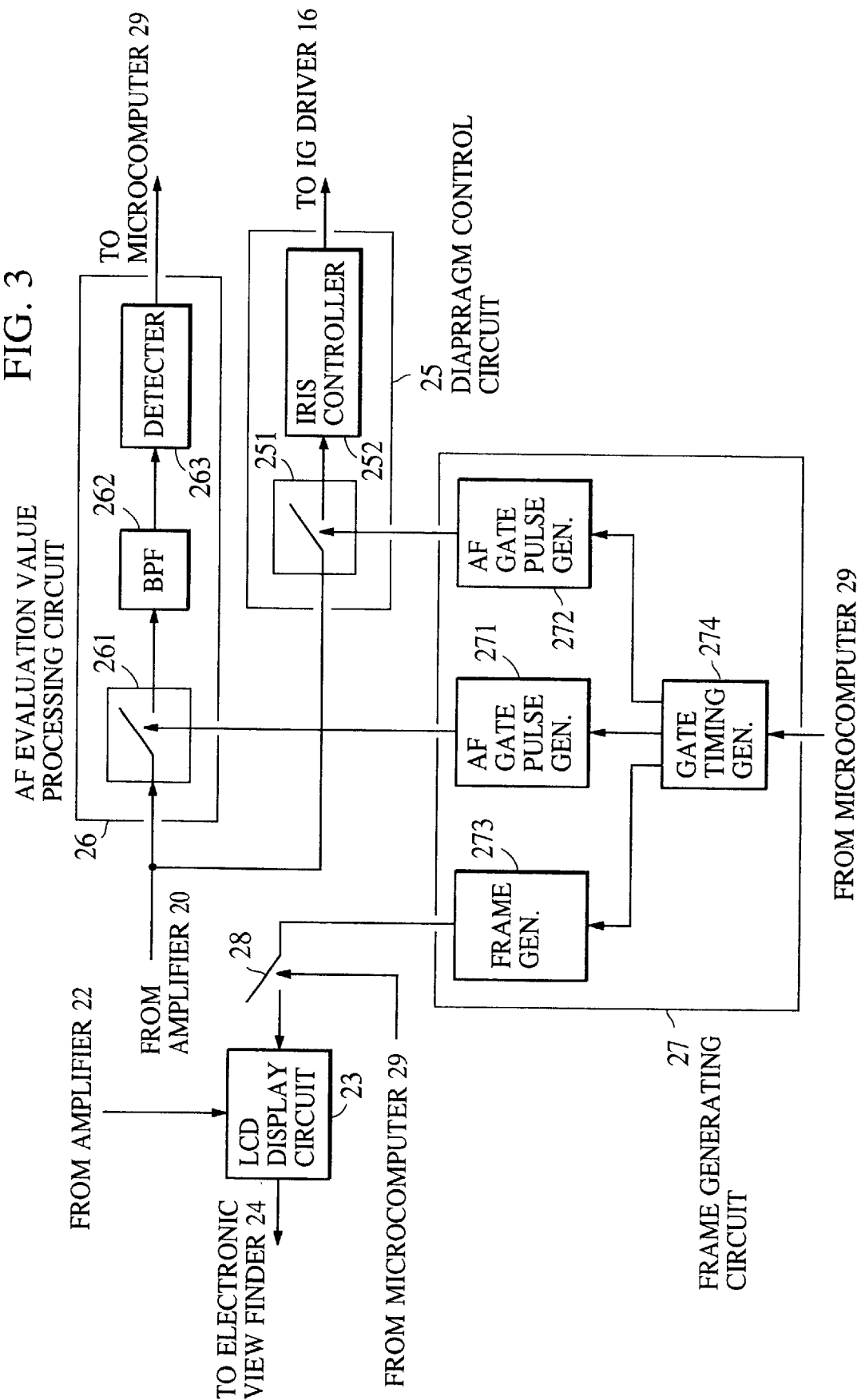
FIG. 3 is a block diagram showing the detailed structure of the frame generating circuit, the automatic focus evaluated-value processing circuit and the diaphragm control circuit.
Figure 4A:
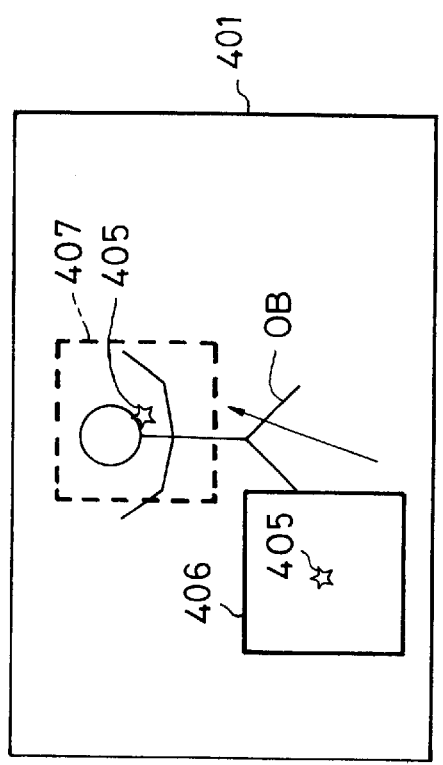
FIG. 4 is a diagram showing the detected position, a range finding and photometry frame, and a display frame relating to the line of sight detection, wherein the relationship between the position detected by a line-of-sight detection circuit 6, the focal point detection region, and the photometry region generated by a frame generating circuit 27 in a case where the line-of-sight detection is being performed normally. Also displayed is a case where an error has been produced in detecting the line of sight for a predetermined time, and the relationship of the focal point detection region and the photometry region generated by the frame generating circuit 27 when an error has been produced in detecting the line of sight over a predetermined period.
Figure 4B:
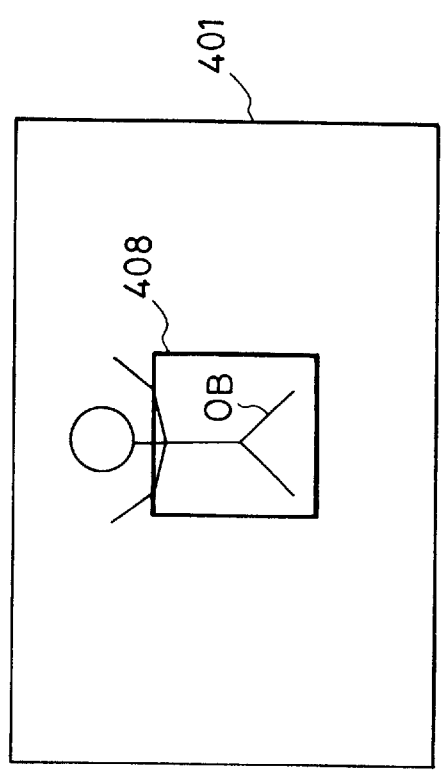
Figure 4C:
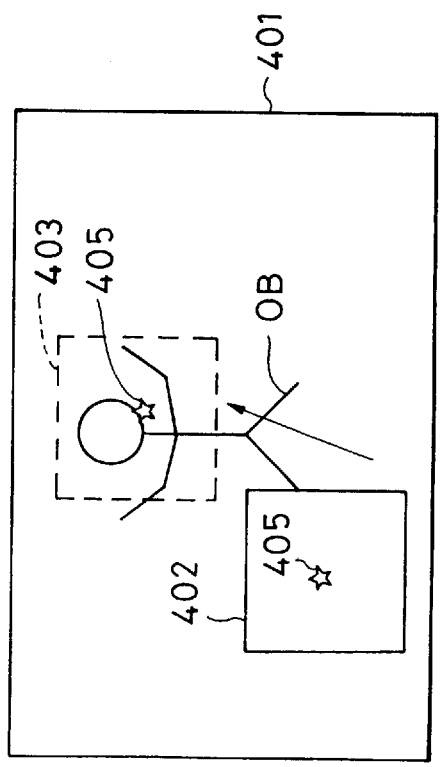
Figure 4D:
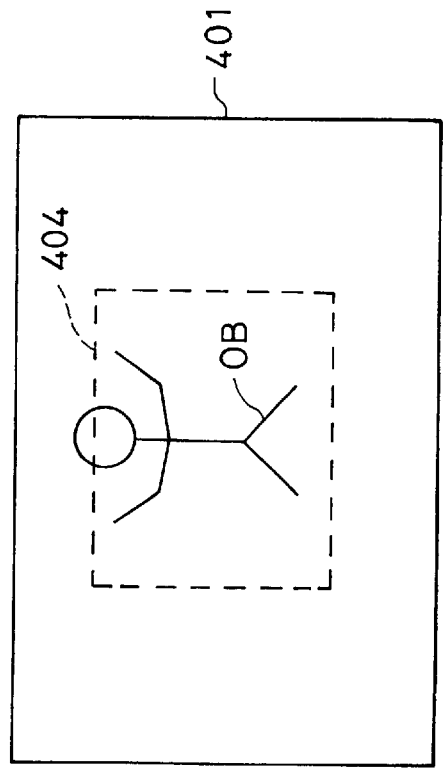

FIG. 3 is a diagram showing the inside structures and connections established among the circuit 26 for processing the evaluated AF value, the diaphragm control circuit 25 and the frame generating circuit 27. FIG. 3 shows the structure of circuits for performing a gate process for fetching an image signal after a region to be fetched, for example, a focal point detection region, has been defined by the AF microcomputer 29. Referring to FIG. 3, the same components as those shown in FIG. 1 are given the same reference numerals and their descriptions are omitted here.

Referring to FIG. 3, the circuit 26 for processing the evaluated AF value includes a gate circuit 261 that samples only image signals among image signals supplied from the amplifier 20 that correspond to the inside of the focal point detection region in the frame to allow the image signals to pass through. Circuit 26 also includes a wave-detection circuit 263 that detects waves of high frequency output from band-pass filters BPF 261 and BPF 262 which extract the high frequency component to detect the focal point from the image signal so as to convert the high frequency component into DC voltage. Thus, the evaluated focal point value is detected and outputted to the AF microcomputer 29. The AF microcomputer 29 outputs a focusing lens control signal on the basis of the evaluated focal point value to the focus compensating lens driver 18, where the focus lens control signal is converted into a motor drive signal. As a result, the focus compensating lens motor 17 is rotated. Consequently, the focal point adjustment operation is performed.

The diaphragm control circuit 25 includes a gate circuit 251 that samples only image signals among the image signals supplied from the amplifier that correspond to the photometry region in the frame to allow the image signals to pass through. Diaphragm control circuit 25 also includes an iris controller 252 that integrates the image signals sampled by the gate circuit 251 to obtain an average brightness level.

The average brightness level and a predetermined reference level are then compared to produce a control signal for operating the IG driver 16 in such a manner that the size of the aperture of the diaphragm 10 is controlled in such a fashion as to make the average brightness level always the same as the reference level. As a result, the amount of exposure can always be controlled.

The frame generating circuit 27 comprises: an AF gate pulse generating circuit 271 which turns on the gate circuit 261 in circuit 26 for processing the evaluated AF value only when the inside of the focal point detection region is scanned to generate a gate pulse which samples only the image signals corresponding to the inside of the focal point detection region; an AE gate pulse generating circuit 272 which turns on the gate circuit 251 in the diaphragm control circuit 25 only when the inside of the photometry region is scanned to generate a gate pulse which samples only the image signals corresponding to the inside of the photometry region; a frame-signal generating circuit 273 for transferring, to the LCD display circuit 23 through the switch 28, a frame display signal for displaying the focal point detection region and the photometry region; and a gate timing generating circuit 274 for transmitting gate timing signals to the AF gate pulse generating circuit 271 and the AE gate pulse generating circuit 272 in accordance with information about the position and size of the focal point detection region and the photometry region supplied from the AF microcomputer 29. The gate timing generating circuit 274 also transmits a frame display timing signal.

The switch 28 is opened/closed by the AF microcomputer 29 under conditions to be described later. Only when the switch 28 is closed, is the frame display signal supplied to the LCD display circuit 23.

The IRED 2, image sensor 4, IRED driver 3, amplifier 5, line-of-sight detection circuit 6, and the driver 34 compose a photographing position appointing means and a line-of-sight position detection means. The AF microcomputer 29 composes a means for detecting an error in appointing the position. The AF microcomputer 29 and the frame generating circuit 27 compose a means for controlling the fetching of an image signal. A magnification variation control signal from the AF microcomputer 29 is converted into a drive signal by the magnification-varying lens driver 14 so that the magnification-varying lens motor 13 is rotated to move the magnification-varying lens 9 so as to change the focal distance.

Figure 5A:
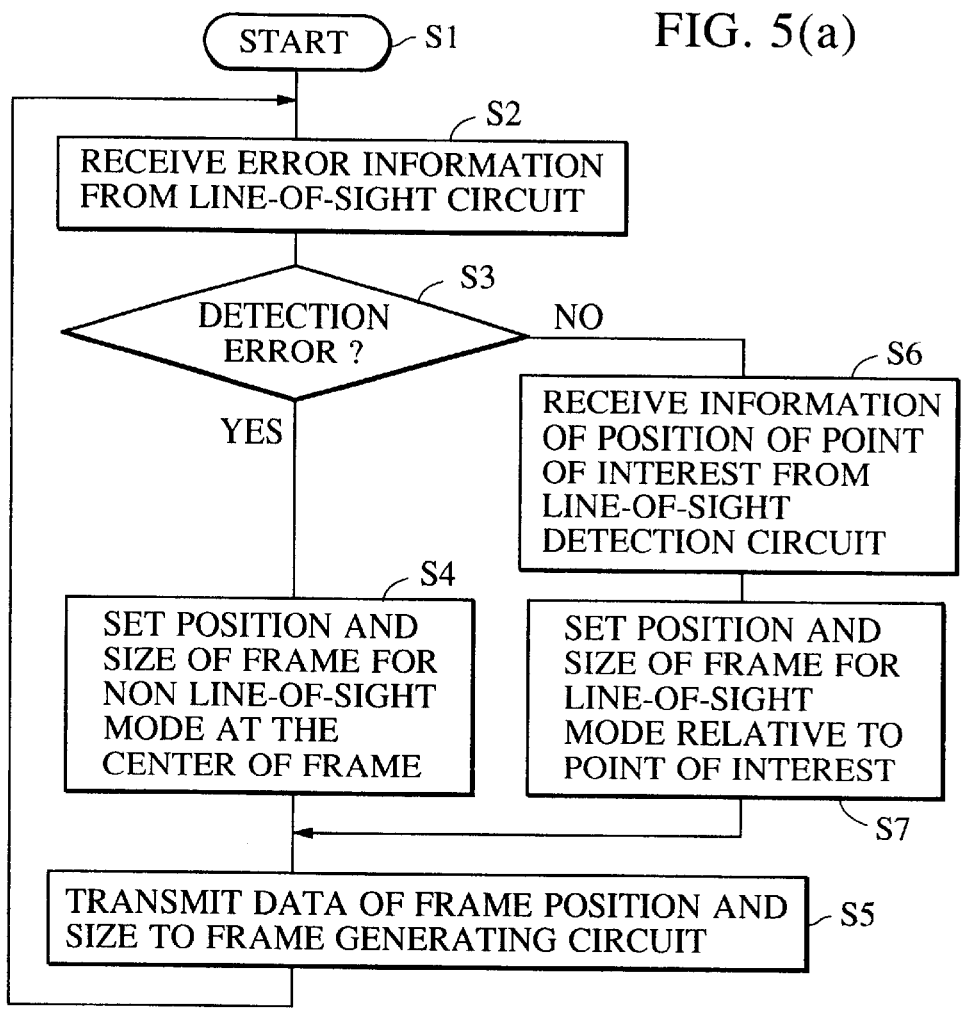
FIG. 5 is a flow chart of a process for generating a frame and an automatic focusing operation.
Figure 5B:
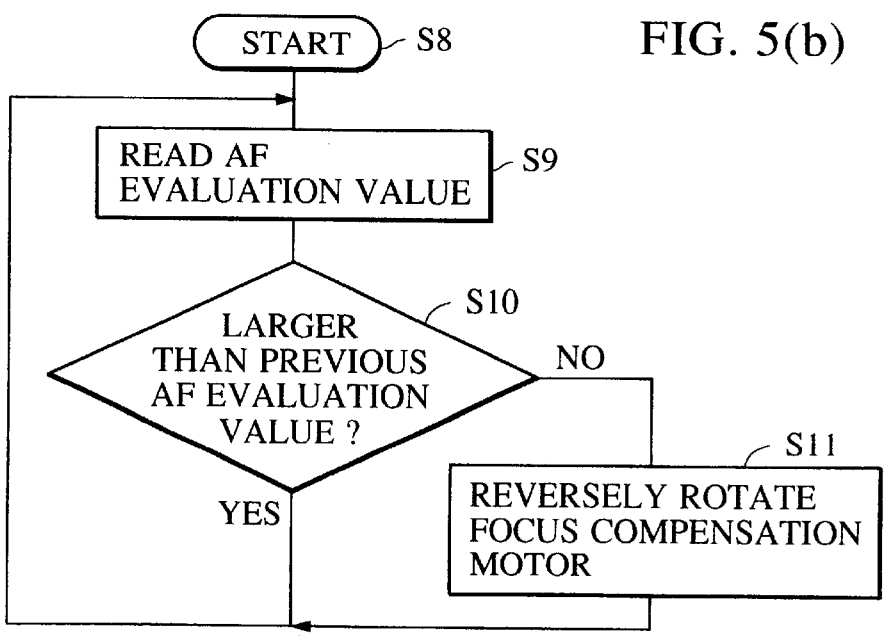

Referring to FIGS. 4 and 5, the frame creating process will now be described. FIGS. 4 (a) and 4 (c) are diagrams showing the relationship between the position detected by the line-of-sight detection circuit 6 and the frame created by the frame generating circuit 27 when the line-of-sight detection is being performed normally. FIG. 5 (a) is a flow chart for creating the frame. A frame 401 shown in FIG. 4 (a) is the outline of the screen. The AF microcomputer 29 starts operating in step S1 and receives a line-of-sight detection error information from the line-of-sight detection circuit 6 (step S2 of FIG. 5 (a)) to discriminate whether or not a line-of-sight detection error has been made (step S3). If the detection of the line of sight is normal (if no error has been made), the point of interest detected by the line-of-sight detection circuit 6 is read information about the position of a point 405 shown in FIG. 4 (a), assuming that the point of interest is the point 405 (step S6). Furthermore, in accordance with information about the position, the AF microcomputer 29 sets the position and size to create a range-finding and photometry frame 402 relative to the point 405 (step S7), transmitting data to the frame generating circuit 27 (step S5). AF 29 then transmits data to create a frame 406 for display. If the point of interest 405 has been moved, the AF microcomputer 29 issues an appointment to create frames 403 and 407 at the moved positions as shown in FIGS. 4 (a) and 4 (c).

FIGS. 4 (b) and 4 (c) are diagrams of frames created by the frame generating circuit 27 when an error in detecting the line of sight has occurred. If an error in detecting the line of sight has been made in step S3, the range finding and photometry frame 404 having a larger size as compared with the size of the same created when the line of sight detection is performed normally and is set in the central portion of the screen (step S4). Furthermore, a frame 408 for display is set in the central portion of the screen, the frame 408 having a size that is the same as that when the line of sight detection is performed normally. Then, data is transmitted to the frame generating circuit 27 (step S5).

FIG. 5 (b) is a flow chart of an automatic focusing operation. Initially, the evaluated AF value is read from the circuit 26 for processing the evaluated AF value (step S9) and is subjected to a comparison with the evaluated AF value fetched previously (step S10). If the present evaluated AF value is larger than the previous value, steps S9 and S10 are repeated. During this, the focus compensating lens motor 17 is rotated forwards. If the present evaluated AF value is smaller than the previous value, the focus compensating lens motor 17 is rotated backwards (step S11). As a result, the focus compensating lens motor 17 can be controlled in such a manner that the evaluated AF value is made to be a maximum value.

Second Embodiment

FIG. 6 is a block diagram showing the structure of a second embodiment of the present invention. This embodiment has a structure in which the region in which the image information is fetched is determined by an external input means in place of the input of the line of sight as employed in the first embodiment. The region, in which image information is fetched and which has been fetched by a unit 42 for setting the position of the region is processed by a circuit 41 for setting detection of the region so as to be supplied to the microcomputer 29. The microcomputer 29 determines whether or not the region, in which the image information is fetched and which has been supplied from the circuit 42 for setting detection of the region, in which image information is fetched, is used in accordance with error information from the circuit 41 for setting detection of the region, in which image information is fetched. Then, the microcomputer 29 supplies information about the position and size of the frame to the frame generating circuit 27 and performs the same control as that performed in the first embodiment. The circuit 41 for setting detection of a region, in which image information is fetched, and the unit 42 for setting the position of the region compose a photographing position appoint means.

The circuit 41 for setting detection of a region, in which image information is fetched, may contain a keyboard mouse, track ball, or joy stick that are usual input devices for computers. By using the input device, the operation can be performed easily and at a low cost. The detailed description will be made in an embodiment to be described later.

As described above, the foregoing embodiment has the structure in which a photographer appoints the photographing position on the finder screen, the region of the image signal for performing range finding and photometry is moved in accordance with the appointed position, and if an error has been made in appointing the photographing position, then the foregoing region is fixed. Therefore, a result can be obtained in which range finding and photometry at an undesirable and wrong position for the photographer can be prevented and the range finding and photometry can be adjusted optimally under any photographing condition.

Furthermore, detection of an error in appointing the photographing position can be notified to the photographer by superimposing this on the finder screen.

In the foregoing embodiment, the line of sight of a photographer is detected on the finder screen, the region of the image signal for performing the range finding and photometry is moved in accordance with the position of the line of sight, and if an error has been made in detecting the position of the line of sight, then the foregoing region is fixed. Therefore, an appropriate adjustment can be performed only by moving the line of sight on the finder screen. Furthermore, an effect can be obtained in which range finding and photometry at an undesirable and wrong position for the photographer can be prevented and the range finding and photometry can be adjusted optimally under any photographing condition. Moreover, detection of an error can be notified to the photographer by superimposing this on the finder screen.

Third Embodiment

A third embodiment of the present invention will now be described. In the foregoing embodiment, if an area setting means produces an error (an error in detecting the line of sight) and thus the area cannot be set correctly, then the AF frame and AE frame are fixed at predetermined positions (in the central portion of the screen) in the screen. In contrast with the foregoing embodiment, this embodiment has an arrangement that if the area setting means makes an error, then the area is fixed at the position immediately before the error. The structure of this embodiment is the same as that shown in FIGS. 1 to 3 except the processing algorithm of the AF microcomputer 291. Therefore, the description of the structure of the circuit is omitted to prevent repetition.

The switch 28 is switched on/off in accordance with an appointment from the AF microcomputer 29 to turn on/off the display of the region, in which image information of the focal point detection region and the photometry region output from the frame generating circuit 27 is fetched. When the line-of-sight detection operation is performed by the AF microcomputer 29, the switch 28 is switched on to display the region to be fetched or the point of interest.

Reference numeral 29 represents an AF control microcomputer that controls the focus compensating lens in accordance with the output signal from the circuit 26 for processing the evaluated AF value and the lens 9 for varying the magnification to both perform focusing and correct focusing when the magnification has been changed. The microcomputer 29 also controls the frame generating circuit 27 in order to change the positions of the focal point detection region and the photometry region on the basis of information about detected line of sight to be described later.

The AF microcomputer 29 controls the line-of-sight detection circuit 6 and also receives information about the position of the line of sight of the operator from the line-of-sight detection circuit 6 so as to move the focal point detection region and the photometry region and performs a comparison using the detected line of sight.

The AF microcomputer 29 discriminates whether or not the detection of the line of sight is being performed normally on the basis of information indicating an error in the detection of the line of sight supplied from the line-of-sight detection circuit 6. If the point of interest of the photographer can be detected normally, the AF microcomputer 29 controls the frame generating circuit 27 in accordance with the information of the coordinates of the point of interest in the frame detected by the line-of-sight detection circuit 6. The foregoing process is the same as that of the foregoing embodiment.

If an error in detecting the line of sight has been confirmed in accordance with the information of an error in detecting the line of sight output from the line-of-sight detection circuit 6 and the error is an error which ends in a predetermined time, the position information of the present point of interest in the frame is held. If the error is an error exceeding the predetermined time, an appointment for creating a frame in the central portion of the screen is outputted to the frame generating circuit 27 to set a fetching region having a size corresponding to the employed mode.

The frame generating circuit 27 supplies a frame pattern for display on the LCD display circuit 23 through the switch 28 in accordance with an appointment from the microcomputer 29. The frame pattern for display is superimposed on the image signal supplied from the amplifier 22 so as to be displayed on the electronic view finder 24.

Referring to FIG. 4, FIG. 4 (a) is a diagram showing the relationship between the position of the detected line of sight output from the line-of-sight detection circuit 6 and the frame generated by the frame generating circuit 27 in a case where the detection of the line of sight is performed normally or a case where although an error in detecting the line of sight has occurred, the error ends in a predetermined time.

The "error in detecting the line of sight" made in the line-of-sight detection circuit 6 is an error that is produced if the point of interest of a photographer cannot be detected accurately. A variety of cases can occur; the eye of the photographer is spaced from the viewfinder, the photographer blinks the eye frequently and thus the point of interest cannot be detected, and the screen for detecting the line of sight and the eyeball of the photographer are moved relative to each other. If the error state is ends in a short period of time, it can be considered to be a temporary error caused from a momentary noise, blinking, non-uniform line of sight of the photographer, or the photographer perhaps looked the other way. Therefore, considerable change of the photographing condition whenever a short-time error occurred undesirably disorders the photographing condition.

If the error state is continued for a long time, it is possible that the error is due to the fact that the eye of the photographer is spaced or the photographer is not observing the screen correctly. Therefore, control depending upon the result of the detection of the line of sight is not reliable. Accordingly, the present invention employs a structure in which if an error state continues for a long time, then control is performed without the detection of the line of sight.

Referring to FIG. 4, reference numeral 401 represents a finder screen corresponding to the screen to be photographed. Symbols OB represent an image of a subject, and reference numeral 405 represents a point of interest. If the point of interest is normally detected without an error in detecting the line of sight, a focal point detection region/photometry region 402 having a predetermined size relative to the coordinates of the detected point of interest is set. If the interest point 405 has been moved as indicated by an arrow, an appointment is issued to the frame generating circuit 27 to generate and display a frame 403 of the focal point detection region/photometry region 402 or the like at the moved position.

If an error in detecting the line of sight occurred and the error has been ended within a predetermined time, the microcomputer 29 holds the position information of the interest point 405 immediately before the error is made. In accordance with the held position information, the microcomputer 29 sets the position and size of the set focal point detection region/photometry region 402 and transmits data of the frame to be displayed to the frame generating circuit 27.

FIG. 4(*b*) shows a state where a frame is set and displayed by the microcomputer 29 in a case where an error in detecting the line of sight has been made longer than a predetermined time in the line-of-sight detection circuit 6.

If an error in detecting the line of sight has occurred in the line-of-sight detection circuit 6 and the error has continued over a predetermined time, no information about the position of the detected line of sight can be obtained. Therefore, the focal point detection region/photometry region 404 having a size larger than that of the focal point detection region/photometry region 402 at the time of normal detection of the line of sight shown in FIG. 4 (a) is set in the central portion of the screen as shown in FIG. 4 (b). The reason why the focal point detection region/photometry region 404 has the larger size in the case where the detection of the line of sight is performed normally is that as much information as possible on the subject is obtained in the screen since accurate information of the line of sight cannot be obtained so as to enable the usual AF and AE operations.

Figure 7A:
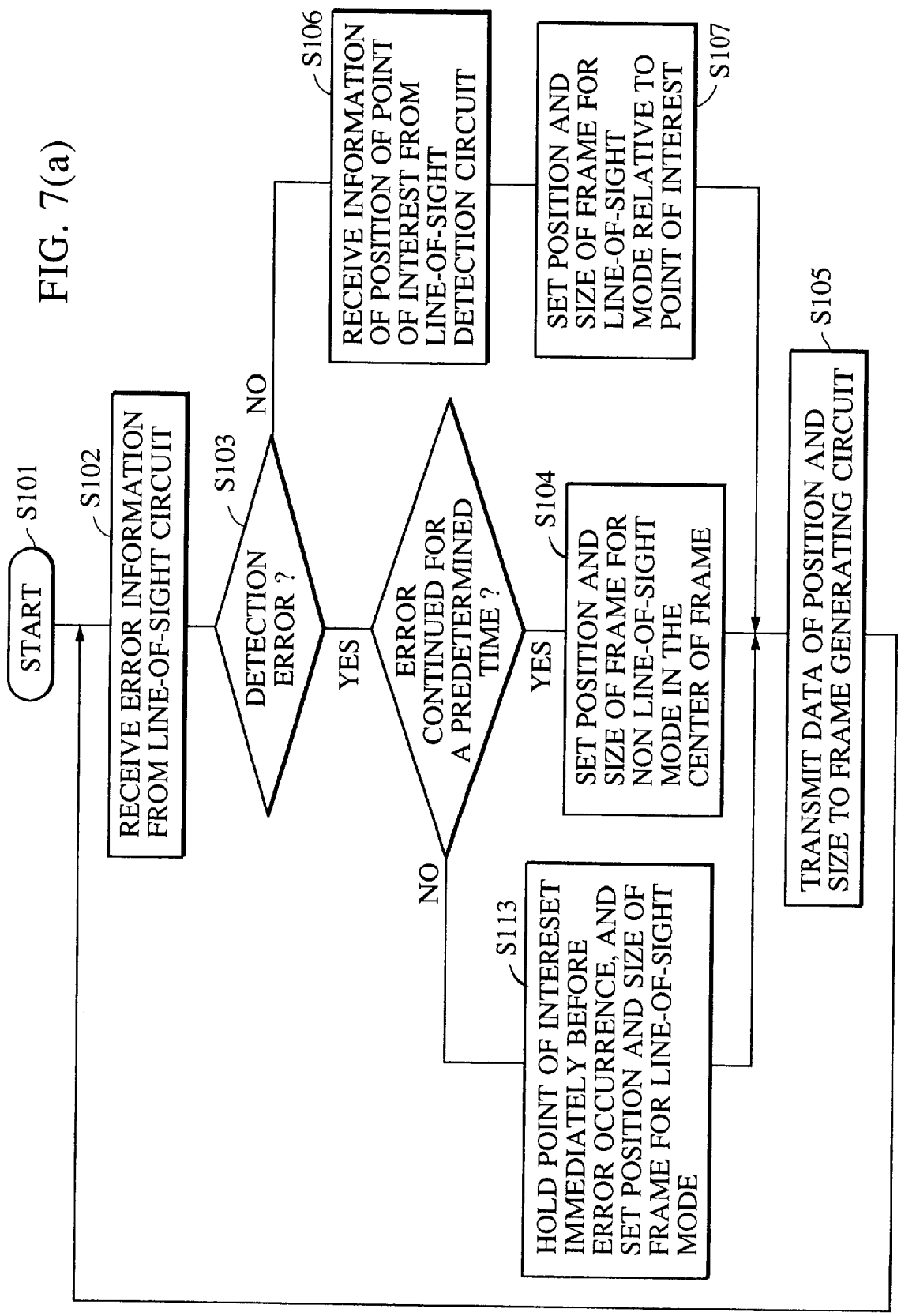
FIG. 7 is a flow chart showing a frame generating operation and an automatic focusing operation according to a third embodiment of the present invention.
Figure 7B:
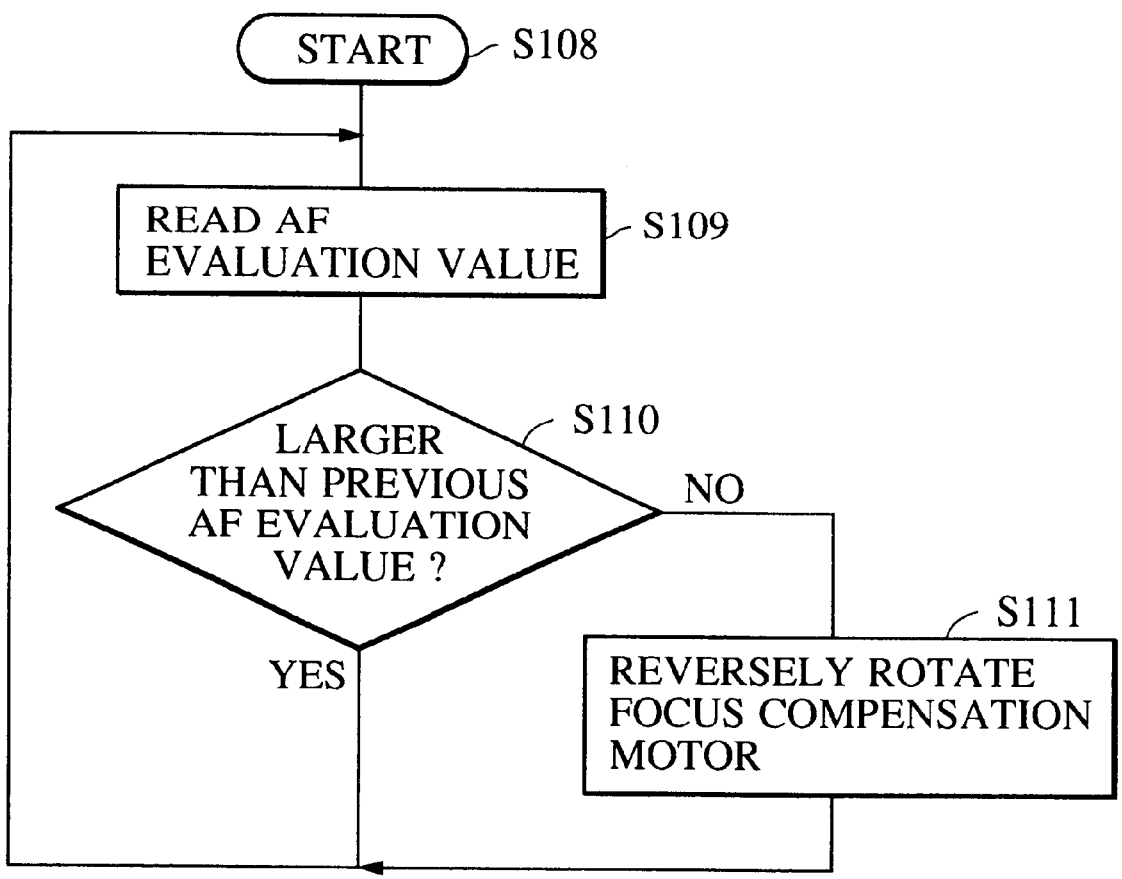

FIG. 7 (*a*) is a flow chart showing the frame generating operation to be performed by the AF microcomputer 29 under each of the foregoing conditions.

When the process starts (step S101), the microcomputer 29 receives line-of-sight detection error information from the line-of-sight detection circuit 6 (step S102) to discriminate whether or not a line of sight detection error has been made (step S103).

If the discrimination in step S103 results in a normal fashion (if no error has been made), position information of the interest point detected by the line-of sight detection circuit 6 is read (step S106) so as to make an interest point 405. In accordance with the information of the position of the interest point, the position and size are set to generate a frame of the focal point detection region/photometry region (step S107). Data of the position and size of the set focal point detection region/photometry region in the frame is supplied to the frame generating circuit 27 (step S105). In accordance with the image signal in the focal point detection region/photometry region, the AF and AE operations are performed, and the focal point detection region/photometry region are displayed.

If the position of the interest point 405 has been moved in the screen, an appointment is made to generate a new focal point detection region/photometry region 403 relative to the moved position.

If a discrimination has been performed indicating that an error in detecting the line of sight has been made in step S103 (if discrimination Yes has been made), the operation shifts to step S112 in which whether or not the error in detecting the line of sight has been made over a predetermined time is discriminated.

If a discrimination has been made in step S112 that the error in detecting the line of sight has been made over a predetermined time (if discrimination Yes has been made), the operation shifts to step S104 in which the focal point detection region/photometry region having a size larger than that at a normal detection of the line of sight is set at a predetermined fixed position 404 in the central portion of the screen as shown in FIG. 4(*b*).

Information about the position and size of the set focal point detection region/photometry region is supplied to the frame generating circuit 27 so as to be set and displayed (step S105). In accordance with the image signal in the focal point detection region/photometry region, the AF and AE operations are performed and the focal point detection region/photometry region is displayed.

If the discrimination in step S112 has been performed such that the error in detecting the line of sight has not occurred over the predetermined time, the coordinates of the position of the interest point immediately before the error occurrence are held so as to be the position coordinates 405 of the focal point detection region/photometry region for the line-of-sight mode. Furthermore, the size of the focal point detection region/photometry region for the line-of-sight is set (step S113). Data of the position and size of the set focal point detection region/photometry region in the screen is supplied to the frame generating circuit 27 (step S105). In accordance with the image signal in the focal point detection region/photometry region, the AF and AE operations are performed and the focal point detection region/photometry region is displayed.

FIG. 7 (*b*) is a flow chart showing the automatic focusing operation.

When the process has been started in step S108, the evaluated focal point value output from the circuit 26 for processing the evaluated AF value is read (step S109) so as to be subjected to a comparison with the evaluated focal point value read previously (step S110).

If the discrimination in step S110 results in the present evaluated focal point value being larger than the previous evaluated focal point value, that is, if the evaluation of the focal point increases, a discrimination is made that the present direction, in which the focus compensating lens is moving, is the correct direction, and the operation returns to step S108 while moving in the direction of the present moving direction to read the next evaluated value of the focal point. That is, a climbing AF operation is performed.

If the discrimination in step S110 has been made that the present evaluated value of the focal point is smaller than the previous evaluated value of the focal point (if No discrimination is made), the direction, in which the focusing lens is moved, is inverted and also the climbing operation is performed (step S111).

As a result of the foregoing operation, the AF operation is performed in a manner such that the evaluated focal point value is made maximum in response to the image signal in the set focal point detection region/photometry region.

Fourth Embodiment

A fourth embodiment of the present invention will now be described.

The structure of the fourth embodiment of the present invention is arranged in such a manner that the region, in which image information is fetched, is determined by an external input means in place of the line-of-sight input. Since the structure of this embodiment is the same as that shown in FIG. 6, the structure of this embodiment is omitted from the description.

The region, which has been fetched by the apparatus 41 for setting the position of the region in which image information is fetched, is processed by the circuit 42 for setting detection of the region so as to be transmitted to the AF microcomputer 29.

In accordance with error information and the time of the error supplied from the circuit 42 for setting detection of the region in which image information is fetched, the AF microcomputer 29 discriminates whether the region indicated by the information supplied from the circuit 42 for setting detection of the region is used, held, or not used. The AF microcomputer 29 transmits information of the position and size of the frame to the frame generating circuit 27, and performs the same control as that according to the third embodiment.

As described above, the apparatus 41 for setting the position of the region, in which image information is fetched, may be a keyboard, mouse, track ball or a joy stick, which are usual input devices for computers.

As described above, according to each of the embodiments, the focal point detection region and the photometry region can be set by a keyboard, mouse, track ball or joy stick. Furthermore, if the input from the external position input makes an error, the final position free from the error is held. If the error continues over a predetermined time, switching to an usual center-fixed range finding and photometry method is performed. An effect is obtained where range finding and photometry at an undesirable and incorrect position for the photographer can be prevented and optimum range finding and photometry can be performed under any photographing condition.

As described above, if an error has been made with the appointing means, the operation state is not immediately changed. If the error ends in a short time, the state of the gate means is maintained on the basis that the information of the set position finally supplied, or rather, the position setting information supplied immediately before is correct. Thus, the system can be stabilized.

Under conditions where the operation for setting the region in which the image signal is extracted easily makes an error because a subject, which changes frequently is photographed, the immediately previous state is maintained if the error ends in a short time. Since the state of the apparatus is not changed, the ease of operation can be improved.

Since the structure is arranged such that the foregoing predetermined region is set at the position of the line of sight detected by the line-of-sight detection means, no response is made to an error ending in a short time period in a case where a line-of-sight detection means easily makes an error inevitably due to scattering of the point of interest or blinking. Therefore, an erroneous operation can be prevented and the apparatus can be stabilized.

Since the appointing means comprises a manual input device, such as a joy stick or a mouse, the setting can be performed freely because the manual means is employed and stability can be improved against error produced due to the manual operation.

Since an adjustment means is provided that detects the photographing state from the image signal in the predetermined region extracted by the gate means to adjust the photographing state in accordance with the result of the detection, the adjustment region of the photographing state can be selected in a state where photographing is being performed. Even if an error has been made and the error is an allowable error because it ends in a short time period, the photographing operation can be continued without interruption.

Since the focal point signal, which changes in accordance with the state of the focal point, is detected from the image signals in the predetermined region to adjust the state of the focal point, an arbitrary subject can be focused in a state where the photographing operation is performed. Therefore, an error in adjusting the focal point can be prevented.

Since the state of exposure is detected among the image signals in the foregoing predetermined region to adjust the state of exposure, the optimum exposure state with respect to an arbitrary subject can be obtained in a state where the photographing operation is performed. Therefore, an error in controlling the exposure occurring due to the error can be prevented.

Since the control means is provided to forcibly move the predetermined region appointed by the appointing means to a predetermined position in the screen regardless of setting performed by the appointing means if the appointing means makes an error in setting the position of the predetermined region for a period longer than a predetermined time, the predetermined region is forcibly fixed to the predetermined position if an error has been made in setting the region, in which image information is fetched, over a predetermined period. Therefore, the image fetching operation can be stabilized.

Since the structure is arranged in such a manner that the predetermined position is brought to the central portion of the screen and the predetermined region is enlarged when it has been moved to the central portion of the screen, and if an error has been made in setting the region in which image information is fetched for a long period, the predetermined region is forcibly moved to the central portion of the screen on the basis that a main subject is usually placed in the central portion of the screen and it is enlarged so that the probability of capturing the main subject is increased. Therefore, the operation for fetching an image can be stabilized and made optimum under any photographing condition.

Since the structure is arranged in such a manner that image signals corresponding to the predetermined region in the photographing screen of the image pickup means are extracted, the apparatus can be stabilized and the ease of operation can be improved if an error has been made under conditions where the operation for setting the region, in which the image signal is extracted, easily makes an error because a subject, which is changed in every minute, is photographed.

Since the predetermined region is set at the position of the line of sight detected by the line-of-sight detection means, unnecessary movement of the region, in which image information is fetched, is inhibited in an accidental case where an error continues for a long time or the eyeball of the photographer is spaced in a case where the line-of-sight detection means is employed with errors that are inevitably produced due to scattering of the point of interest or blinking. Therefore, the position, which has been set, can be stabilized and erroneous operations of the apparatus can be prevented.

Since an adjustment means is provided which detects the photographing state from the image signals in the foregoing predetermined region so as to be adjusted, the adjustment region of the photographing state can be selected during photography. Even if an error has been made, the photographing operation can be continued stably without the necessity of interrupting the photographing operation.

Since the focused state is detected from the image signals in the predetermined region so as to be adjusted, an arbitrary subject can be focused during the photographing operation. Therefore, an error in adjusting the focal point occurring due to an error can be prevented.

Since the state of exposure is detected from image signals in the predetermined region so as to be adjusted, an optimum exposure state with respect to an arbitrary subject can be obtained during the photographing operation. Therefore, an error in controlling the exposure occurring due to an error can be prevented.

Since the structure is arranged in such a manner that if an error continuing shorter than a predetermined time has been made during the operation of setting the position of the predetermined region, then the predetermined region is maintained at the state immediately before the error. Furthermore, if an error continuing over a predetermined time has been made, the predetermined region is forcibly moved to a predetermined position in the screen. Therefore, even if an error has been produced, the operation state is not changed immediately. If the error ends in a short time, the state of the gate means is maintained on the basis that the final information of the set position immediately before is correct, such that the apparatus is stabilized. If an error has been made in setting the region in which image information is fetched, for a long time, the predetermined region is forcibly fixed to a predetermined position. Therefore, the image fetching operation can be stabilized.

According to the foregoing embodiments, if an error has been made with the external position input-positionlimiting method adapted to the external input-positionlimiting range finding and photometry method, such as detection of the line of sight, the final position free from the error is held in case where the error ends in a predetermined time. If the error continues over the predetermined time, switching is performed to an usual center-fixed range finding and photometry method. Therefore, range finding and photometry at an incorrect position, that is a position not desired by the photographer are not performed. Thus, an effect can be obtained where optimum range finding and photometry can be performed under any photographing condition.

Fifth and Sixth Embodiments

Fifth and sixth embodiments of the present invention will now be described.

It is preferable that an image-signal fetching apparatus for changing the region, in which an image signal in the range finding and photometry regions is fetched, by a change in information input means be arranged in such a manner that the region to be fetched is stable at a predetermined position in a case where an user appoints one point and the region to be fetched is quickly moved to a new position appointed by the user if the user has appointed the different position.

However, although a photographer pays attention to one point, the position of the detected line of sight usually moves due to blinking or involuntary movement of the line of sight.

As a result, the region to be fetched always moves and therefore is unstable although the photographer appoints one point. The foregoing phenomenon is very unpleasant for the photographer who is observing the finder and the photographer must carefully stabilize the region to be fetched.

Accordingly, the fifth and sixth embodiments of the present invention are arranged to overcome the foregoing problems. An object of these embodiments is therefore to improve an image-signal fetching apparatus of a type having an arrangement that the region, in which image information is fetched, can be changed by a change in information input means for changing the region in which image signals are fetched, the improvement being intended to stabilize the region to be fetched.

The apparatus according to the fifth embodiment comprises an image fetching means for fetching image signals corresponding to the inside of a predetermined range in the screen; a range setting means for changing the range in the screen; an appointing means for appointing change of the range in the screen; and a control means which controls the range setting means in accordance with information about the change of the range output from the appointing means and which inhibits the change of the range by the range setting means if the information items for changing the range output from the appointing means are not the same for a predetermined number of times. The structure, where the information items for changing the position of the region in the screen are not the same for a predetermined number of times, inhibits change of the region in which image information is fetched to prevent scattering of the change information input means, and an erroneous setting of the region to be fetched occurring due to noise and vibrations. Therefore, the operation for setting the region to be fetched and the updating operation can be stabilized.

An apparatus according to the sixth embodiment comprises a display means for displaying an image signal in the screen; an image fetching means for fetching image signals that correspond to the inside of the predetermined range in the screen; a range setting means for changing the range in the screen; an appointing means for appointing change of the range in the screen; and a control means which controls the range setting means in accordance with the range change information output from the appointing means and in which if the range change information items output from the appointing means are not the same for a predetermined number of times for a predetermined time, the control means inhibit the change of the region.

As a result, if change information items for changing the set position of the region in the screen are not the same for a predetermined number of times, then the change of the region, in which the image is fetched, is inhibited. Therefore, scattering of the change information input means and, erroneous setting of the region to be fetched occurring due to noise and vibrations can be prevented. Since the updating is performed under conditions where changes are performed by a number larger than a predetermined number of times for a predetermined period, intermittent information about the change, such as noise is present among a plurality of sampling operations, and can be accepted. Therefore, the influence of noise can be prevented satisfactorily and a significant stabilization effect can be produced.

The fifth embodiment of the present invention will now be described.

This embodiment has a structure in which the AF operation is inhibited during movement of the region to be detected, such as the region, in which the focal point is detected, so that an erroneous AF operation occurring due to undesirable focusing to an image of a subject is prevented and the AF operation is restarted after the position of the region to be detected has been determined.

Figure 8A:
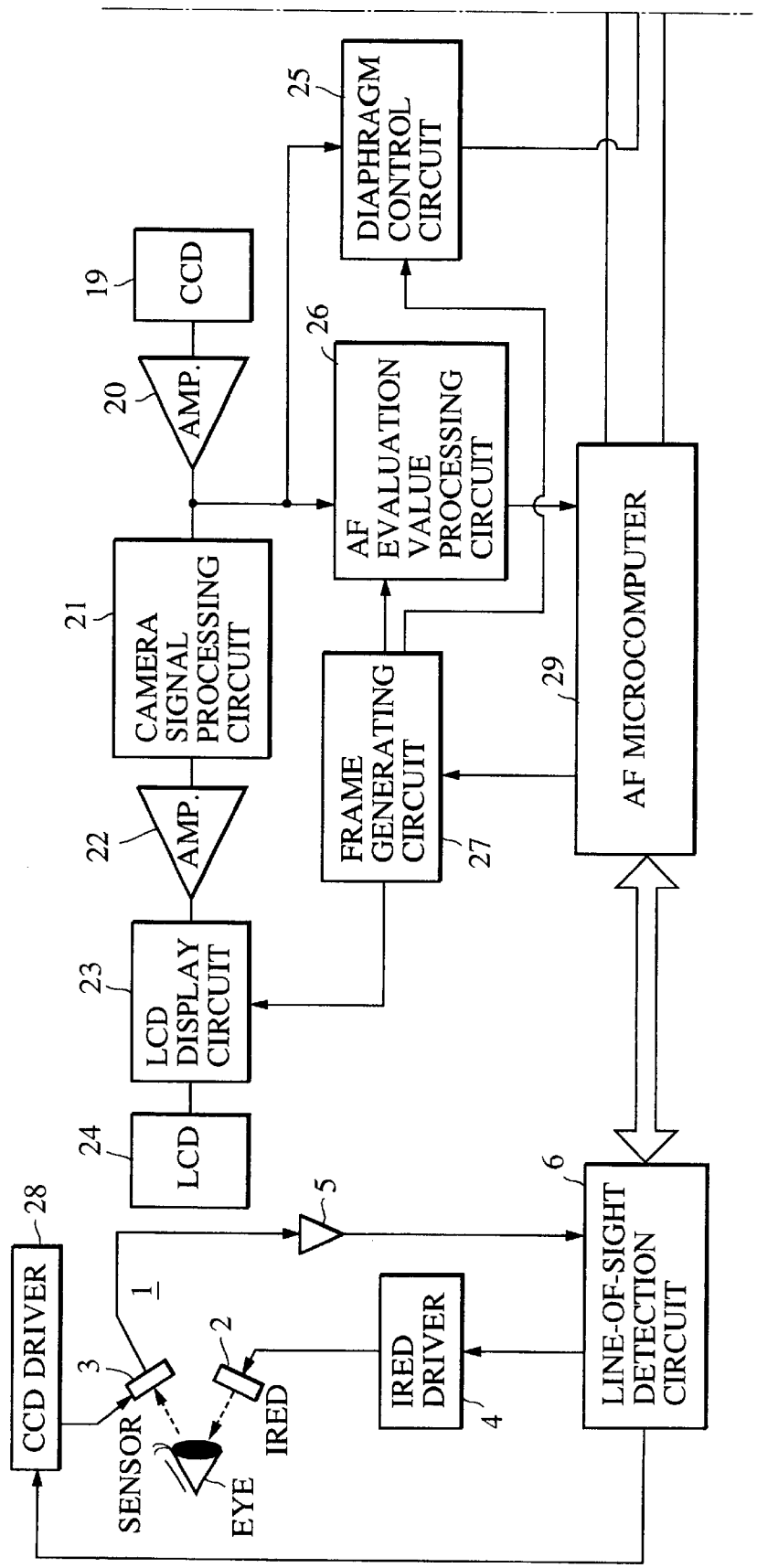
FIG. 8 is a block diagram showing the structure of a fifth embodiment of the present invention.
Figure 9:
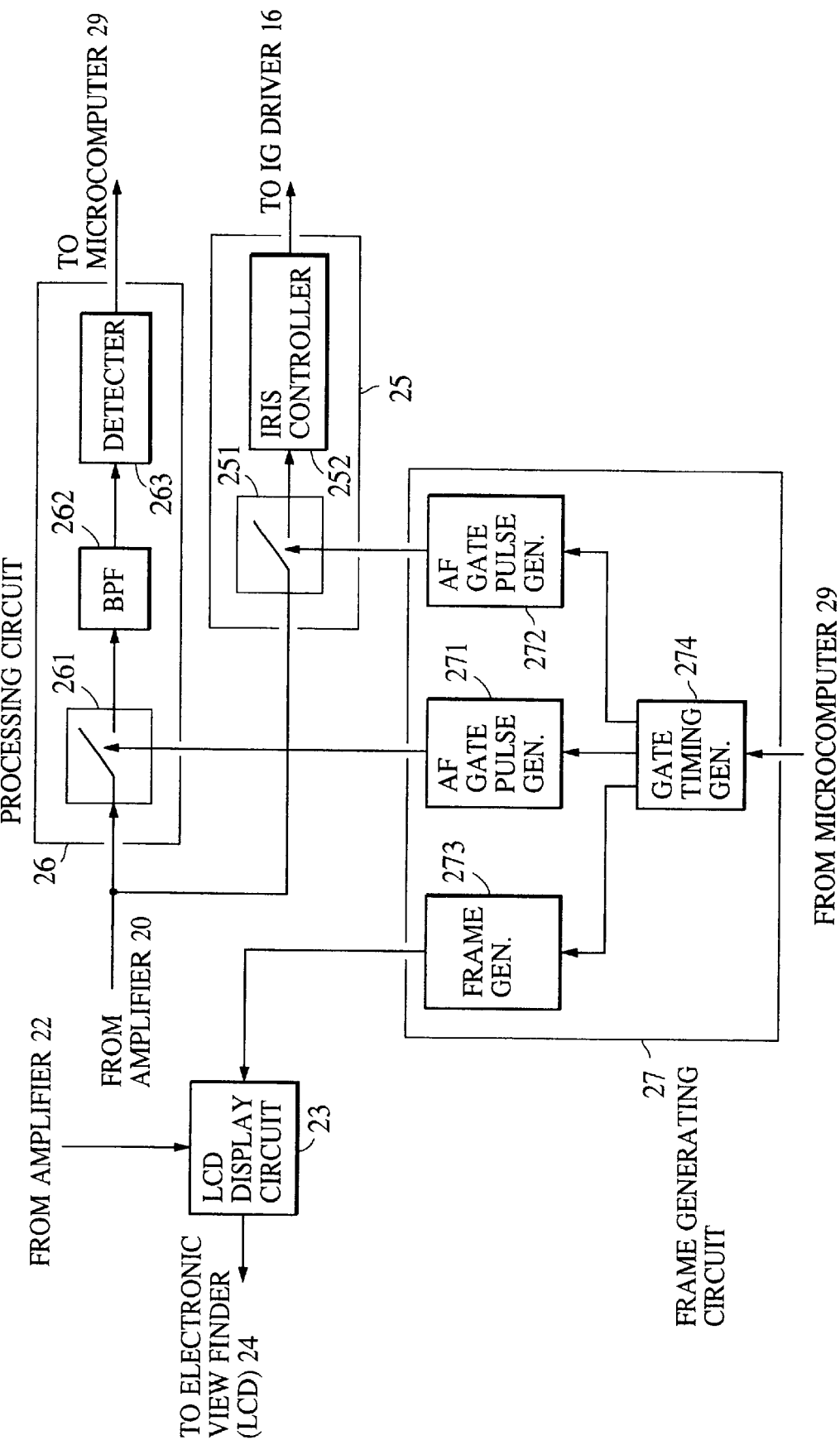
FIG. 9 is a block diagram showing the structure and operation of a diaphragm control circuit 25, a circuit 26 for processing an evaluated AF value, and a frame generating circuit 27 shown in FIG. 8.

The overall structure of the system is shown in FIG. 8, while the structure of the frame generating circuit is shown in FIG. 9. Although the switch 28 for turning on/off the frame display is omitted in FIGS. 1 and 3, the processing algorithm performed by the AF microcomputer 29 differs substantially.

Also the structure of the line-of-sight detection block and the internal structure of the frame generating circuit 27 are basically the same as those shown in FIGS. 2 and 3.

Reference numeral 29 represents a control microcomputer (hereinafter called an "AF microcomputer") which controls the focus compensating lens in response to the output signal from the circuit 26 for processing the evaluated AF value and on the basis of the movement of the magnification-varying lens 9. Microcomputer 29 also performs focusing and corrects the focus at the time of varying the magnification and controlling the frame generating circuit 27 to change the positions of the focal point detection region and the photometry region in the screen on the basis of information about the detected line of sight to be described later.

The AF microcomputer 29 controls the line-of-sight detection circuit 6, receives information about the position of the line of sight of the operator from the line-of-sight detection circuit 6, moves the focal point detection region and the photometry region, and performs another control using the detected line of sight.

The process to be/performed by the AF microcomputer 29 will now be described sequentially.

Figure 10A:
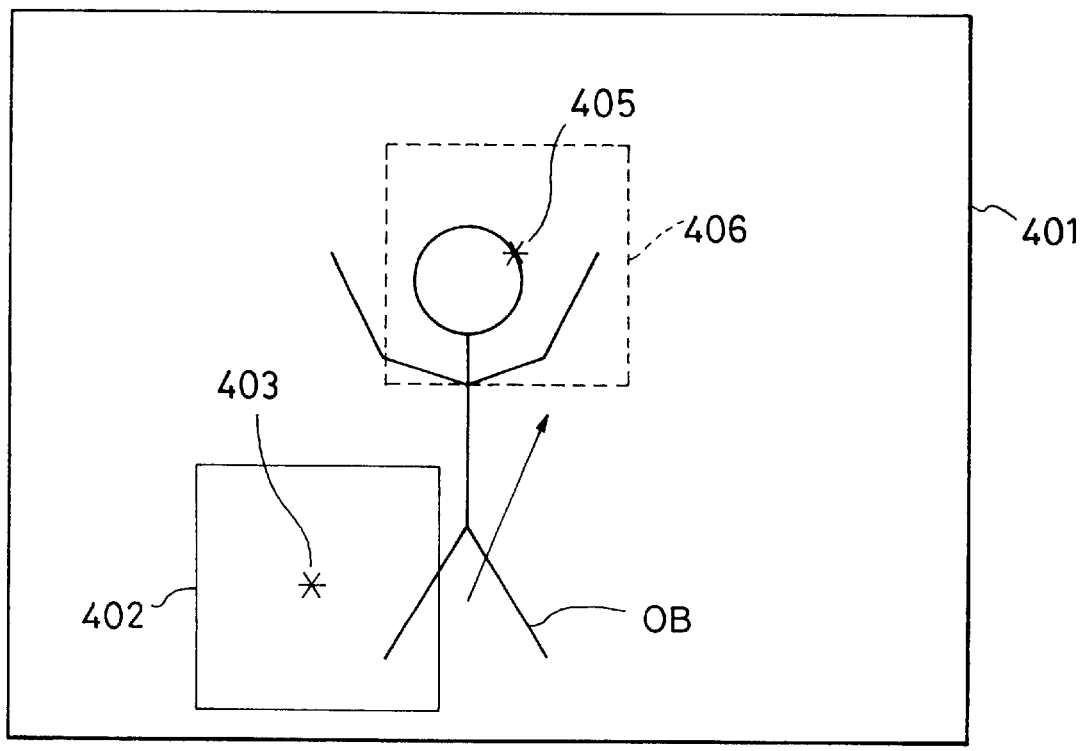
FIG. 10 is a diagram showing display of a fetched region, such as the focal point detection region or the photometry region.
Figure 10B:
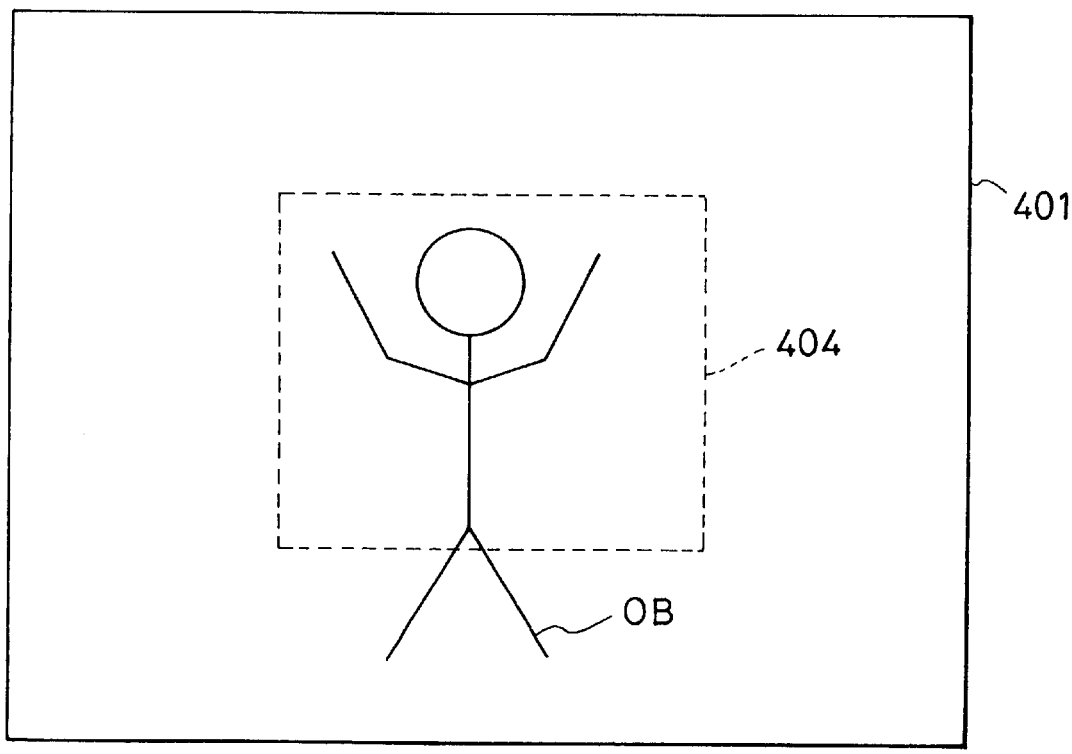

FIG. 10 (b) is a diagram showing an example of a conventional region in which the evaluated AF value is fetched. Referring to FIG. 10 (b), reference numeral 401 represents a frame to be photographed, and 404 represents a region, in which the focal point is detected, for fetching the evaluated AF value (it may be a photometry region).

Photographers usually perform photography while placing a subject to be photographed (the main subject) at the central portion of the frame. Furthermore, the influence of another subject is prevented when a main subject is photographed by narrowing the region, in which the evaluated value is fetched, than the overall frame to be photographed as described above. Therefore, the region to be fetched is fixed at the central portion of the screen as indicated by a reference numeral 404.

However, the photographer does not always photograph a subject while fixing the main subject at the central portion of the frame. In order to photograph a main subject which is not placed in the central portion of the frame, the region to be fetched must be moved on the frame to be photographed.

Accordingly, referring to FIG. 8, coordinates of the position of the region to be fetched are transferred to the frame generating circuit 27 in order to move the region in the screen to be fetched to the position observed by the photographer on the basis of information of the coordinates of the position of the line of sight transferred from the line-of-sight detection circuit 6 to the AF microcomputer 29.

In the frame generating circuit 27, the region to be fetched is moved to the appointed position by controlling the timing to open/close the gate circuit in the circuit 26 for processing the evaluated AF value. Furthermore, the portion corresponding to the region to be fetched is displayed on the electronic view finder 24 by transferring a display signal indicating the region to be fetched to the LCD display circuit 23.

In the LCD display circuit 23, the image pickup signal from the amplifier 22 and a region display signal from the frame generating circuit 27 are superimposed to transfer an image signal to the electronic view finder 24. A state of the image displayed on the electronic view finder 24 at this time is shown in FIG. 10 (a).

Referring to FIG. 10 (a), reference numeral 403 represents the present position of the viewpoint of a photographer. A region 402 is set relative to the foregoing position, and the microcomputer 29 controls the gate circuit 261 of the circuit 26 for processing the evaluated AF value and the gate circuit 251 in the diaphragm control circuit 25 through the frame generating circuit 27. Furthermore, a region 402 to be fetched is displayed as shown in FIG. 10 (a).

Assuming that the viewpoint of the photographer has been moved to a position 405 in the screen, a region 406 to be fetched is set relative to the viewpoint 405 by a similar method. Thus, the display of the region 402 to be fetched is moved to a position of the region 406 relative to the viewpoint 405.

As a result of employment of the foregoing method, a subject which is being observed by a photographer can be focused. In this case, it is preferable that exposure be performed with respect to the subject, which is being observed by the photographer, as well as performing focusing.

According to the present invention, the frame generating circuit 27 transfers a signal for setting the region to be fetched to the diaphragm control circuit 25 as shown in FIGS. 8 and 9. As a result, the AF and AE operations can be performed such that the region, in which photometry information is fetched (the photometry region), is moved to the position which is being observed by the photographer and the exposure can be adjusted on the basis of the photometry information about the portion.

The characteristics of the present invention will now be described. The position of the line of sight detected by the line-of-sight detection circuit 6 is, as described above, supplied to the AF microcomputer 29. Information of the coordinates of the central position and the size (the width) of the region for forming the focal point detection region and the photometry region on the basis of the coordinates of the position of the point of interest is supplied to the frame generating circuit 27.

According to the present invention, the information of the coordinates of the position of the point of interest detected by the line-of-sight detection circuit 6 is not supplied to the frame generating circuit 27 as it is. The coordinates of the position of the point of interest that is output from the line-of-sight detection circuit 6 at a predetermined line-of-sight detection cycle are subjected to a calculation process as follows to remove factors such as, scattering and noise, which cause erroneous operation. Then, the region to be fetched is determined and output to the frame generating circuit 27. The foregoing process will now be described with reference to FIGS. 11 and 12.

Figure 11A:
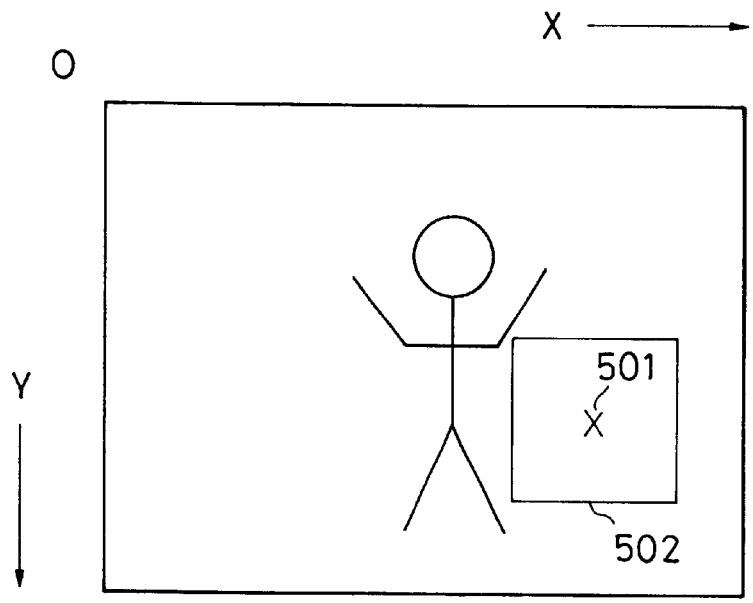
FIG. 11 is a diagram showing the coordinates of the detected line of sight, the central coordinates of the focal point detection region and the photometry region, and setting of the fetched region.
Figure 11B:
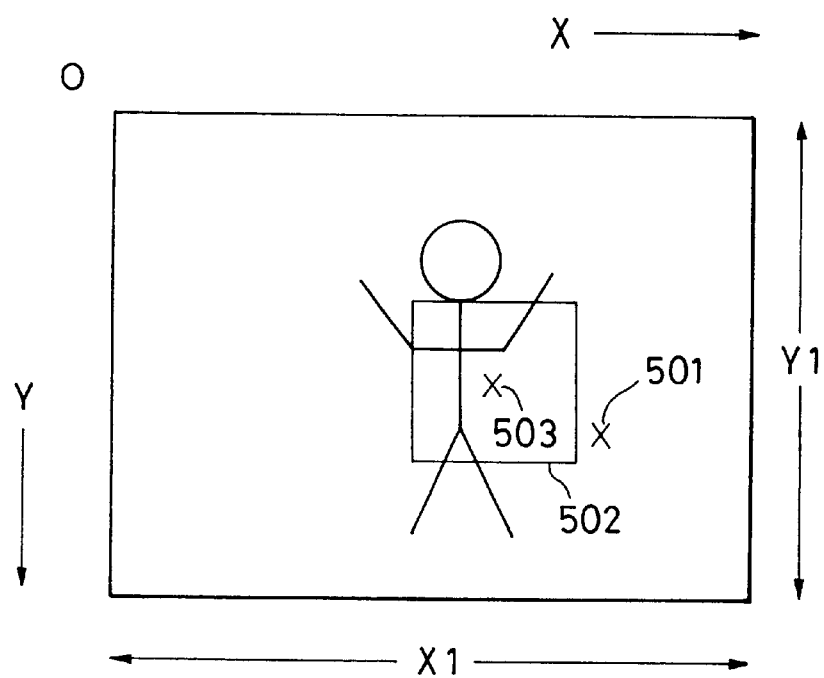

FIG. 11 (a) shows a screen displayed on the electronic view finder 24. The line-of-sight detection circuit 6 detects the point of interest on the screen, that is, the position of the line of sight. The position is indicated such that the upper left position of the screen is made to be the origin point, where the coordinates of the horizontal positions are indicated by the X-axis with the right portion being made positive, and the coordinates of the vertical positions are indicated by Y-axis with the lower portion is made to be positive. Thus, coordinates 501 (X, Y) are set.

The AF microcomputer 29 causes the frame generating circuit 27 to determine the region to be fetched, the center of the region to be fetched being indicated by the coordinates 501 (X, Y).

The AF microcomputer 29 supplies the coordinates 501 (X, Y) and information of the "width" indicating the size of a predetermined region to be fetched as exemplified by square 502 shown in FIG. 11 such that the frame generating circuit 27 sets the region to be fetched.

The frame generating circuit 27 also supplies a display signal for displaying the frame of the square 502 to the LCD display circuit 23 so as to be displayed on the electronic view finder 24. As a result, the focal point detection region and the region to be fetched by the photometry circuit are superimposed on the image signal so as to be displayed and visually recognized by the photographer.

The characteristic of the present invention will now be described with reference to FIG. 11 (b).

FIG. 11 (b) is a display screen on the electronic view finder 24 similarly to FIG. 11 (a) and employing the same coordinate system. In the present invention, the position of the detected line of sight is not made to be the center of the region to be fetched as shown in FIG. 11 (a) but the coordinates 501 (X, Y) detected by the line-of-sight detection circuit 6 are subjected to a process to be described later by the AF microcomputer 29 as shown in FIG. 11 (b). As a result, a region to be fetched can be set relative to a position

503 (Xg, Yg) which is different from the coordinates 501 (X, Y) to cause the frame generating circuit 27 to set a region to be fetched. The foregoing process may be performed by the line-of-sight detection circuit 6 in place of the AF microcomputer 29.

FIG. 12 is a flow chart of a process for determining a region to be fetched by the AF microcomputer 29 on the basis of information on the position of the line of sight detected by the line-of-sight detection circuit 6. The process shown in this flow chart is performed once at each sampling cycle of detecting the line of sight.

Referring to FIG. 12, when the process is started, the coordinates (X, Y) of the line of sight detected previously are stored into variable (X1, Y1) in step S201.

In step S202, the coordinates (X, Y) of the detected line of sight output from the line-of-sight detection circuit 6 are fetched. In step S203, a discrimination is performed whether or not the present coordinate X of the detected line of sight and the coordinate Xi of the line of sight detected previously are larger than the coordinate Xg of the central portion of the present fetched region.

If an affirmative discrimination (Yes) has been made in step S203, the process in step S205 is performed to set the present coordinate X of the detected line of sight to the coordinate Xg of the central portion of the fetched region. Then, the operation proceeds to step S206. If a negative discrimination (No) has been made, the operation proceeds to step S204 in which a discrimination is performed whether or not the present coordinate X of the detected line of sight and the coordinate X1 of the line of sight detected previously is smaller than the coordinate Xg of the central portion of the present fetched region.

If an affirmative discrimination (Yes) has been made in step S204, the coordinate X of the detected line of sight is set to the coordinate Xg of the central portion of the fetched region, and the operation proceeds to step S206.

If a negative discrimination (No) has been made in step S204, the operation proceeds to step S206.

In step S206, a discrimination is performed whether or not both the present coordinate Y of the detected line of sight and the coordinate Y1 of the line of sight detected previously are larger than the present coordinate Yg of the central portion of the fetched region.

If an affirmative discrimination (Yes) has been made in step S206, the operation proceeds to step S208 in which the present coordinate Y of the detected line of sight is set to the coordinate Yg of the central portion of the fetched region, and the operation proceeds to step S209.

If a negative discrimination (No) has been made in step S206, the operation proceeds to step S207 in which a discrimination is made whether the present coordinate Y of the detected line of sight and the coordinate Y1 of the line of sight detected previously are smaller than the present coordinate Yg of the central portion of the fetched region.

If an affirmative discrimination (Yes) has been made in step S207, the present coordinate Y of the detected line of sight is set to the coordinate Yg of the central portion of the fetched region, and the operation proceeds to step S209. If a negative discrimination (No) has been made in step S207, the operation proceeds to step S209.

Then, in step S209 coordinates (Xg, Yg) of the central portion of the fetched region and information of the width of the fetched region, or size, are supplied to the frame generating circuit 27.

The frame generating circuit 27 produces a fetching gate timing signal and controls the gate circuit 261 in circuit 26 for processing the evaluated AF value so as to receive a focal-point signal corresponding to the inside other focal point detection region. The frame generating circuit 27 controls the gate circuit 251 in the diaphragm control circuit 25 to receive the photometry signal corresponding to the photometry region. Furthermore, the frame generating circuit 27 operates the LCD display circuit 23 to display the fetched region, that is, the focal point detection region and the photometry region on the screen of the electronic view finder 24.

As can be understood from the description of the process above, the coordinates (Xg, Yg) of the central portion of the fetched region are set in such a manner that the coordinates (Xg, Yg) of the central portion of the fetched region are updated only in a case where both X-coordinate and Y-coordinate of the previous and present positions of the detected line of sight are larger or smaller than the present coordinates (Xg, Yg) of the central portion of the fetched region. If the previous position of the detected line of sight and the present position of the detected line of sight are present in the different directions, the present coordinates (Xg, Yg) of the central portion of the fetched region are not updated.

That is, only in the case where the coordinates of the detected line of sight are changed with respect to the coordinates of the central portion of the present fetched region two times consecutively in the same direction, the appointment of the change is considered to be right and the coordinates (Xg, Yg) of the central portion of the fetched region are updated. If the change is not performed two times consecutively, the change is considered to be an erroneous detection due to scattering of the line of sight of the photographer, blinking, or noise and is considered nonreliable. Thus, updating of the present position of the central coordinates is inhibited.

As a result, the undesirable movement of the regions to be fetched, such as the focal point detection region and the photometry region, due to scattering of the line of sight of photographer, blinking or noise can be prevented. Thus, control of the focal point, exposure, and display of the region in the screen can be stabilized.

Although two changes of the detected line of sight must be consecutively performed in this embodiment to change the central coordinates of the fetched region, the number of times is not limited two. The number of times may be changed appropriately to be adaptable to the design factors, such as the cycle of sampling the detected line of sight performed by the line-of-sight detection circuit 6 and the angle field of the finder screen.

Sixth Embodiment

A sixth embodiment of the present invention will now be described. The structure of this embodiment is the same as that according to the fifth embodiment except the algorithm for changing the central coordinates of the fetched region is based on the coordinates of the position of the detected line of sight output from the line-of-sight detection circuit 6 which is processed in the AF microcomputer 29.

FIG. 13 shows a flow chart of a process for changing the coordinates of the central portion of the fetched region on the basis of a plurality of coordinates of the position of the line of sight output from the line-of-sight detection circuit 6, and the process being performed by the microcomputer 29. The process of the flow chart is repeated once at each sampling cycle of the detection of the line of sight.

Referring to FIG. 13, when the process is started, the coordinates (X1, Y1) of the line of sight detected two times prior are saved in the parameter (X2, Y2) and the previous coordinates (X, Y) of the detected line of sight are saved in the parameter (X1, Y1) in step S301.

In step S302, the coordinates (X, Y) of the detected line of sight are fetched from the line-of-sight detection circuit 6. In step S303, a discrimination is made whether or not two or more coordinates among the present coordinate X of the detected line of sight, the previous coordinate X1 of the detected line of sight and the coordinate X2 of the line of sight detected two times prior are larger than the coordinate Xg of the central portion of the present fetched region.

If an affirmative discrimination (Yes) has been made in step S303, the present coordinate X of the detected line of sight is set to the coordinate Xg of the central portion of the fetched region in step S305 so as to update. The operation then proceeds to step S306.

If a negative discrimination (No) has been made in step S303, the operation proceeds to step S304 in which a discrimination is made whether or not two or more coordinates among the present coordinate X of the detected line of sight, the previous coordinate X1 of the detected line of sight, and the coordinate X2 of the line of sight detected two times prior are smaller than the coordinate Xg of the central portion of the present fetched region.

If an affirmative discrimination (Yes) has been made in step S304, the present coordinate X of the detected line of sight is set to the coordinate Xg of the central portion of the fetched region to be updated in step S305, and the operation proceeds to step S306.

If a negative discrimination (No) has been made in step S304, the operation proceeds to step S306.

In step S306, a discrimination is made whether or not two or more coordinates among the present coordinate Y of the detected line of sight, the previous coordinate Y1 of the detected line of sight, and the coordinate Y2 of the line of sight detected two times prior are larger than the coordinate Yg of the central portion of the present fetched region.

If an affirmative discrimination (Yes) has been made in step S306, the operation proceeds to step S308 in which the present coordinate X of the detected line of sight is set to the coordinate Yg of the central portion of the fetched region so as to update, and the operation proceeds to step S309.

If a negative discrimination (No) has been made in step S306, the operation proceeds to step S307 in which a discrimination is made whether or not two or more coordinates among the present coordinate Y of the detected line of sight, the previous coordinate Y1 of the detected line of sight, and the coordinate Y2 of the line of sight detected two times prior are smaller than the coordinate Yg of the central portion of the present fetched region.

If an affirmative discrimination (Yes) has been made in step S307, the present coordinate Y of the detected line of sight is set to the coordinate Yg of the central portion of the fetched region to be updated in step S305. The operation then proceeds to step S309.

If a negative discrimination (No) has been made in step S307, the operation proceeds to step S309. Then, the determined coordinates (Xg, Yg) of the central portion of the fetched region and information about the size (the width) of the fetched region are transferred to the frame generating circuit 27 in step S308.

The frame generating circuit 27 produces a fetching gate timing signal and controls the gate circuit 261 in circuit 26 for processing the evaluated AF value so as to receive a focal-point signal corresponding to the inside or the focal point detection region. The frame generating circuit 27 controls the gate circuit 251 in the diaphragm control circuit 25 to receive the photometry signal corresponding to the photometry region. Furthermore, the frame generating circuit 27 operates the LCD display circuit 23 to display the fetched region, that is, the focal point detection region and the photometry region, on the screen of the electronic view finder 24.

As can be understood from the description of the process above, the coordinates (Xg, Yg) of the central portion of the fetched region are set in such a manner that only when both X and Y coordinates of the position of the detected line of sight are larger or smaller than the present coordinates (Xg, Yg) of the central portion of the fetched region two or more times among three cycles of the processing periods of the flow chart, the coordinates (Xg, Yg) of the central portion of the fetched region are updated to the latest position in the direction detected two or more times.

That is, information detected two or more times among the three cycles is considered to be reliable, namely, a majority decision algorithm is employed.

That is, only in the case where the coordinates of the detected line of sight are changed with respect to the coordinates of the central portion of the present fetched region two times in the same direction, is the appointment of the change considered to be correct and the coordinates (Xg, Yg) of the central portion of the fetched region are updated. If the number of times of change is two or less, the change is considered to be an erroneous detection due to scattering of the line of sight of the photographer, blinking, or noise and is considered non-reliable. Thus, updating of the present position of the central coordinates is inhibited.

As a result, the undesirable movement of the regions to be fetched, such as the focal point detection region and the photometry region, due to the scattering of the line of sight of the photographer, blinking, or noise can be prevented. Thus, control of the focal point, exposure, and the display of the region in the screen can be stabilized.

Although the number of times at which the positions of the detected lines of sight are the same and which is required to change the coordinates of the central portion of the fetched region is arranged to be two or more times among the three execution cycles of the flow chart, the number of times is not limited to the two times. The number of times may be changed appropriately to be adaptable to the design factors, such as the cycle of sampling the detected line of sight performed by the line-of-sight detection circuit 6 and the angle field of the finder screen.

Although the foregoing embodiment has the structure in which the focal point detection region and the photometry regions are formed by the common gate pulse, the two region may be individually supplied with the gate pulses so that the size and the position are independently set.

As described above, according to the foregoing embodiment, if information items for changing the position of the region in which image information is fetched are not consecutively the same by a predetermined number of times, the change of the region in which image information is fetched is inhibited. Thus, by scattering the means for inputting information about the change, erroneous setting of the region to be fetched due to noise and vibration of the fetched region can be prevented. As a result, setting of the region to be fetched and the updating operation can be stabilized.

Since the regions to be fetched, such as the focal point detection region and the photometry region, are displayed on the screen, the fetched region can easily be confirmed. Furthermore, vibration of the display can be prevented and the display can be stabilized.

If the result of the detection may possibly be an error due to scattering of the line of sight, blinking of the photographer or noise and therefore the result is not reliable, updating of the coordinates of the present central portion is inhibited. Therefore, undesirable movement of the regions to be fetched, such as the focal point detection region and the photometry region, due to scattering of the line of sight, blinking of the photographer, and noise can be prevented. As a result, the control of the focal point and that of the exposure and display of the region on the screen can be stabilized.

If information items for changing the position of the region in which image information is fetched in the screen are not consecutively the same by a predetermined number of times, change of the region in which image information is fetched is inhibited. Thus by scattering the means for inputting information about the change, erroneous setting of the region to be fetched occurring due to noise and vibration of the fetched region can be prevented. As a result, setting of the region to be fetched and the updating operation can be stabilized. Since updating is performed under condition that the changes are performed by a number larger than a predetermined number of times for a predetermined period, intermittent information about the change, such as a fact that noise is present among a plurality of sampling operations, can be accepted. Therefore, influence of noise can be prevented satisfactorily and a significant effect can be produced in stabilization.

By displaying, on the screen, the focal point detection region and the photometry region, the fetched region can easily be confirmed and vibration of the display can be prevented. Thus, the display can be stabilized.

If the result of the detection may possibly be an error due to scattering of the line of sight, blinking of the photographer, or noise, and therefore the result is not reliable, updating of the coordinates of the present central portion is inhibited. Therefore, undesirable movement of the regions to be fetched, such as the focal point detection region and the photometry region, due to scattering of the line of sight and blinking of the photographer and noise, can be prevented. As a result, the control of the focal point and that of the exposure and display of the region on the screen can be stabilized. Thus, the fetched region can be stabilized.

Seventh Embodiment

A seventh embodiment of the present invention will now be described.

This embodiment has a structure in which the display on the screen is appropriately changed between a period in which an area setting means for detecting the line of sight or the like is operated as described above and a period in which an area setting means for fixing the area at a predetermined position is operated. As described above, it is usually convenient to change the fetched region by the line-of-sight detection apparatus in such a manner that the region is displayed in the finder screen. If the fetched region is fixed, it is preferable to omit the display of the region in order to prevent the finder screen from being complicated.

However, an apparatus selectively having the foregoing functions has not been available. Even if an apparatus comprising a switch or the like to selectively employ either of the two functions is created, a switching operation must be performed whenever the function is switched, causing ease of operation to deteriorate.

Even if the function for detecting the line of sight or the like has been selected and the region is being displayed, the display of the region is not required after the fetched region has been determined as long as the position of the fetched region has not changed again. If the display is continued, a problem arises in that the finder screen cannot easily be observed.

Assuming that a so-called joy stick, mouse or the like is used as the input device for use in place of the line-of-sight detection apparatus, the position of the fetched region must be displayed and the state of the movement must be administrated whenever the display is performed in a case where the amount of relative movement from the present position of the fetched region is detected to determine the next position of the fetched region. Since the line-of-sight position detection means is a means for detecting the absolute position in the finder, the necessity of displaying the appointed position on the screen can be eliminated if the line of sight position detection system has a satisfactory accuracy. The display raises a problem that the finder screen is complicated.

Accordingly, this embodiment provides an image information processing apparatus which is capable of overcoming the foregoing problems where the region in which image information is fetched can be moved by an operator. The image information processing apparatus being characterized is that the monitor screen for monitoring the state of the image is prevented from being complicated and the region in which image information is fetched is displayed on the monitor if necessary.

In order to achieve the foregoing result, this embodiment has a structure comprising an image input means for inputting image information; a display means for displaying the image information input by the image input means; an image information fetching means for fetching the input image information corresponding to the inside region in the screen; a region control means for changing the position of the predetermined region in the screen; a region fixing means for fixing the position of the predetermined region in the screen; a selection means for selectively operating the region control means or the region fixing means; and a display control means for supplying a signal indicating the state of the predetermined region to the display means to superimpose it on the image information and display if the region control means is selected by the selection means and for inhibiting the supply of the signal indicating the state of the predetermined region to the display means if the region fixing means is selected. As a result, only in a case where the position must be confirmed to change the position of the predetermined region, is the region displayed while being superimposed on the input image information. In a case where the position of the predetermined region is not changed and therefore the confirmation of the position is not required, the display of the region is not performed. Thus, the Ncreen can be prevented from being complicated.

Figure 14A:
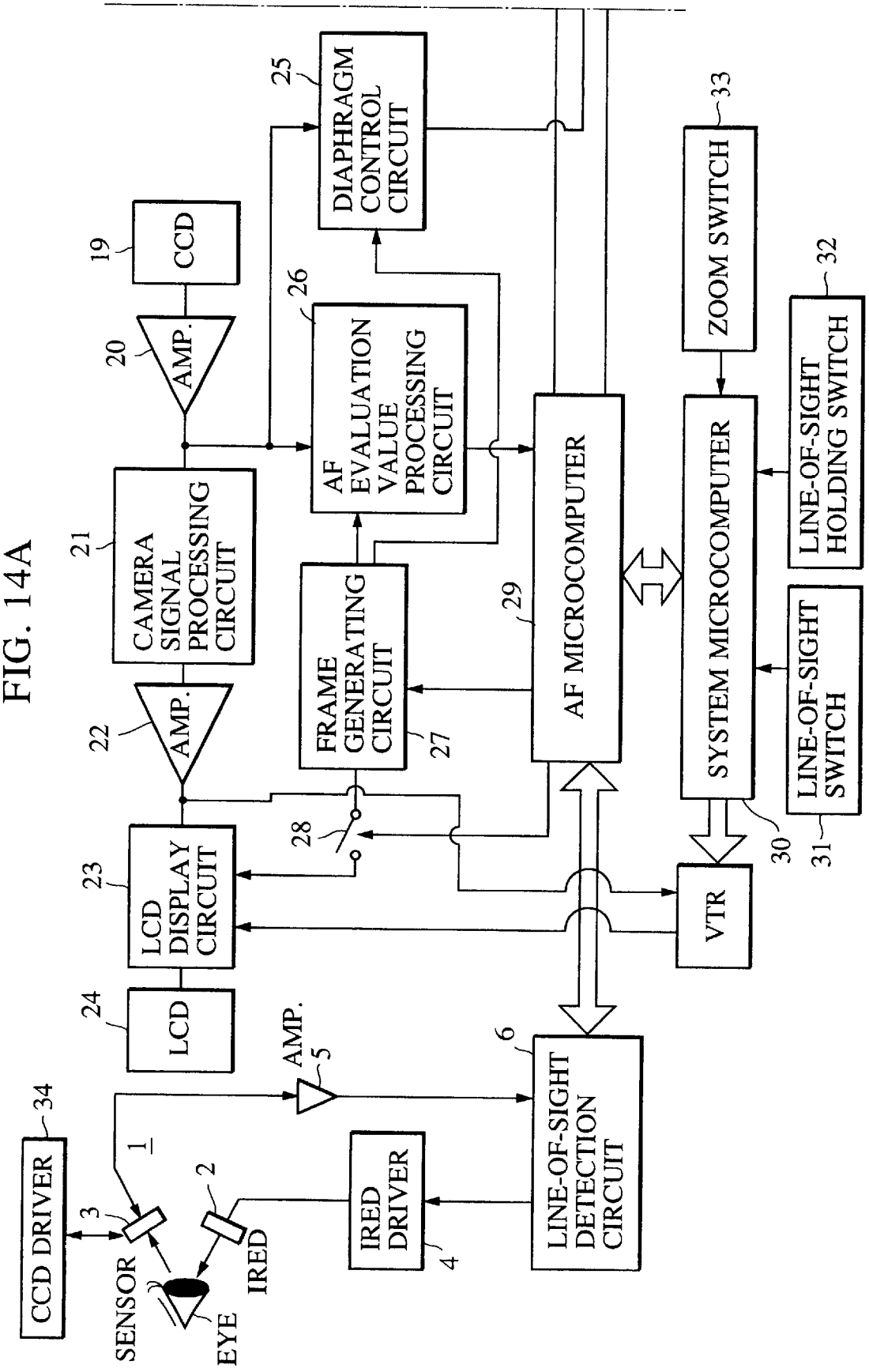
FIG. 14 is a block diagram showing a seventh embodiment in which the present invention is applied to a camera having a video tape recorder integrated therewith.

Referring to FIG. 14, the basic structure is the same as that according to the first embodiment shown in FIGS. 1 to 3 and therefore only the different portions will now be described to prevent repetition. Referring to FIG. 14, reference numeral 30 represents a microcomputer for controlling the system (hereinafter called a "system microcomputer") for totally controlling the system of a camera having a video tape recorder integrated therewith. Reference numeral 31 represents a line-of-sight switch unit for selecting a line-of-sight detection control mode in which the position of the line of sight is detected by the lineof-sight detection circuit 6 to move the region in which image information is fetched, such as the focal point detection region and the photometry region, to the line of sight detection position or fixing of the region in which image information is fetched, such as the focal point detection region and the photometry region, to a predetermined position while neglecting the position of the line of sight. Reference numeral 32 represents a line-of-sight holding switch for moving the region in which the evaluated value is fetched, that is, the focal point detection region, to an arbitrary position in the screen with the line of sight in a line of sight AF mode to be described later. Reference numeral 33 represents a zoom switch for operating the magnification-varying lens 9 to perform zooming. A variety of operations by operating the foregoing switches are collectively controlled by the system microcomputer 30. On the other hand, the lens control and control relating to the detection of the line of sight are performed through the microcomputer 29.

The display of the frame in the screen will now be described with reference to FIG. 10.

FIG. 10 (b) is a diagram showing an example of an usual region in which the evaluated AF value is fetched, that is, a focal point detection region. Referring to FIG. 10 (b), reference numeral 401 represents a frame to be photographed and 404 represents a region in which the focal point is detected. Photographers usually photograph a picture in a manner such that the subject (the main subject) OB to be photographed is brought to the central portion of the frame. In a case where a main subject is photographed, the region in which the focal point is detected is usually narrower than the entire frame to be photographed in order to prevent influence of other subjects. As a result, the fetched region is fixed at a position indicated by reference numeral 404.

However, a photographer does not always photograph the main subject while fixing the main subject in the central portion of the frame. In order to photograph a main subject which is not positioned in the central portion of the frame without change of the camera angle, the region in which the focal point is detected must be moved on the frame to be photographed.

Accordingly, this embodiment has a structure in which the coordinates of the position of the region in which the focal point is detected are transferred to the frame generating circuit 27 in order to cause the AF microcomputer 29 to move the region in which the focal point is detected to the position in the screen observed by the photographer on the basis of information of the coordinates of the position of the line of sight output from the line-of-sight detection circuit 6 shown in FIG. 14.

In the frame generating circuit 27, the region, in which the focal point is detected, is moved to the appointed position by controlling the opening/closing timing of the gate circuit 261 in the circuit 26 for processing the evaluated AF value. In order to display the portion corresponding to the region in which the focal point is detected on the electronic view finder 24, a frame display signal indicating the portion corresponding to the region is output to the LCD display circuit 23.

Simultaneously, the AF microcomputer 29 supplies the frame display signal to the LCD display circuit 23 by switching off switch 28 so as to be superimposed on a television signal from the amplifier 22 which is then superimposed on the screen of the electronic view finder 24.

FIG. 10 (a) shows a state of the screen at this time. Reference numeral 403 represents the present position of the line of sight of a photographer. A focal point detection region as indicated by reference numeral 403 is set relative to the position 403. The AF microcomputer 29 controls the gate circuit 261 of the circuit 26 for processing the evaluated AF value through the frame generating circuit 27 and displays the region as indicated by reference numeral 402.

Assuming that the photographer moves the viewpoint to a position 405, a focal point detection region 406 relative to a new interest point 405 is set by a similar method so that display of the region 402 is moved to the region 406.

On the other hand, the system microcomputer 30 detects the state of the line-of-sight switch 31 to control the AF microcomputer 29 in accordance with the detected state so that an AF mode selection arranged as follows can be performed.

That is, an output signal from the line-of-sight switch 31 is a binary signal 1 or 0 arranged for convenience such that when the output signal is "1", a mode (hereinafter called a "line-of-sight AF mode") is employed in which the region in which the focal point is detected is moved in accordance with the position of the line of sight. When the output signal is "0", a mode (hereinafter called a "center-weighted AF mode") is employed in which information about the position of the line of sight is not used but the region in which the focal point is detected is fixed to the central portion of the frame to be photographed as shown in FIG. 1(b).

According to this embodiment, the frame generating circuit 27 is, in the line-of-sight AF mode, controlled in accordance with the position of the line of sight output in the line-of-sight detection circuit 6 in the line-of-sight mode to set the region in which the focal point is detected to the position of the point of interest and closes the switch 28 so as to display the region in which the focal point is detected.

Since the region, in which the focal point is detected, is fixed to the central portion as shown in FIG. 10 (b) in the center-weighted AF mode, the necessity of displaying the region in which the focal point is detected on the screen of the electronic view finder 24 can be eliminated. As an alternative to this, the screen of the electronic view finder 24 is prevented from being complicated by inhibiting the display of the fetched region. Therefore, if the output from the line-of-sight switch 31 is 0, the frame generating circuit 27 is controlled to switch the mode to the center-weighted AF mode. Furthermore, the switch 28 is opened to inhibit the display of the region in which the focal points detected.

The operations to be performed in the AF microcomputer 29 when the line-of-sight switch 31 is used to change the AF mode and display of the region in which the focal point is detected is turned on/off when the AF mode is changed will now be described with reference to a flow chart shown in FIG. 15.

Figure 15:
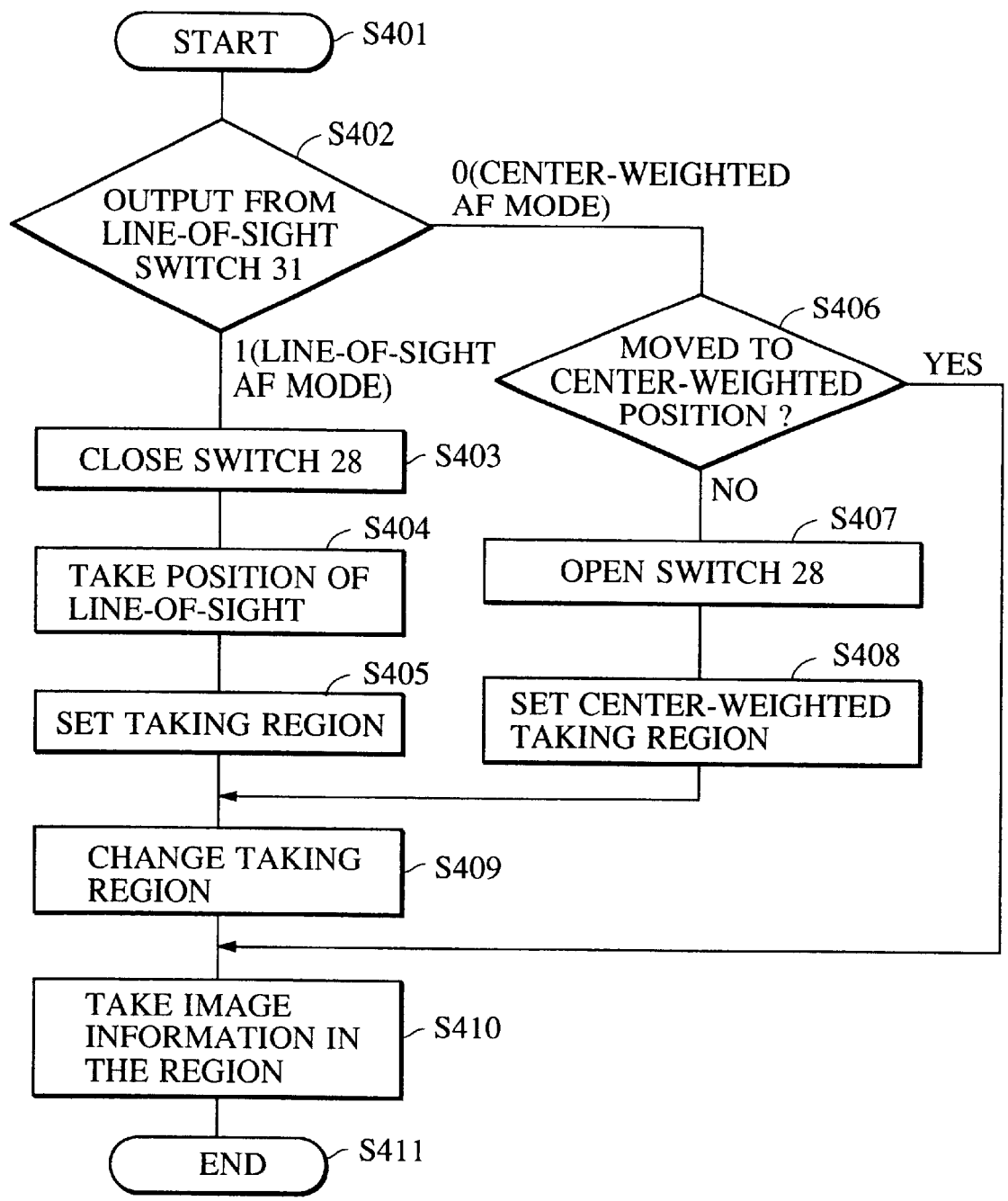
FIG. 15 is a flow chart of the operation according to a seventh embodiment of the present invention.

Referring to FIG. 15, when the process is started in step S401, the state of the output from the line-of-sight switch 31 is detected in step S402. If the output from the line-of-sight switch 31 is "1" (the line-of-sight AF mode), then the switch 28 is closed in step S403 to display the focal point detection region on the electronic view finder 24. In step S404, the position of the line of sight transferred from the line-of-sight detection circuit 6 is fetched.

In step S405, the region in which the focal point is detected is set with respect to the line position serving as a reference so that the fetched region is changed in step S409 as shown in FIG. 10 (b). In step S410, image information is fetched from the changed region to be fetched, and a sequence of the process is completed in step S411.

If the output from the line-of-sight switch 31 is set to "0" (the center-weighted AF mode) as a result of the discrimination performed in step S402, then a discrimination is performed whether or not the focal point detection region has been set to a predetermined central portion in the frame. If it has been set to the central portion, image information of the region is fetched in step S410.

If the focal point detection region has not been set to the central portion of the frame in step S406, the switch 28 is opened in step S407 to delete the display of the focal point detection region on the frame of the electronic view finder 24. In step S408, the region in which image information is fetched is set to a predetermined central portion. In step S409, the region to be fetched is changed, and image information of the region is fetched in step S410.

As described above, the line-of-sight switch 31 is able to select the line-of-sight AF mode or the center-weighted AF mode. Since the fetched region is displayed only in the line-of-sight AF mode, the fetched region is displayed only when the fetched region has been moved and information of the subject of the overall portion of the frame must be confirmed. In the center-weighted AF mode, the fetched region is fixed to the central portion. Therefore, the image in the frame is prevented from being complicated by omitting the display of the fetched region.

In the case where the AF operation is performed by detecting the line of sight as is performed in this embodiment, the position of the point of interest is displayed in the frame in a real time manner. Therefore, the operator is able to always recognize whether or not the present region is placed at a desired position. Furthermore, an effective alarm can be performed if the line of sight is spaced from the main subject. In the center-weighted AF mode in which the region is fixed, the display of the region is turned off. As a result, the image in the frame can be prevented from being complicated and other displays can be easily recognized. Therefore, a great effect can be produced from a combination of the foregoing effects.

By employing the foregoing method, a subject in the frame which is being observed by the photographer can accurately be focused. In this case, it is preferable to appropriately adjust the exposure with respect to the subject being observed by the photographer, as well as the focal point.

Accordingly, the frame generating signal for setting the region to be fetched is, as shown in FIGS. 14 and 3, supplied from the frame generating circuit 27 to the diaphragm control circuit 25 so that the photometry region is set to the position of the subject in the frame which is being observed. As a result, a partial photometry of the main subject in which an image signal in the photometry region is used or a center-weighted photometry in which weight of the signal in the photometry region is made heavier than the outside the photometry region can be performed.

Specific operation will now be described. In both AF and AE operations, when the output from the switch 31 is 1", the photometry region is moved to the position which is being observed by the photographer to adjust the exposure on the basis of the information of the photometry for that portion. Furthermore, the switch 28 is closed to display the photometry region in the frame. When the output from the line-of-sight switch 31 is "0", the mode is switched to the center-weighted photometry. Furthermore, the switch 28 is opened to inhibit display of the photometry region in the frame.

Operation in a case where the line-of-sight holding switch 32 will now be described with reference to a flow chart of a process in the AF microcomputer 29 shown in FIG. 16. The description will be made such that the foregoing process, including the process in the flow chart shown in FIG. 15, is performed periodically while making a vertical synchronizing period of, for example, a television signal, to be one period.

Figure 16A:
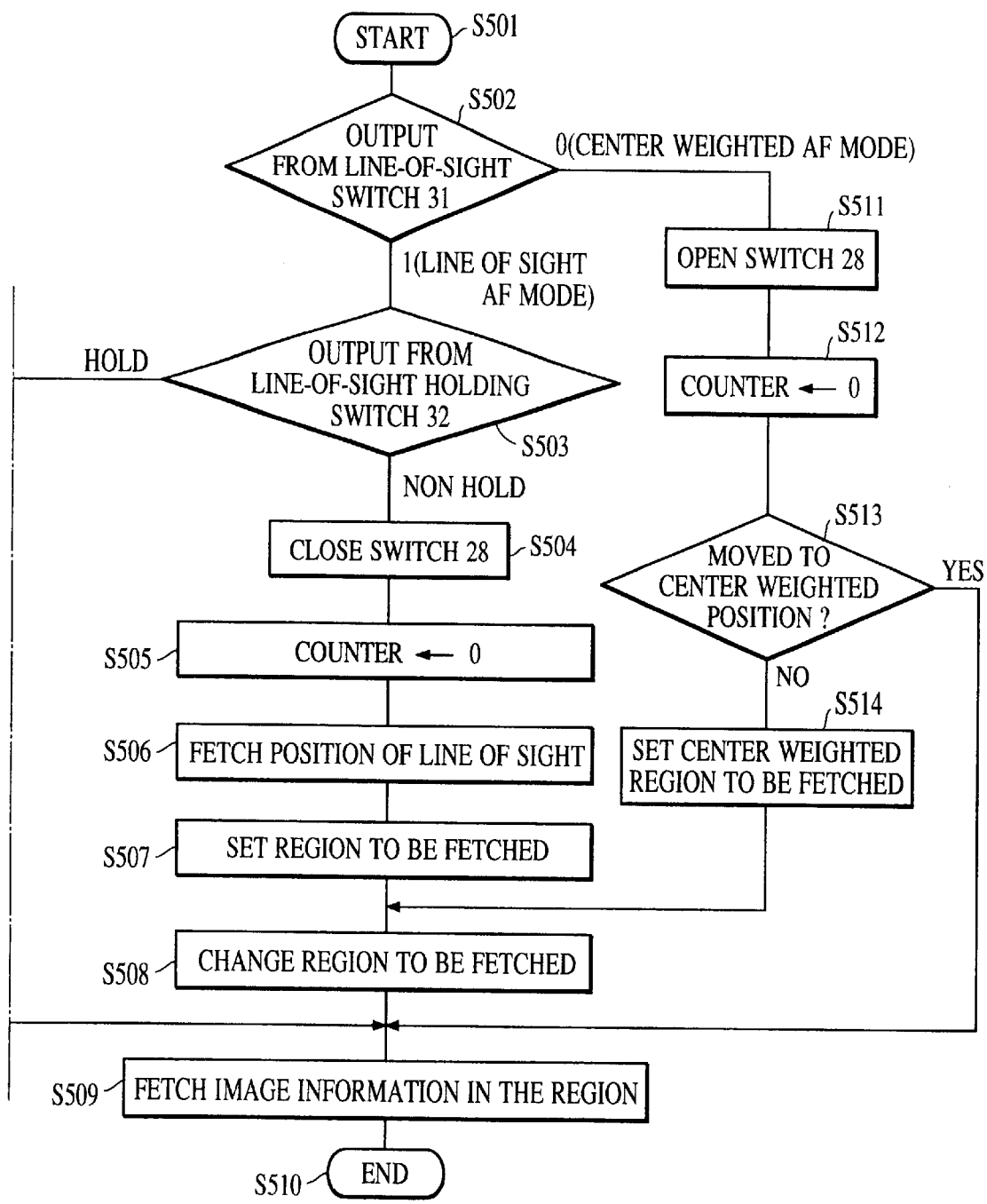
FIG. 16 is a flow chart of another operation according to the seventh embodiment of the present invention.

Referring to FIG. 16, when the process is started in step S501, detection is performed in step S502 whether the output from the line-of-sight switch 31 is "1" (line-of-sight AF mode) or "0" (center-weighted AF mode).

If the selection of the line-of-sight AF mode by the line-of-sight switch 31 has been detected, the state of the line-of-sight holding switch 32 is detected in step S503.

After a region in which image information is fetched, such as the focal point detection region or the photometry region, has been moved to a desired position by means of the line of sight, the line-of-sight holding switch 32 is used to fix the fetched region.

That is, it is difficult for a human being to observe one point in the frame and the position of the line of sight in a video camera for photographing movies because it causes considerable scattering. Therefore, if the detection of the line of sight is always turned on, a problem arises in that it scatters the line of sight, that is, so-called "looking the other way" displaces the region, in which image information is fetched, although the foregoing problem does not rise in a case where the photographer concentrically photographs the main subject. In order to overcome the foregoing problem, the line-of-sight holding switch 32 is provided.

It is preferable that the display of the region is turned off after the region in which image information is fetched, such as the focal point detection region or the photometry region, has been moved in the line-of-sight AF mode followed by fixing the position in order to prevent the frame from being complicated.

Specifically, the line-of-sight holding switch 32 is brought to a non-holding state (switched off), and the region in which image information is fetched is by means of the line of sight, moved to a desired position. Then, the line-of-sight holding switch 32 is brought to a holding state (switched on).

By performing the foregoing operation, the fetched region can be fixed to a desired position by the following processing procedure.

In step S503, the state of the switch 32 is detected. If the switch 32 is in a non-holding state, the switch 28 is closed in step S504 so that the region in which image information is fetched is displayed on the screen of the electronic view finder 24.

In step S505, a counter to be described later is cleared to zero. In step S506, the position of the line of sight is fetched from the line-of-sight detection circuit 6. In step S507, the region in which image information is fetched is set by using the fetched position of the line of sight as the reference.

In step S508, the fetched region, that is, the focal point detection region and the photometry region, are shifted to the set position. In step S509, image information in the region is fetched so that a sequence of the process is completed.

In the instance that the line-of-sight switch 31 has been switched off, that is, the center-weighted AF mode has been selected in step S502, the switch 28 is opened in step S511 similarly to FIG. 15 so that display of the fetched region, such as the focal point detection region and the photometry region, is turned off.

In step S512, a counter to be described later is cleared to zero. In step S513, whether or not the region has been moved to the center-weighted fetched region in the central portion of the frame is confirmed. If the movement has been performed, then the operation proceeds to step S509. If the movement has not been performed, the fetched region is set to the position at which the center-weighted image information is fetched in step S514. In step S508, the fetched region is moved to the set position and the operation proceeds to step S510.

If the line-of-sight holding switch 32 is in the holding state in step S503, the count of the counter is confirmed in step S515. When another state is shifted to the holding state in the line-of-sight AF mode, the count is reset to zero in the process in step S505 or step S512. Therefore, the count confirmed in step S515 is always smaller than a predetermined value.

The foregoing counter is used to measure the time for a process in a region in which image information is fetched, and is fixed to a desired position by the line-of-sight holding switch 32. Then, the display of the fetched region is deleted after a predetermined time has passed from the fixation. By appropriately setting the predetermined value, the predetermined time, that is, the time from the fixation of the region in which image information is fetched from a desired position until the time of deletion of the display of the region can be determined.

Assuming that the process shown in FIG. 16 is repeated in such a manner that one vertical synchronizing period is made to be the period, the count of the counter increases by one in one vertical synchronizing period due to the process in step S517. Therefore, by setting the predetermined value to 30, a predetermined time of 0.5 seconds can be set in a case of an NTSC method.

If the count of the counter has not been enlarged to a predetermined value in step S515, the switch 28 is closed in step S516 and the display of the region in which image information is fetched is continued. In step S517, the count of the counter is increased, and the fetched region is fixed in step S518. Then, the operation proceeds to step S509.

If the state of the line-of-sight switch 31 and that of the switch 28 are not changed and the process restarts in step S501 and a confirmation is made in step S515 that the count of the counter has not been enlarged to the predetermined value, the process in a sequence of S516, S517, S518, S509, and S510 is repeated. If the state of the line-of-sight switch 31 and the switch 28 is changed before the count of the counter is enlarged to the predetermined value the operation proceeds to another process as described above and the counter is cleared to zero.

If the enlargement of the count of the counter to the predetermined value has been confirmed in step S515, the switch 28 is opened in step S519 so that the display of the fetched region on the screen of the electronic view finder 24 is turned off. If the state of the line-of-sight switch 31 and the switch 28 is not changed, the count of the counter is not changed. Therefore, the display of the region is erased after a predetermined time has passed the line-of-sight AF holding state and is not again displayed while the state of the line-of-sight switch 31 and the switch 28 is not changed.

As described above, only in a case, such as a line-ofsight AF mode, in which the fetched region is moved and the portion from which subject information is fetched must be confirmed, is the fetched region displayed. In the state where the fetched region is held in the center-weighted AF mode or the line-of-sight AF mode, the fetched region is fixed. Therefore, the fetched region is not displayed to prevent complication of the image on the electronic view finder 24.

When the image information of the focal point detection region or the photometry region is moved and held in the line-of-sight AF mode, the display of the region is not immediately turned off but is displayed for a predetermined time followed by turning off the same. Therefore, the position of holding can be sufficiently recognized by the operator. Thus, an operation for setting the region can be performed reliably and an effect can be obtained to prevent erroneous operation.

Eight Embodiment

An eighth embodiment of the present invention will now be described. In the seventh embodiment, the position of the region in which image information is fetched, such as the focal point detection region or the photometry region, is controlled by the line-of-sight detection means. In this embodiment, the control of the position of the region in which image information is fetched, is performed by an input device such as a so-called "mouse" which has been widely used with personal computers in recent years in place of the line-of-sight apparatus.

Figure 17A:
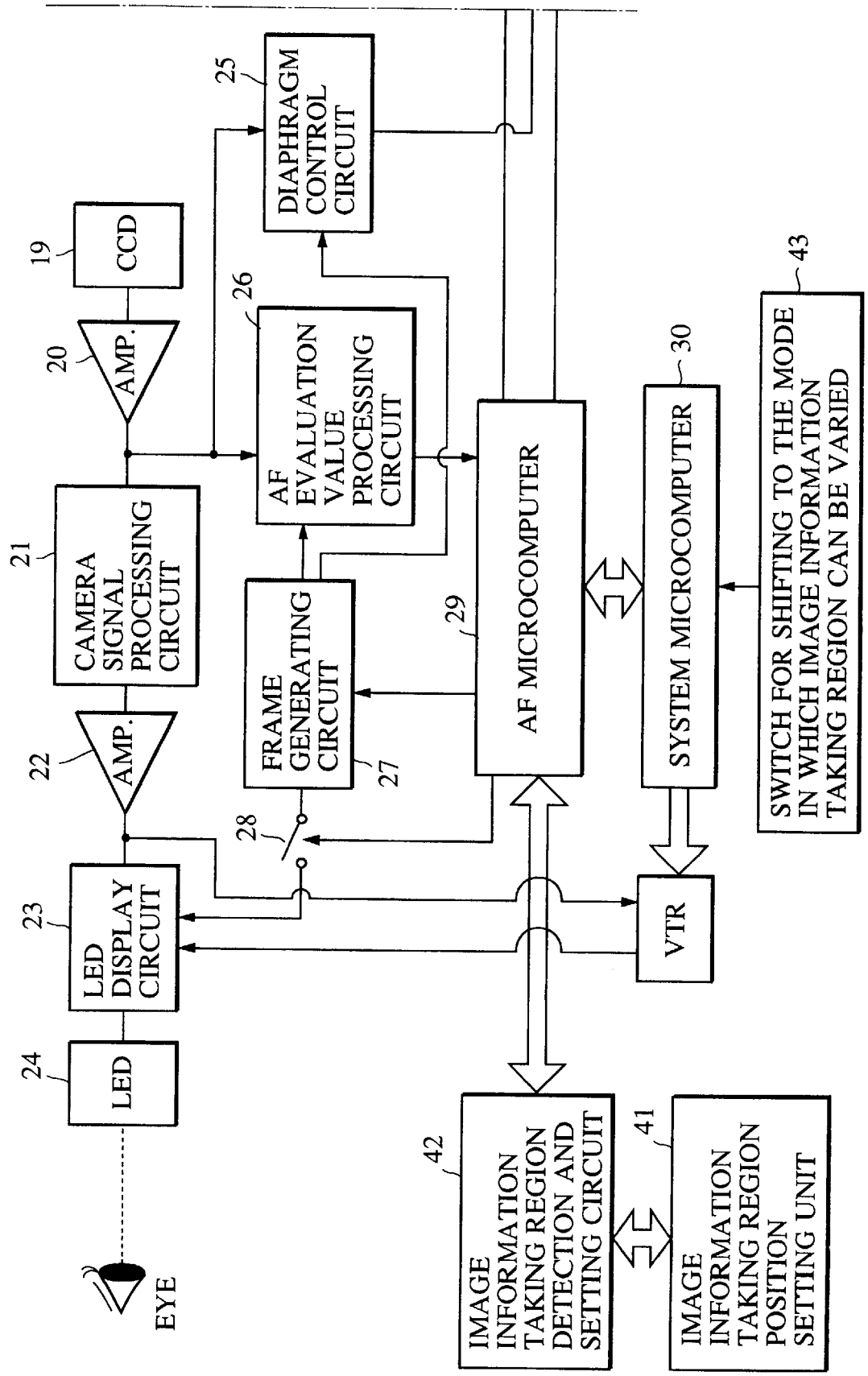
FIG. 17 is a block diagram showing the structure of an eighth embodiment in which the present invention is applied to a camera having a video tape recorder integrated therewith.

FIG. 17 is a block diagram showing the basic structure of this embodiment, in which blocks having the same functions as those of the seventh embodiment shown in FIG. 14 are given the same reference numerals.

Referring to FIG. 17, reference numeral 41 represents a fetched-region position setting device comprising an input device, such as a "mouse" for inputting a region in which image information is fetched when the region such as the focal point detection region or the photometry region is set or changed. The fetched-region position setting device is provided in place of the line-of-sight detection apparatus according to the first embodiment.

Reference numeral 42 represents a fetched region detection and setting circuit that reads information about the operation of the input device 41 to detect information about the set position of the appointed region in which image information is fetched, such as the focal point detection region or the photometry region so as to set the region. Reference numeral 43 represents a switch for selecting a mode in which the fetched-region position setting device 41 and the region detection and setting circuit 42 are used to change the set position of the region in which image information is fetched in the screen or a mode in which image information of a center-weighted region in which image information is fetched is fixed to the central portion of the screen. The foregoing elements 41, 42, and 43 correspond to the elements 2 to 5 in the line-of-sight detection apparatus 1 according to the first embodiment, the line-of-sight detection circuit 6, and the line-of-sight switch 31.

FIG. 18 is a diagram showing a schematic structure of the image information fetched-region position setting device 41 shown in FIG. 17. FIG. 18 being a basic structural view of a so-called "mouse" which has been widely used with personal computers in recent years. Referring to FIG. 18, reference numeral 411 represents a ball for rotating rollers, the ball 411 being rotated when the mouse is moved by an operator on a two-dimensional plane. Reference numerals 412 and 414 represent rollers for decomposing the rotations of the ball 411 into the horizontal (X) direction and the vertical (Y) direction. Rotation-detection sensors 413 and 416 are attached to the rollers 412 and 414, respectively.

The rotation-detection sensors 413 and 415 output signals such that if output signal Xa or Ya has a waveform as indicated by reference numeral 416 when the roller is rotated in a direction (called "forward rotation" for convenience) as indicated by reference numerals 416, 417, and 418, then the output signal Xb or Yb is a signal having a phase shifted from the waveform 416 by an angular degree of 90° as indicated by reference numeral 417. If the roller is then rotated backwards, the signal Xb or Yb is made to be as indicated by reference numeral 418 with respect to the waveform 416. Thus, the phase is inverted with respect to the waveform 417.

That is, detection of the phases of the signals Xb or Yb with respect to signal Xa or Ya will enable the direction of the rotation to be detected. By detecting the period of the change in the signal, the rotational speed can be detected. If two output signals do not change, stopping of the mouse can be detected.

In a case where the "mouse" is used with a usual personal computer, the ball 411 of the mouse is caused to face downward and the ball 411 is moved on a plane, such as a desk to rotate the ball 411. In a case where the mouse is included in a video camera, the ball 411 is caused to project at a predetermined position from the cabinet of the body of the camera and the ball 411 is rotated by the hand or finger of the operator so that a similar operation is performed.

As a result, the ease of operation of the camera can be improved and an erroneous operation in setting the region by means of the detection of the line of sight according to the first embodiment due to "looking the other way" can be prevented. Furthermore, reliability can be improved.

Figure 19A:
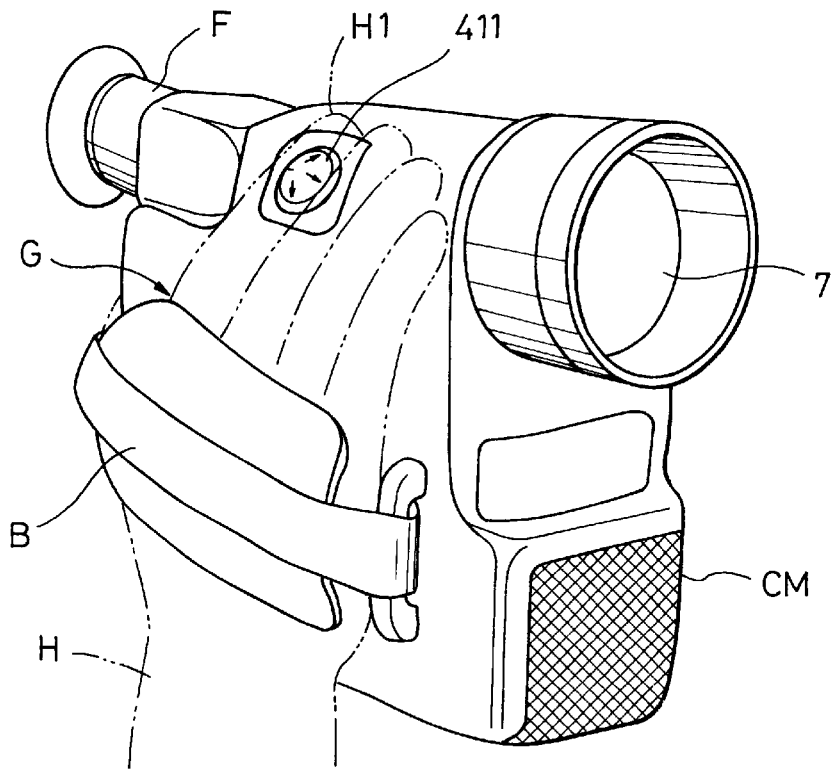
FIG. 19 is a perspective view of the shape of the camera having a video tape recorder integrated therewith according to the eighth embodiment of the present invention.
Figure 19B:
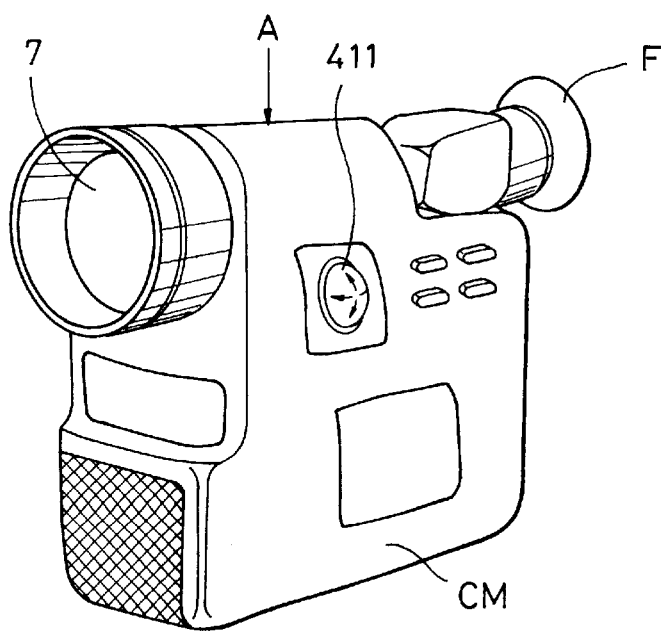

If the ball is, as shown in FIG. 19 (*a*), disposed at a position above a grip portion on the side surface of the video camera having the grip portion so as to be operated by any of the fingers (for example, the forefinger in the illustrated case) in a state where the grip of the body of the video camera is held, ease of operation and stability can be improved. For example, the ball 411 can be operated while operating a zoom switch or an image-recording trigger switch with another finger.

Referring to FIGS. 19 (*a*) and 19 (*b*), symbols CM represent a camera having a video tape recorder integrated therewith. Reference numeral 7 represents a photographing lens optical system, symbol F represents an electronic view finder, and B represents a holding belt for the back of the hand attached to a grip portion G on the side surface of the camera having a video tape recorder integrated therewith. Symbol H represents the hand of the operator that holds the grip. The ball 411 may be disposed at a position at which it can be operated by any of the fingers (for example, the forefinger in the illustrated case) in a state where the grip portion is held.

Therefore, the operator is able to operate the ball 411 without removing the eye thereof from the finder image and can therefore set the focal point detection region or the photometry region at an arbitrary position in the screen during the photographing operation.

If the ball 411 is operated by the hand which is not holding the body of the video camera, it may be disposed on the side opposing the grip as shown in FIG. 19 (*b*).

As shown in FIG. 19 (*b*), the ball 411 may be disposed on the top surface of the body of the video camera as indicated by symbol A.

The input means comprising the ball 411 as described above enables the operator to perform operations while observing the finder screen without the necessity of observing operation switches, such as a keyboard. Therefore, the ease of operation can be improved significantly.

FIG. 20 shows another specific example of the fetched region position setting apparatus 41 for appointing a region in which image information is fetched, shown in FIG. 17, in which the basic structure of a "joy stick" which is widely used to input position information to a computer is illustrated. Referring to FIG. 20, reference numeral 421 represents a control lever, and 422 and 423 represent volumes for decomposing the movement of the joy stick in the horizontal (X) direction and the vertical (Y) direction.

Output signals from the volumes 422 and 423 have waveforms as indicated by reference numeral 424 that indicate the voltage which is in proportion to the rotational angle of the volume. That is, by reading the output voltages from the volumes 422 and 423 and by assigning the read voltages to the X coordinate and Y coordinate, the absolute position on the two-dimensional plane can be detected.

Since the operation of both the "mouse" and the "joy stick" is a known fact, further detailed description is omitted.

By reading the movement and the position of the mouse or the joy stick on the two-dimensional plane by the fetched-region detection and setting circuit 42, information about the change in the coordinates following the movement of the mouse or the joy stick can be transferred to the AF microcomputer 29 by the fetched-region detection and setting circuit 42.

The AF microcomputer 29 changes the region in which image information is fetched in accordance with information about the set position of the region by the same method as that according to the seventh embodiment so that the region in which image information is fetched is displayed on the electronic view finder 24 while being superimposed.

Figure 21A:
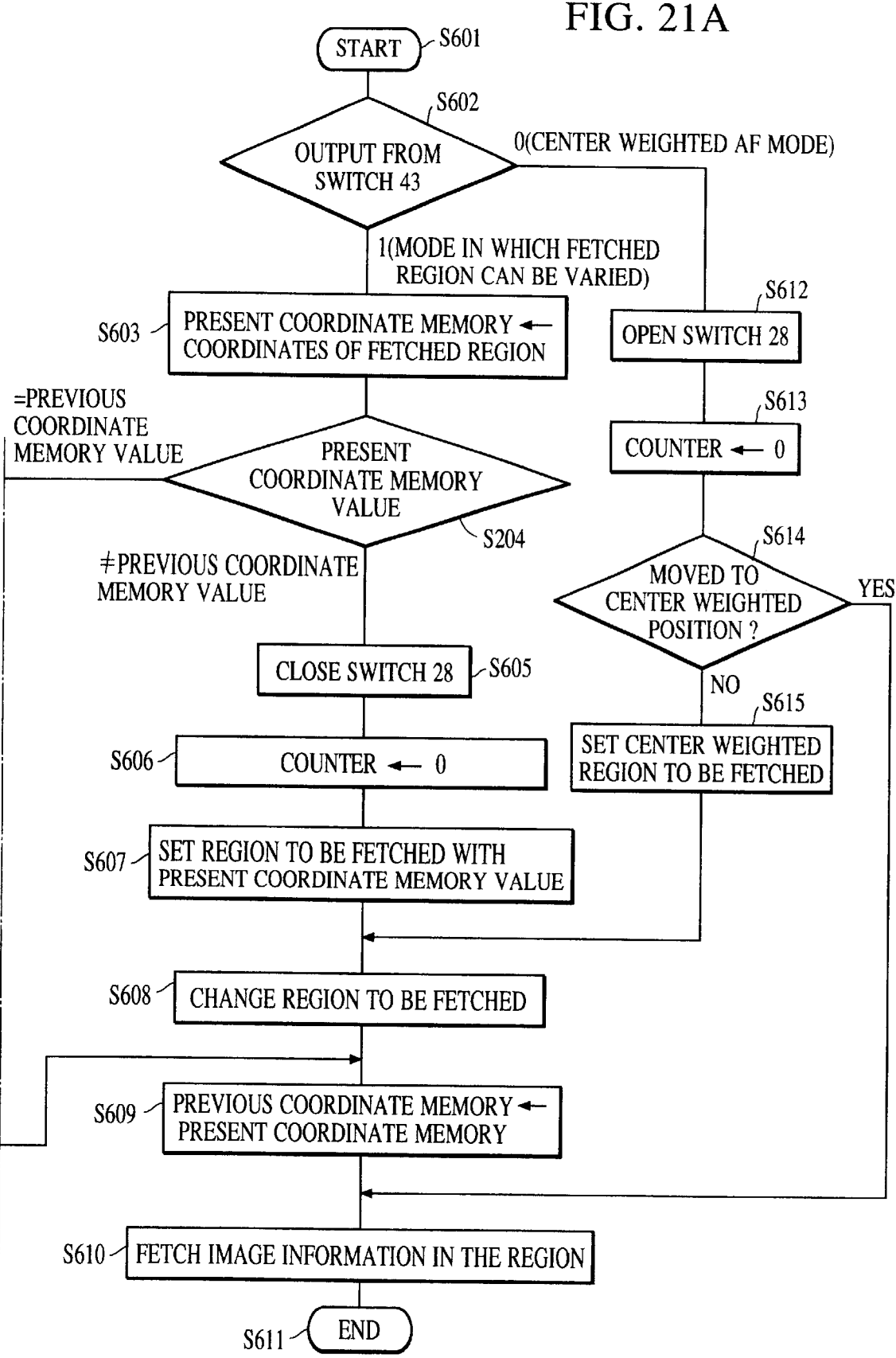
FIG. 21 is a flow chart of the operation according to the eighth embodiment of the present invention.

FIG. 21 is a flow chart showing the process to be performed in the AF microcomputer 29 according to the eighth embodiment of the present invention. The process shown in FIG. 21 is repeatedly performed at predetermined cycles (for example, at each vertical synchronizing period).

Referring to FIG. 21, the process started in step S601, detects whether or not the switch 43 shown in FIG. 17 is moved to the center-weighted AF mode side or the fetched-region variable mode.

In the center-weighted AF mode ("0"), the processes in steps S612 to S614 are performed. If the movement of the region in which image information is fetched to the center-weighted position has been completed, the process in step S610 is performed and the operation is completed. If the movement of the region in which image information is fetched to the center-weighted position has not been completed, the center-weighted fetched region is set in step S615. In step S608, the set position of the fetched region is changed. Since the foregoing processes are the same as the processes in steps S511 to S514, S508, and S509 in the flow chart shown in FIG. 16, further description is omitted here. After the process in step S608 has been performed, the coordinates of the position of the fetched region stored in memory are updated to the coordinates of the present position in step S609. In step S610, image information in the center-weighted image information fetched region is fetched and a sequence of the operations ends.

If in the discrimination performed in step S602, the switch 43 is on the fetched-region variable mode side, the coordinates appointed by the fetched-region position setting apparatus 41 and transferred from the fetched-region detection and setting circuit 42 are fetched in step S603 so as to be placed into a memory "a memory for the present coordinates" for storing the present coordinates in the AF microcomputer 29.

In step S604, the value in the present-coordinate memory and the value in a "previous coordinate memory" that stores the coordinates fetched in the previous process are subjected to a comparison. If the value of the present coordinate memory and that in the previous coordinate memory are not the same, the processes in steps S605 and S606 are performed such that the switch 28 is closed to supply the frame display signal to the LCD display circuit 23 such that the frame is displayed. Furthermore, the counter is cleared to zero (the same processes as those in steps S504 and S505 shown in FIG. 16). In step S607, the fetched region is set at the coordinates of the position in the present coordinate memory. In step S608, the position of the fetched region is changed to the present coordinate position. In step S609, the value of the present coordinate memory is substituted into the previous coordinate memory so that the value is updated. In step S610, image information in the fetched region set to the appointed coordinates is fetched, and a sequence of the operations ends in step S611.

If the value in the present coordinate memory and that in the previous coordinate memory are the same in step S604, the movement of the fetched-region position setting device 41, such as a mouse or a joy stick, is stopped. Therefore, the processes in steps S616 to S620 are performed similarly to the processes in steps S515 to S519 shown in FIG. 16 such that the count of the counter is subjected to a comparison with a predetermined value. If the count of the counter is smaller than the predetermined value, the switch 28 is closed in step S617 so that the region in which image information is fetched is displayed on the electronic view finder 24. In step S618, the count of the counter is increased. In step S619, the fetched region is fixed to the corresponding position. In steps S609 and S610, the image information in the region is fetched, and a sequence of the operations ends.

As described above, the process shown in FIG. 21 is repeated periodically in a state where the movement of the fetched-region position setting device 41 is stopped. If the count of the counter is larger than a predetermined value in step S604, the switch 28 is closed in step S620 so that the display of the region on the electronic view finder 24 is turned off. Then, the processes in steps S619, S609, and S610 are performed and the sequence of operations is ended.

As described above, the fetched region is displayed in the frame of the electronic view finder 24 only when the region in which image information is fetched, such as the focal point detection region or the photometry region, is moved and the portion in the frame from which subject information is fetched must be confirmed. If the appointed coordinates are not moved in the center-weighted AF mode or the fetched-region variable mode, the fetched region is fixed. Therefore, the fetched region is not displayed to prevent complication of the image on the electronic view finder 24.

As described above, the present invention can be applied even if an input means other than the input means employing the detection of the line of sight is used.

In the case where the input means, such as a mouse or a joy stick, is employed as in the eighth embodiment, a manual operation is required. However, superior reliability over input means using the line of sight that involves scattering can be obtained and erroneous operations can be prevented. Therefore, significant reliability can be produced.

If the input means above is attached to the cabinet of a video camera, ease of operation is considerably improved. While performing the photographing operation, the region in which image information is fetched, such as the focal point detection region or the photometry region, can be set to an arbitrary subject. Thus, a photographing operation further adaptable to the photographing conditions can be performed (refer to FIGS. 19 (*a*) and 19 (*b*)).

Ninth and Tenth Embodiments

Ninth and tenth embodiments of the present invention will now be described. The foregoing seventh and eighth embodiments have the structure that when the image must be confirmed through a monitor during the photographing operation, the complexity of the display on the monitor screen is satisfactorily prevented and the region in which image information is fetched is displayed if the display required.

In the seventh and eighth embodiments, the mode which requires the display of the fetched region and the mode which does not require the display are determined in the stage for designing the apparatus so that display or non-display is selected. Therefore, even if the operator does not require the display of the fetched region, the display cannot be turned off.

Figure 22A:
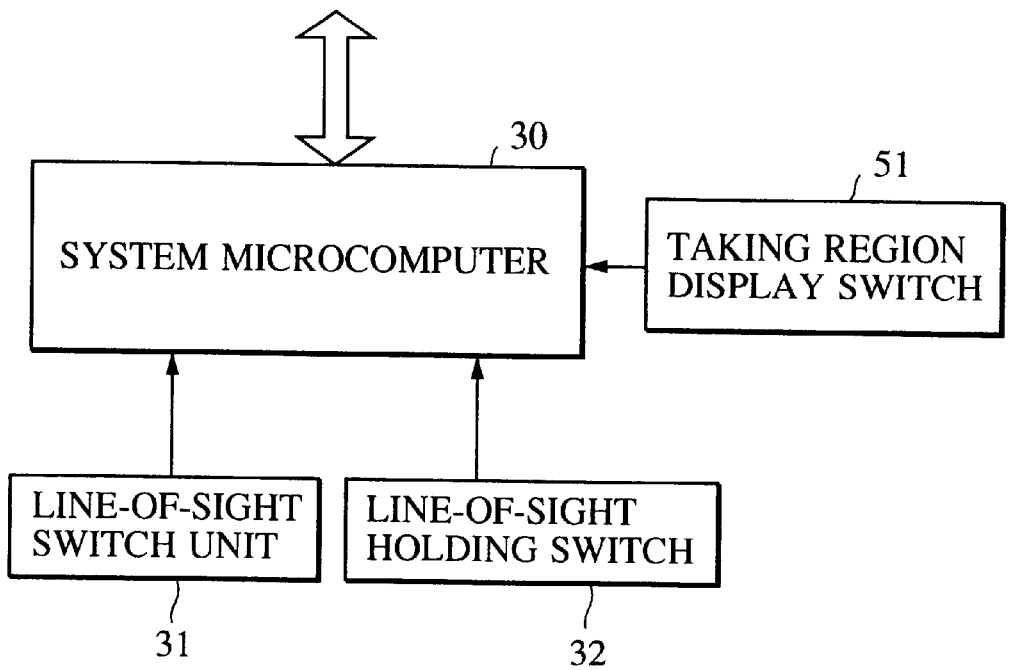
FIG. 22 is a diagram showing ninth and tenth embodiments of the present invention.
Figure 22B:
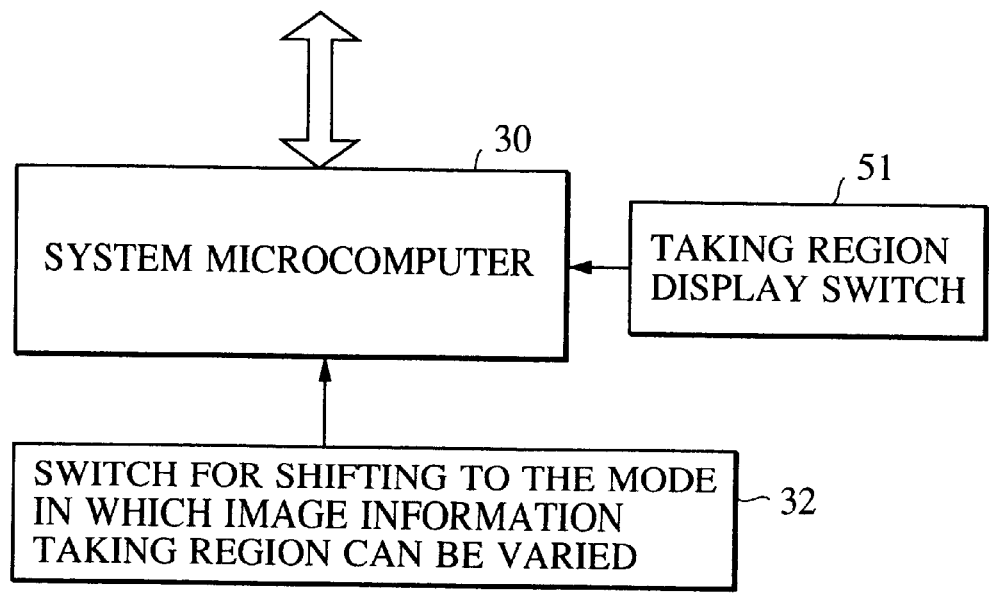

FIGS. 22 (*a*) and 22 (*b*) show the structures of the ninth and tenth embodiments of the present invention in which if the operator desires to turn off the display of the fetched region, then the display of the fetched region can be forcibly turned off even if the mode is the fetched-region changing mode.

FIG. 21 (*a*) shows only the changed portions around the system microcomputer 30 shown in FIG. 14, while FIG. 21 (*b*) shows only the changed portions around the system microcomputer 30 shown in FIG. 14. Specifically, the structure is changed such that a fetched-region display switch 51 is added to the system microcomputer 30 and its connection.

Information about the state of the output from the switch 51 is transferred to an AF microcomputer 29 through a communication passage. The switch 51 outputs binary information indicating whether or not the region is displayed.

Figure 23:
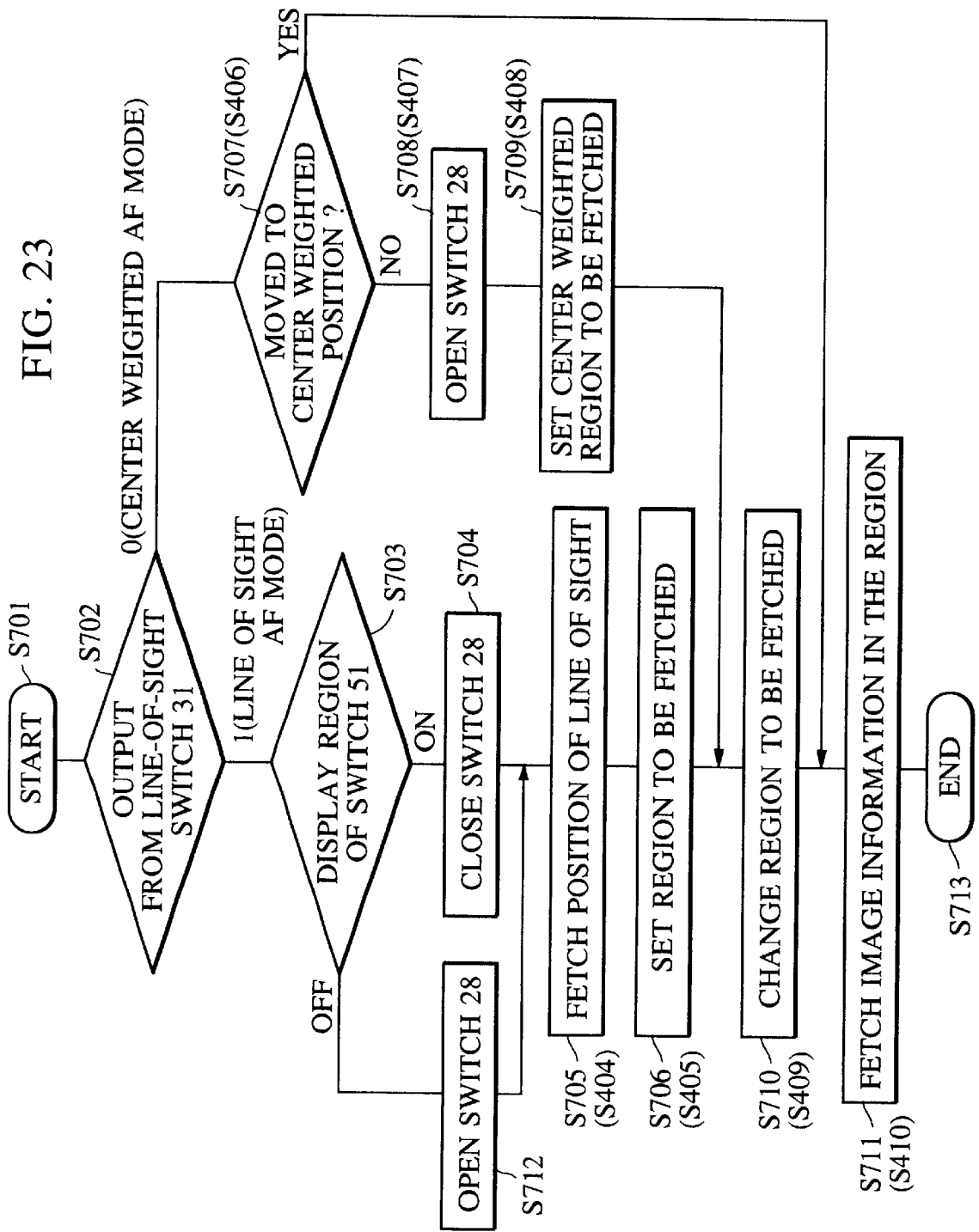
FIG. 23 is a flow chart of the operation according to the ninth embodiment of the present invention.

FIG. 23 is a flow chart of a process in which use of the switch 51 is considered. The foregoing operation is composed by partially changing the process in the flow chart shown in FIG. 15.

Referring to FIG. 23, the process is different from the flow chart shown in FIG. 15 in that the processes in steps S703 and S712 are added. Since the other processes are the same as the flow chart shown in FIG. 15, the steps in which the same process as those shown in the flow chart shown in FIG. 15 are performed, are given corresponding steps shown in FIG. 15 in the parentheses attached thereto.

The process is started in step S701, and the state of the line-of-sight switch 31 is detected in step S702. If the line-of-sight AF mode has been selected, the output from the switch 51 indicates whether the display of the region (ON) or non-display (OFF) is detected in step S703.

If the non-display is indicated in step S703, the switch 28 is opened in step S712 in which a process for turning off the display of the region on the electronic view finder 24 is performed. Then, the operation proceeds to step S705. The ensuing process is the same as the process in the flow chart shown in FIG. 15. Also, in the case where the output from the switch 51 indicates the region display (ON) in step S703, the process which is the same as the flow chart shown in FIG. 15 is performed.

Even if the line-of-sight AF mode has been set by using the line-of-sight switch 31, the display of the region can be turned off by the switch 51 in a case where the operator does not require the display of the region in which image information is fetched on the electronic view finder 24.

Figure 24A:
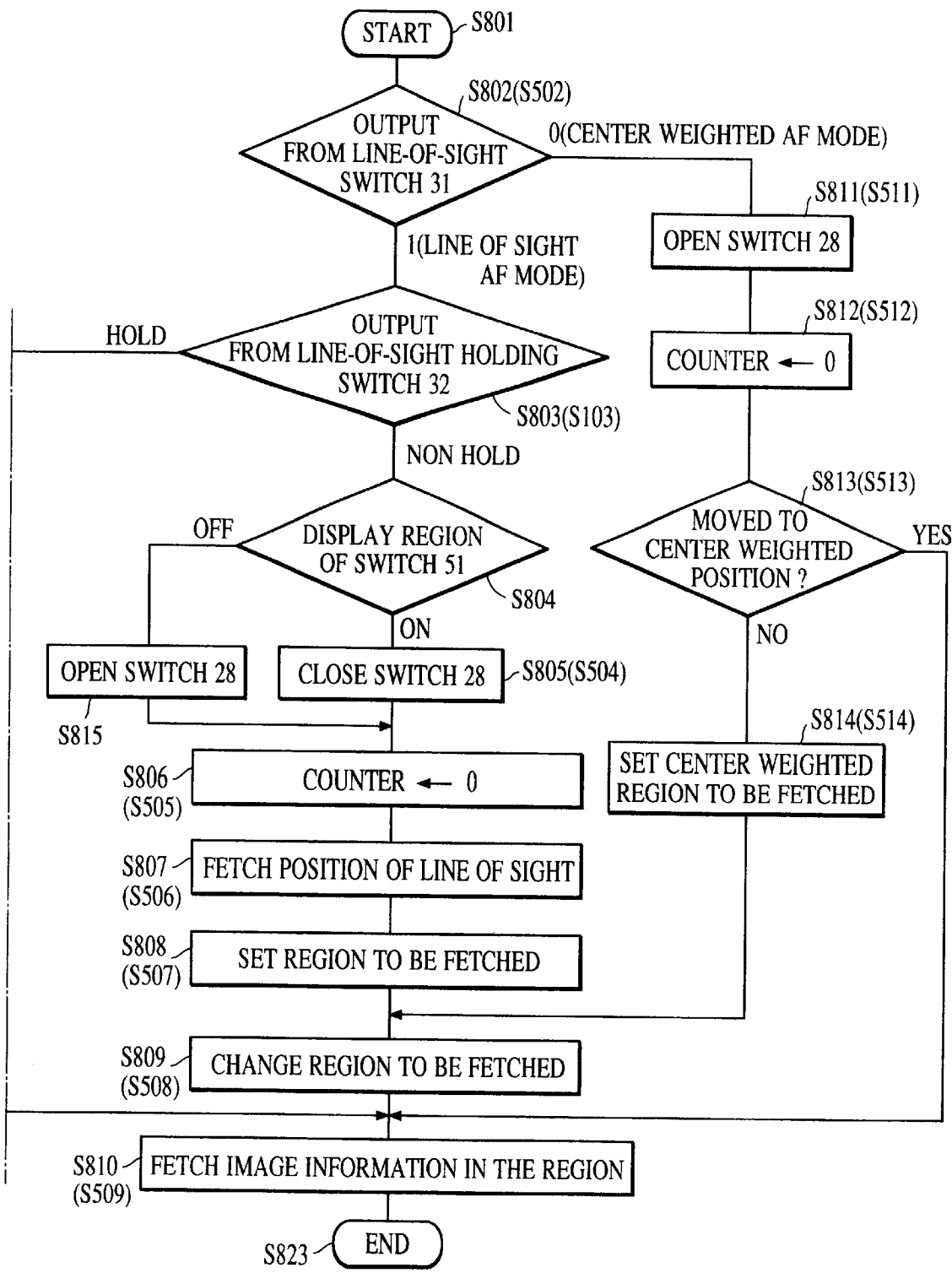
FIG. 24 is a flow chart of another operation according to the ninth embodiment of the present invention.
Figures 24, 24B:
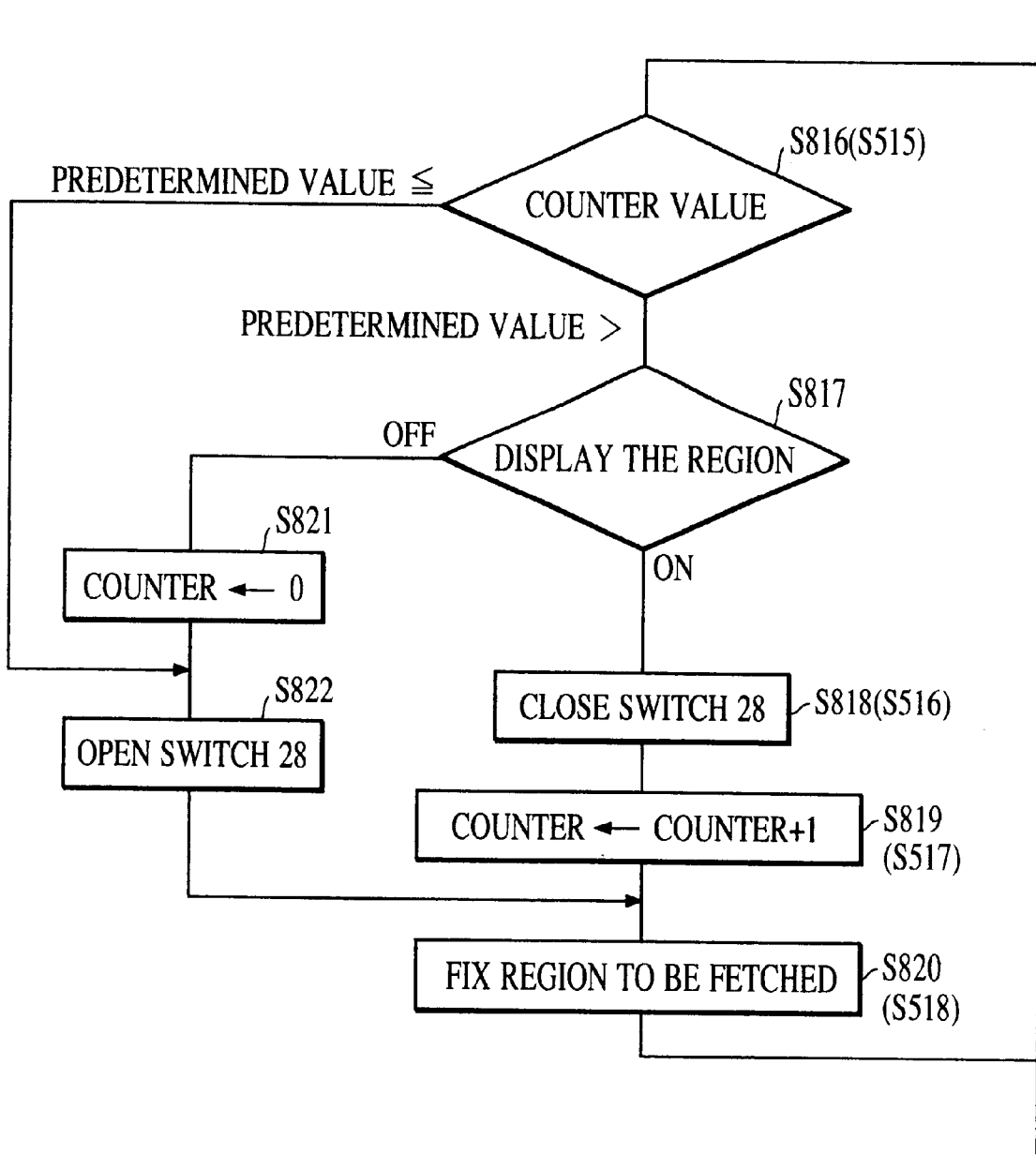

FIG. 24 is a flow chart of a process in which the switch 51 is used to perform the process shown in FIG. 16. The steps in which the same processes as those in the flow chart shown in FIG. 16 are performed, are given the corresponding steps shown in FIG. 16 in the parentheses attached thereto.

Referring to FIG. 24, the line-of-sight AF mode is selected by the line-of-sight switch 31 in step S802. In step S803, the region is displayed in the structure shown in FIG. 16 if the line-of-sight holding switch 32 has been turned off and the region in which image information is fetched has not been held. In the embodiment shown in FIG. 24, the state of the switch 51 is detected in step S804. If display of the region has been turned off, the operation proceeds to step S815 in which the switch 28 is opened so that the display of the region is turned off.

If the line-of-sight holding switch 32 has been turned on in step S803 and therefore the fetched region has been held and if the count of the counter is smaller than the predetermined value in step S816, the switch 28 is not immediately switched on. In this case, the state of the switch 51 is detected in step S817. If the switch 51 is at the non-display position, the counter is cleared in step S821. In step S822, the switch 28 is opened so that the display is turned off. The reason why the counter is cleared is that the photographer is enabled to confirm the fetched region by moving the switch 51 to the display position so that the region is displayed for a predetermined time and then the display of the region is automatically again turned off.

That is, if the regions in which image information is fetched, such as the focal point detection region or the photometry region, has not been moved, the complexity of the frame is usually prevented by turning off the display of the region, in which image information is fetched. If the operator intends to confirm the region in which image information is fetched the display can be turned on by switching the switch 51 to the display position. When the display of the region is again turned off, it can be turned off automatically. Therefore, the necessity of turning off the display can be eliminated and therefore the ease of operation can be improved significantly.

Figure 25A:
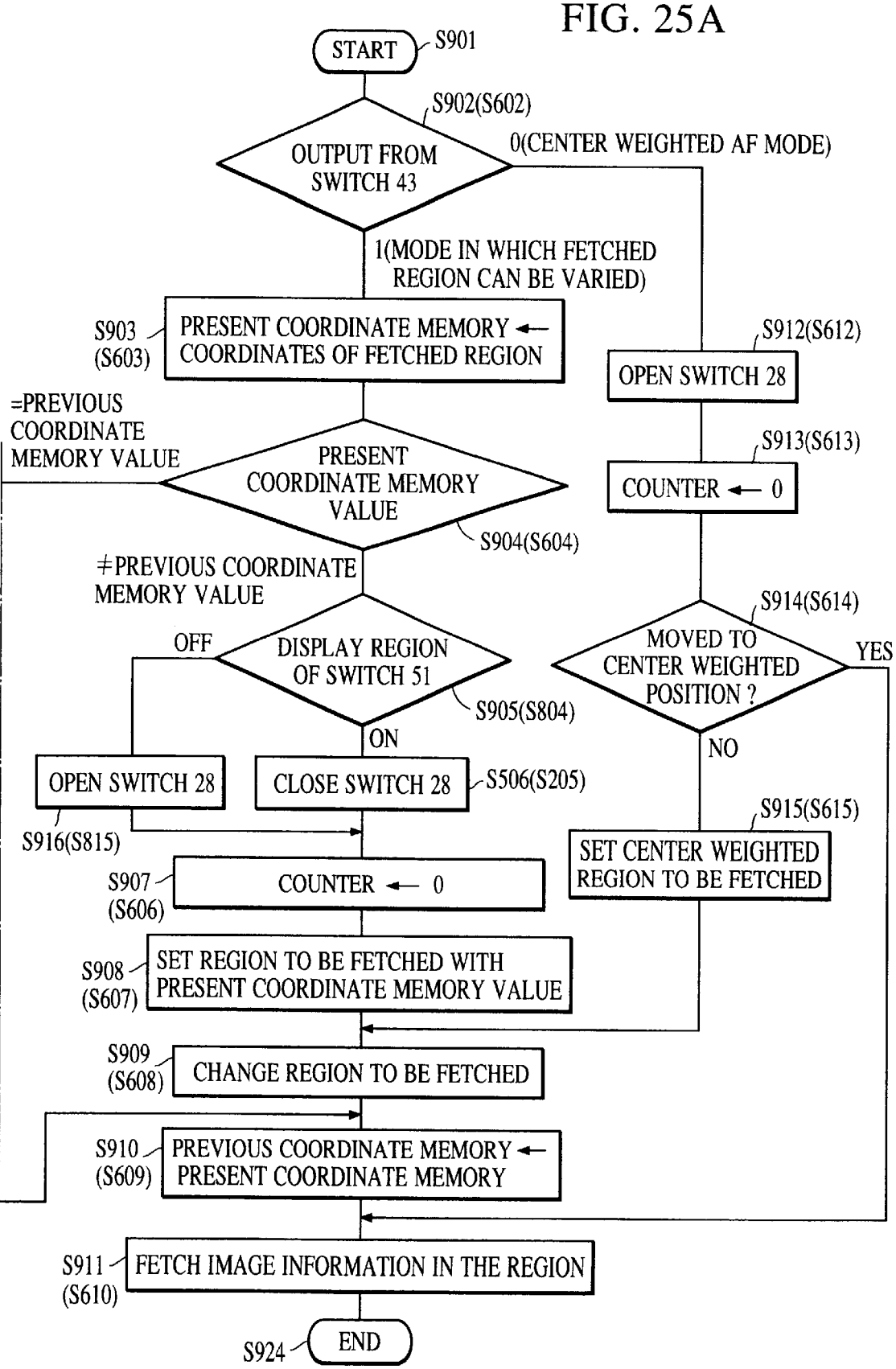
FIG. 25 is a flow chart of the operation according to the tenth embodiment of the present invention.
Figures 25, 25B:
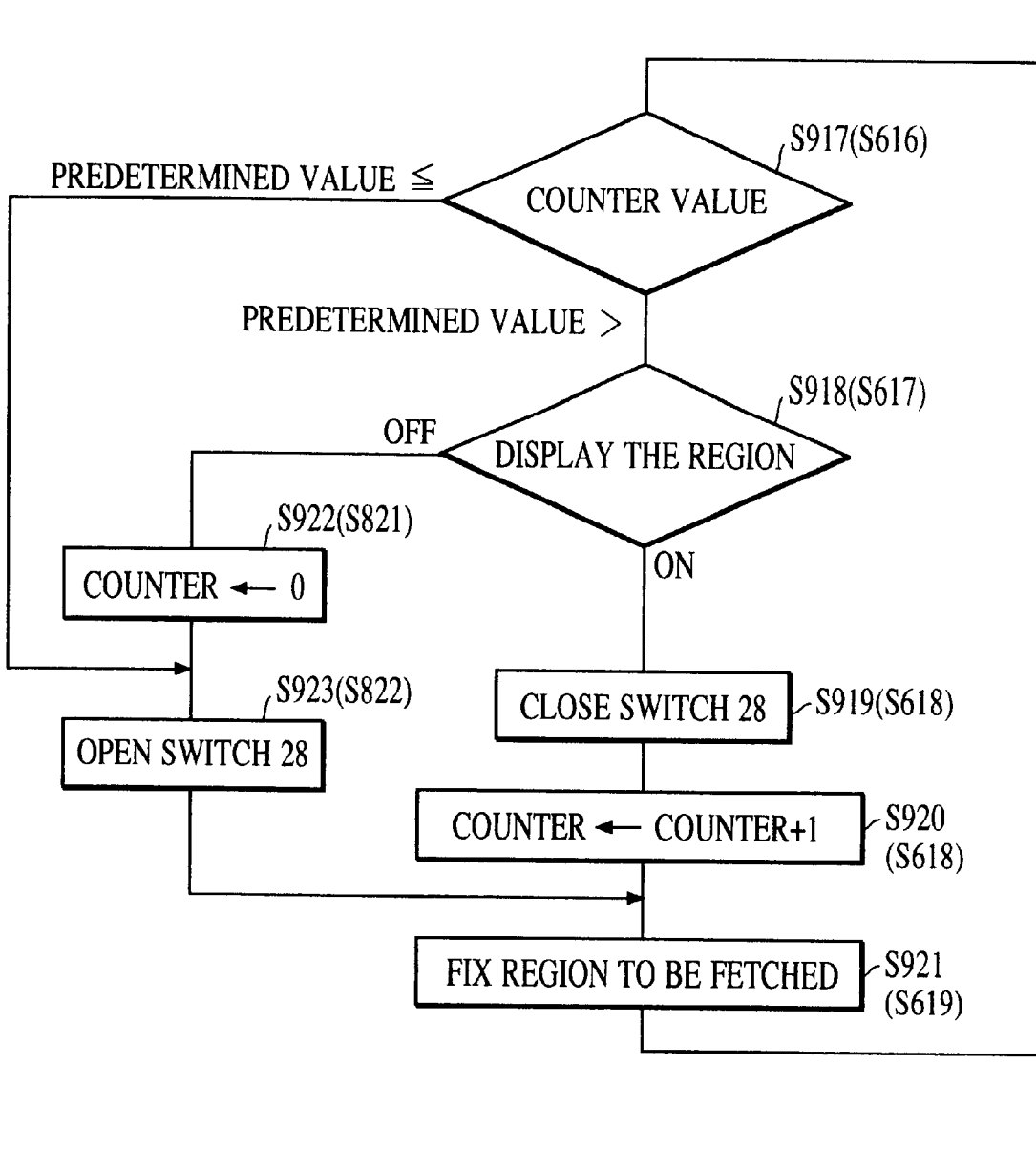

FIG. 25 is a flow chart of a tenth embodiment of the present invention, in which the switch 51 shown in FIG. 22 (b) is replaced by a fetched-region position setting device 41, such as the mouse or a joy stick shown in FIG. 17 to perform the process of the flow chart shown in FIG. 21. The steps for performing the same processes as those shown in FIG. 21 are given corresponding steps shown in FIG. 11 in the parentheses attached thereto.

In step S902, the state of the image-information fetched region variable mode switch 43 is discriminated. If the fetched region variable mode has been selected and movement of the input device 41 for setting the position of the region in which image information is fetched has been detected, that is, if the value in the previous coordinate memory and that in the present coordinate memory is not the same, the region is not displayed immediately. The state of the switch 51 is detected in step S905. If the switch 51 is switched to the non-display position, the switch 28 is opened in step S916 to turn off the display of the region.

If no movement from the input device 41 has been detected in step S904, but if the count of the counter has not been increased to a predetermined value in step S917 and if the switch 51 has been switched to the non-display position in step S918, the counter is cleared in step S922, and the switch 28 is opened in step S923. The foregoing process is the same as that in the flow chart shown in FIG. 24. The reason why the counter is opened in step S922 is the same as that described with the flow chart shown in FIG. 24. Therefore, steps S916, S922, and S923 are given the corresponding steps in the flow chart shown in FIG. 24 in the parentheses attached thereto.

Eleventh and Twelfth Embodiments

Figure 26:
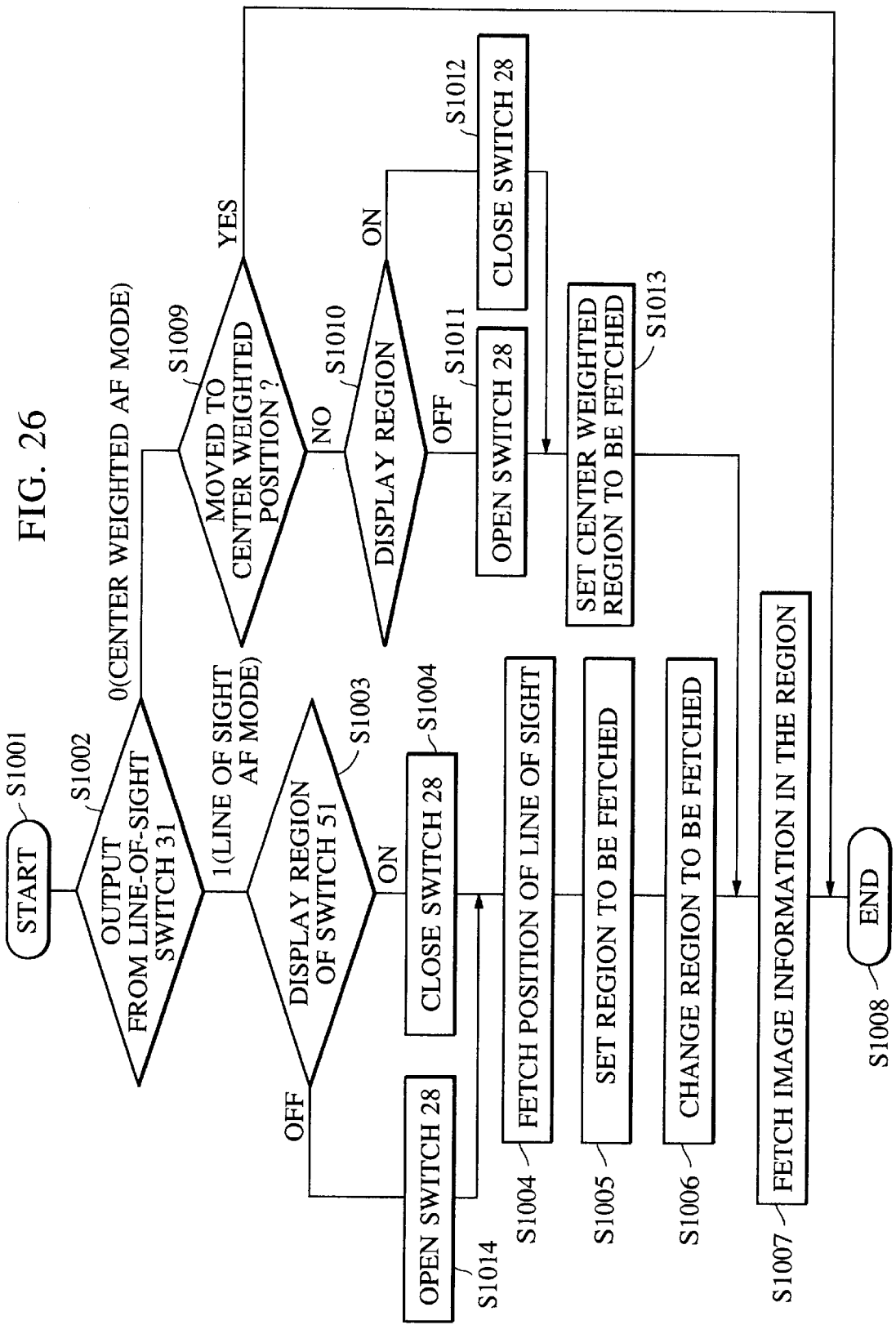
FIG. 26 is a flow chart of the operation according to an eleventh embodiment of the present invention.
Figure 27A:
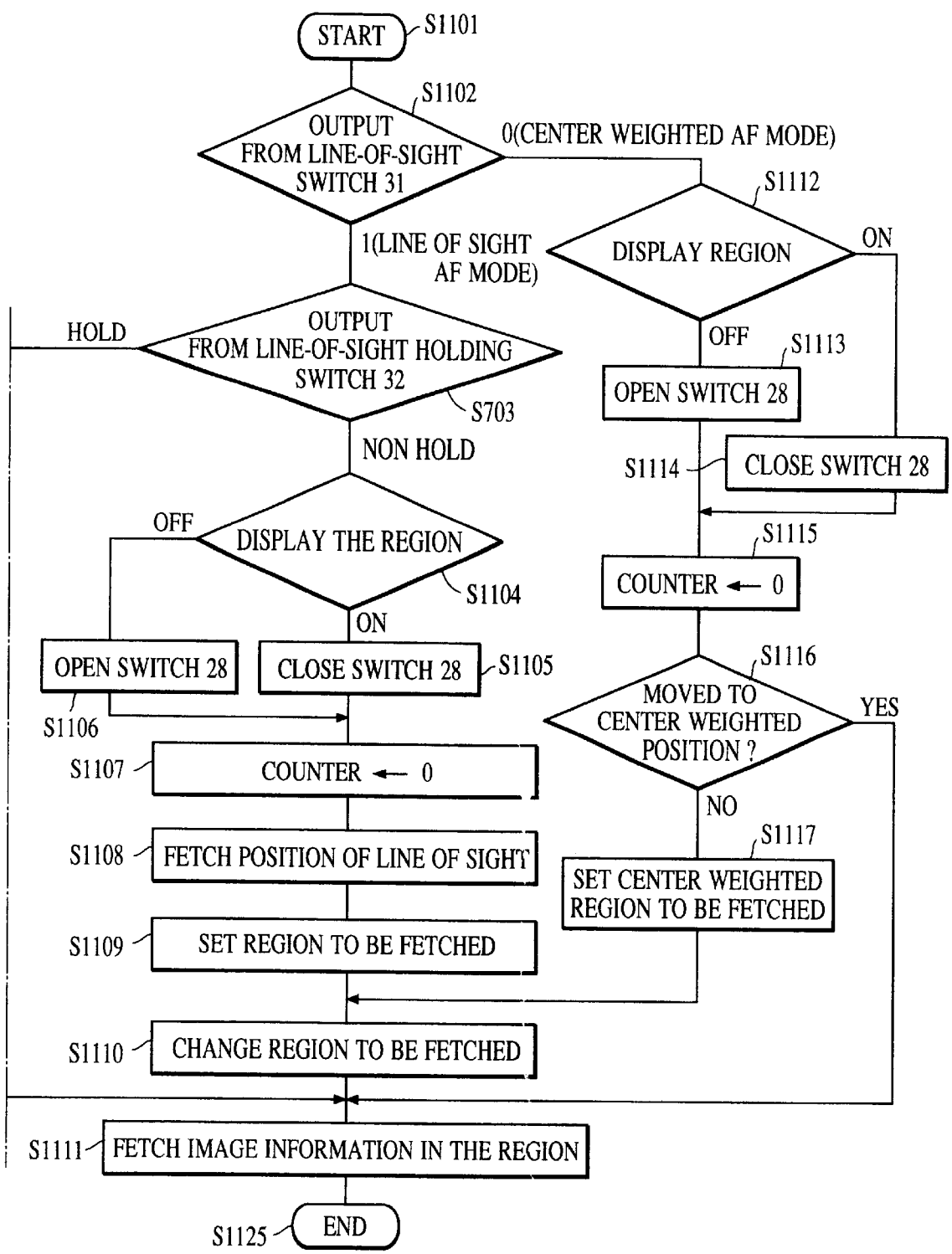
FIG. 27 is a flow chart of another operation according to the eleventh embodiment of the present invention.
Figures 27, 27B:
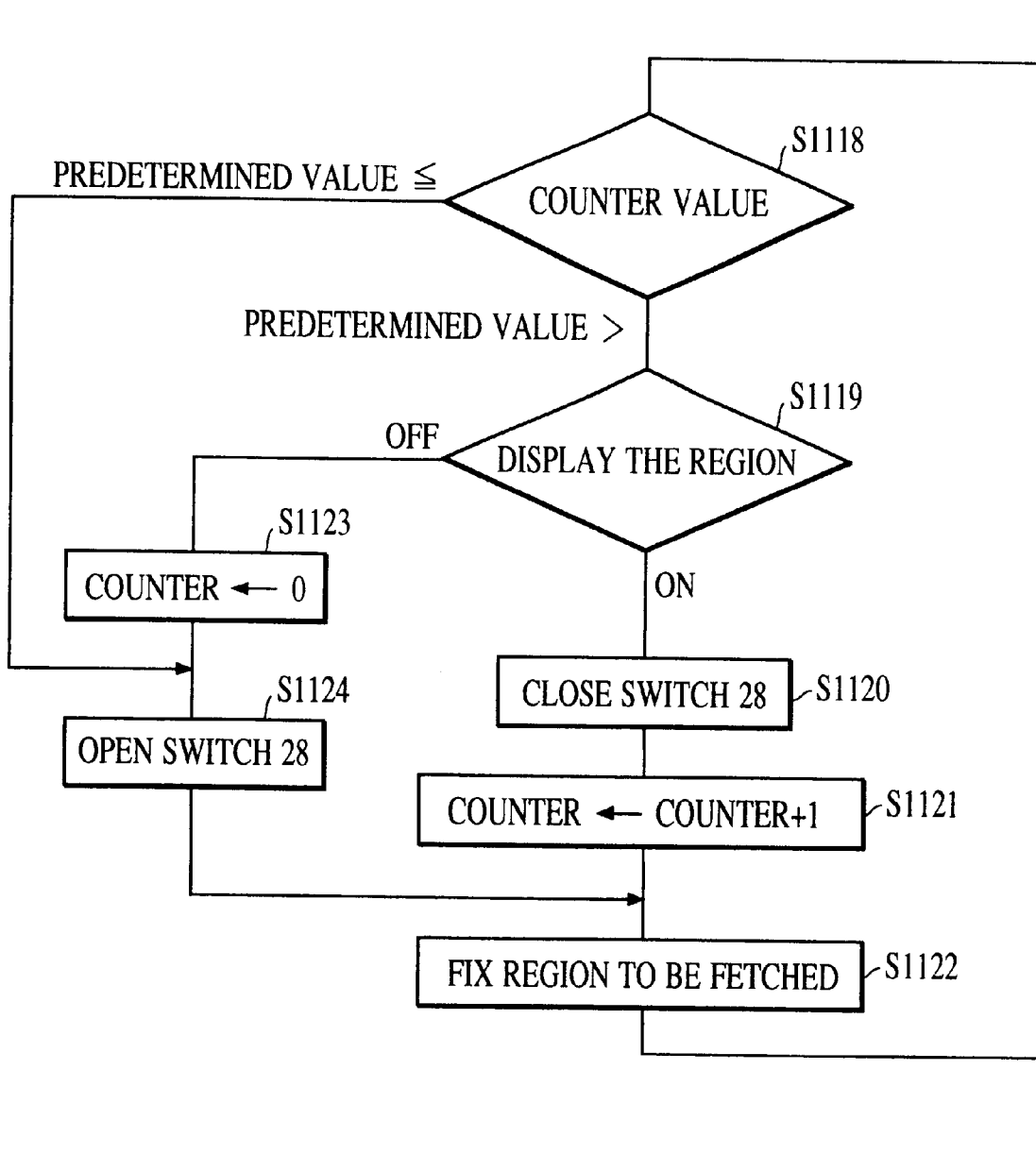
Figure 28A:
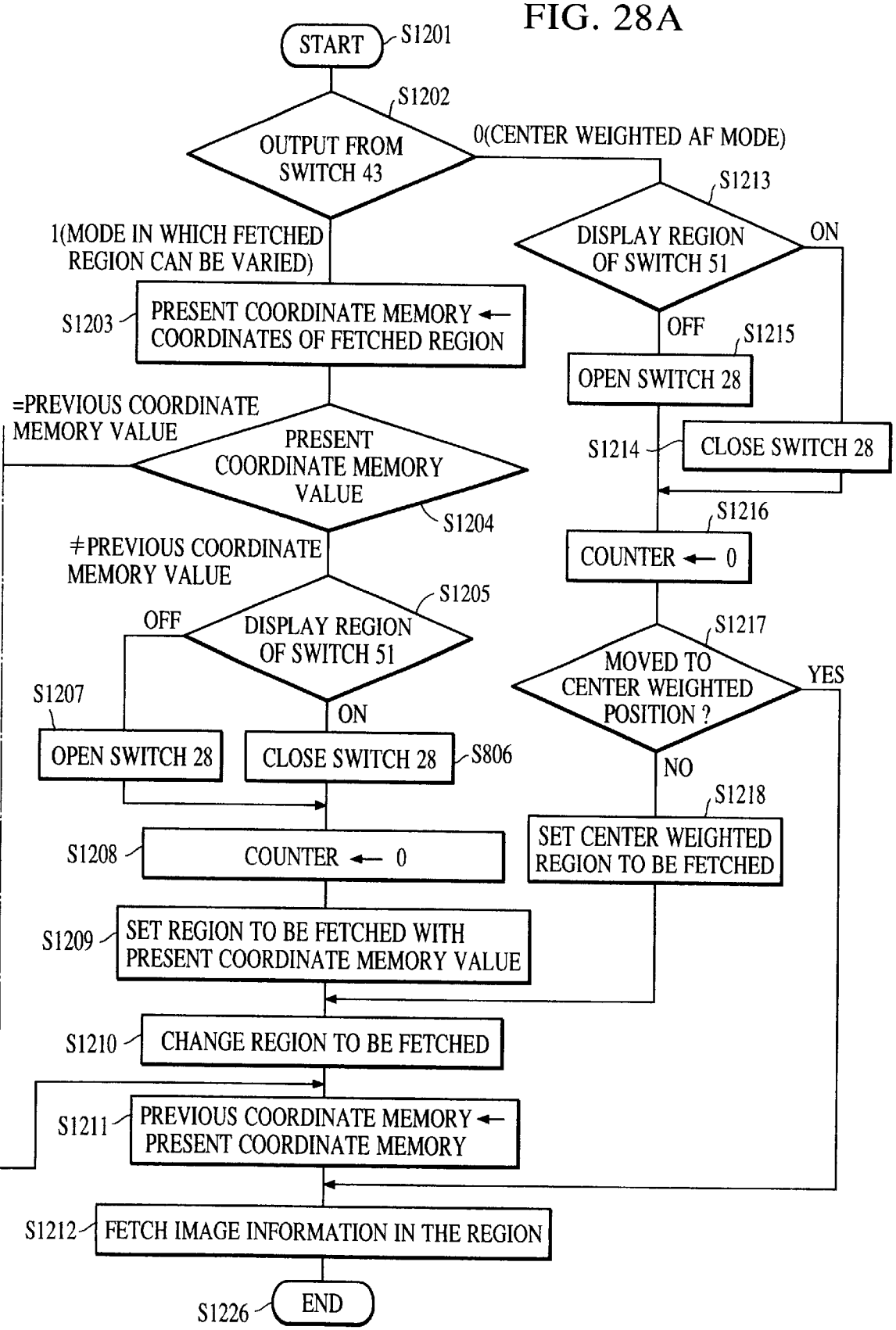
FIG. 28 is a flow chart of the operation according to a twelfth embodiment of the present invention.
Figures 28, 28B:
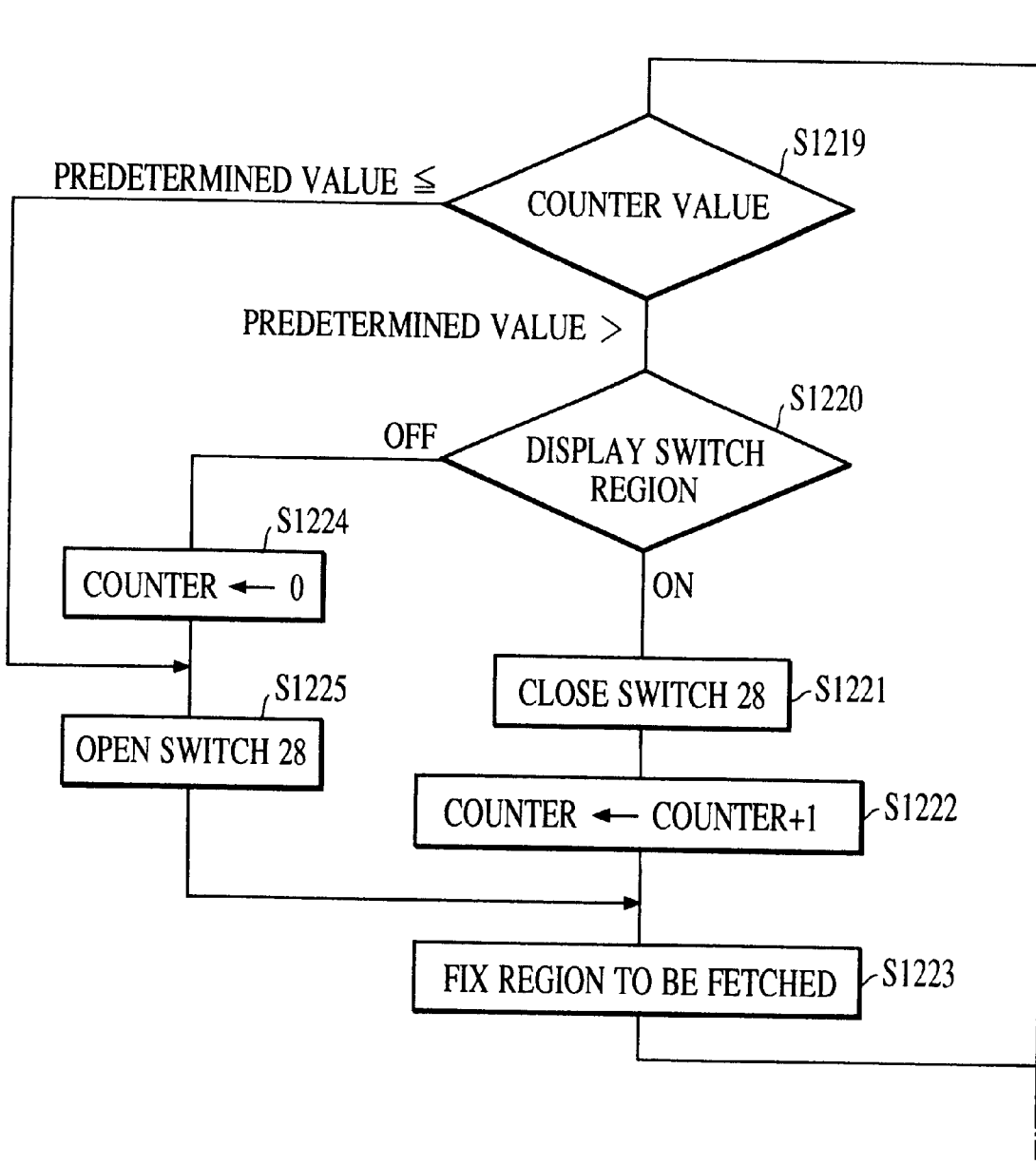

FIGS. 26, 27, and 28 are flow charts respectively having structures in which a portion of the flow shown in FIGS. 23, 24, and 25 is changed to enable (turn on/off) the display of the regions in which image information is fetched, to be selected even if the center-weighted AF mode is selected. FIGS. 26 and 27 show an eleventh embodiment, while FIG. 28 shows a twelfth embodiment.

In the flow charts shown in FIGS. 26, 27, and 28, the operations are the same as those shown in the flow charts shown in FIGS. 23, 24, and 25. Therefore, the description will be made about only the changed portions.

The portions shown in FIG. 26, which differ from those shown in FIG. 23, are as follows: when the line-of-sight switch 31 has been switched to the center-weighted AF mode in step S1002, the switch 28 is forcibly opened to turn off the display of the region in step S708 in the flow chart shown in FIG. 23. In the embodiment shown in FIG. 26, a process for detecting an output signal from the switch 51 is performed in step S1010. If the output signal from the switch 51 indicates the region display (ON), the switch 28 is closed in step S1012 so that the region is displayed. If the output signal indicates non-display (OFF), the switch 28 is opened in step S1011 so that the region display is turned off.

As a result, in the center-weighted AF mode in which the line of sight is not detected, display/non-display of the region in which image information is fetched can be selected. Therefore, control can be performed as desired by the operator.

The flow chart shown in FIG. 27 is different from that shown in FIG. 24 in the following portions: when the line-of-sight switch 31 has been switched to the center-weighted AF mode in step S1102, the display of the region is forcibly turned off by opening the switch 28 in step S811 in the flow chart shown in FIG. 24. In the embodiment shown in FIG. 27, a process for detecting an output signal from the switch 51 is performed in step S1112. If the output signal from the switch 51 indicates the region display (ON), the switch 28 is closed in step S1114 so that the region is displayed. If the output signal indicates the non-display (OFF), the switch 28 is opened to turn off the region display in step S1113.

As a result, in the center-weighted AF mode in which the line of sight is not detected, display/non-display of the region in which image information is fetched can be selected. Therefore, control can be performed as desired by the operator.

The flow chart shown in FIG. 28 is different from that shown in FIG. 25 in the following portions: when the line-of-sight switch 31 has been switched to the center-weighted AF mode in step S1202, the display of the region is forcibly turned off by opening the switch 28 in step S912 in the flow chart shown in FIG. 25. In the embodiment shown in FIG. 28, a process for detecting an output signal from the switch 51 is performed in step S1213. If the output signal from the switch 51 indicates the region display (ON), the switch 28 is closed in step S1214 so that the region is displayed. If the output signal indicates the non-display (OFF), the switch 28 is opened to turn off the region display in step S1215.

As a result, in the center-weighted AF mode in which the line of sight is not detected, display/non-display of the region in which image information is fetched can be selected. Therefore, control can be performed as desired by the operator.

As a result of the structures shown in FIGS. 26, 27, and 28, the operator is able to select display/non-display of the region in which image information is fetched. Therefore, if the operator intends to turn off the display because of complexity, the display can be turned off. If the operator desires to detect the state of the region, the display can be performed so that the state of the region can be detected. Thus, a convenient function for the operator can be realized.

Thirteenth Embodiment

FIG. 29 shows a method of using a memory in the system microcomputer 30 in place of switches to turn on/off the display the region similarly to FIGS. 23, 24, 25, 26, 27, and 28.

Referring to FIG. 29, reference numeral 61 represents display of day and time superimposed on a screen 401 of the electronic view finder 24. A camera for the general user having a video tape recorder integrated therewith usually has a function of superimposing the above display on a photographed image so as to be recorded.

It is preferable that the display of the date and time be selected to meet the desire of the photographer from a group consisting of the year, year in the Japanese Era, and 12 hours or 24 hours mode. Furthermore, the method of displaying the date and the time is not changed at each use but a selected display method is preferably stored even after the power supply has been turned off.

Reference numeral 62 represents a storage device among non-volatile memories included in the system microcomputer 30, the storage device 62 storing the result of selection relating to the display of the date and the time performed by the operator. The contents in the memory 62 can be changed in bit units by the operator. The third bit in the memory 52 is a flag for use to select the display of the year among the display of the date and the time whether the year or year in the Japanese Era is employed. The fourth bit is a flag for use to select English or Numerals to display the month. The fifth bit is a flag for use to select English or Japanese to display the day of the week, and the sixth bit is a flag for use to select a 12-hours cycle or 24-hours cycle to display the time. If a selection indicated by reference numeral 62 is performed, the date and the time are displayed on the screen as indicated by reference numeral 61.

The foregoing function in which the memory is used in place of the switch and the contents in the memory is changed by the operator to change the operation mode of the apparatus is called a "menu selection function" for convenience to perform the description. The menu selection function has been widely used in apparatuses for the general user. Since the method of changing the contents in the memory is a known fact and a variety of methods are available, the description of the method is omitted here.

The seventh bit in the memory 62 acts to perform the function of the switch 51 for selecting whether or not the region display shown in FIG. 22 (*b*) is performed.

The contents of the seventh bit can be changed by the menu selection function similarly to the method of displaying the date and the time. If the seventh bit 30 in the memory 62 is "1", the display of the region is turned on. If it is "0", the display of the region is turned off. By reading whether the display of the region is turned on or off in steps S703 shown in FIG. 23, step S804 shown in FIG. 24, step S905 shown in 35 FIG. 25, step S1003 shown in FIG. 26, step S1112 shown in FIG. 27, and step S1213 shown in FIG. 28, the same function and operation as those of the switch 51 can be realized without the switch 51.

Fourteenth Embodiment

Figure 30A:
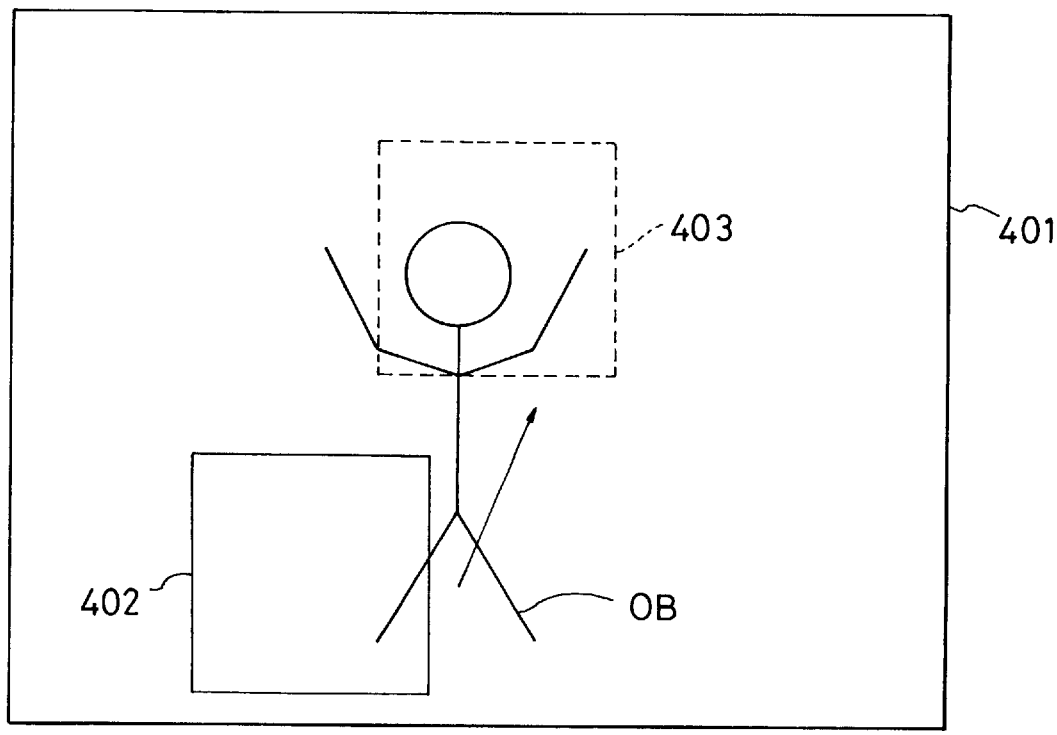
FIG. 30 is a diagram showing a fourteenth embodiment of the present invention.
Figure 30B:
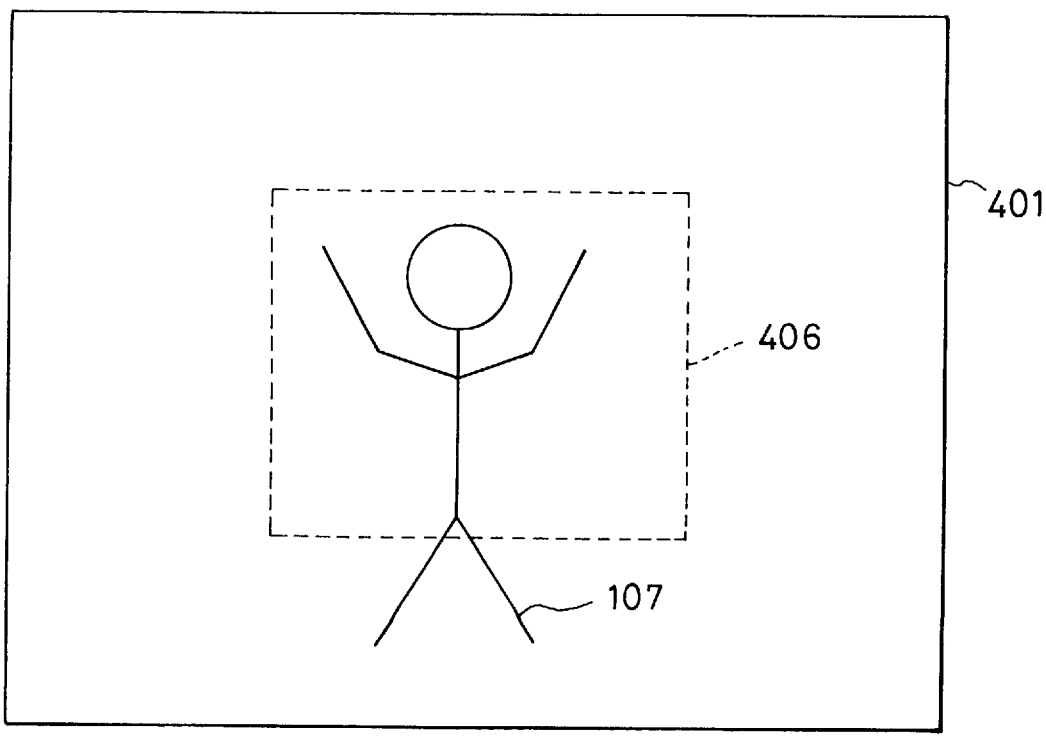

The description has been made about a structure in which the position of the region in which image information is fetched is changed among the states of the region. However, the structure shown in FIG. 22 (*b*) enables the position and size of the region to be transferred from the AF microcomputer 29 to the frame generating circuit 27. Therefore, a function capable of changing the size of the region can be provided. Simply, a structure shown in FIGS. 30 (*a*) and 30 (*b*) may be employed in which the fetched region is enlarged in the center-weighted AF mode as compared with the size in the region movable mode so that a large region 406 is displayed.

In a case where a focal point detection region and a photometry region are set on a specific subject of a portion of the same in the frame by means of detecting the line of sight, the regions must be further precisely set as compared with photography performed while fixing the regions in the central portion.

Because of the foregoing necessity, a change in the size of the region is required. In order to prevent non-required portions to be included in the region in which image information is fetched, such as the focal point detection region and the photometry region, the size of the region can be reduced so that photography is performed as desired by the operator.

A variety of means for setting an arbitrary size of the fetched region may be employed. For example, the fetched region position setting device 41, such as the mouse or the joy stick shown in FIG. 17 or the memory 62 shown in FIG. 29 may be used. However, the means for setting the size is not the main characteristic of the present invention and therefore the description of the means is omitted here.

As described above, image information of a certain region in the frame is fetched even if the AE process is performed. Therefore, if image information and information about the fetched region are also supplied to the AE processing circuit as shown in FIGS. 14 and 17, the foregoing six embodiments may be applied to the AE process.

Fifteenth Embodiment

The video camera has been employed in the embodiments above. Although image information can be obtained by a video camera through image pickup devices, such as lenses and a CCD, the present invention may be widely employed in a video editing machine or an image-signal processing means excluding a video camera but having a function of taking a portion of the image signal.

Figure 31:
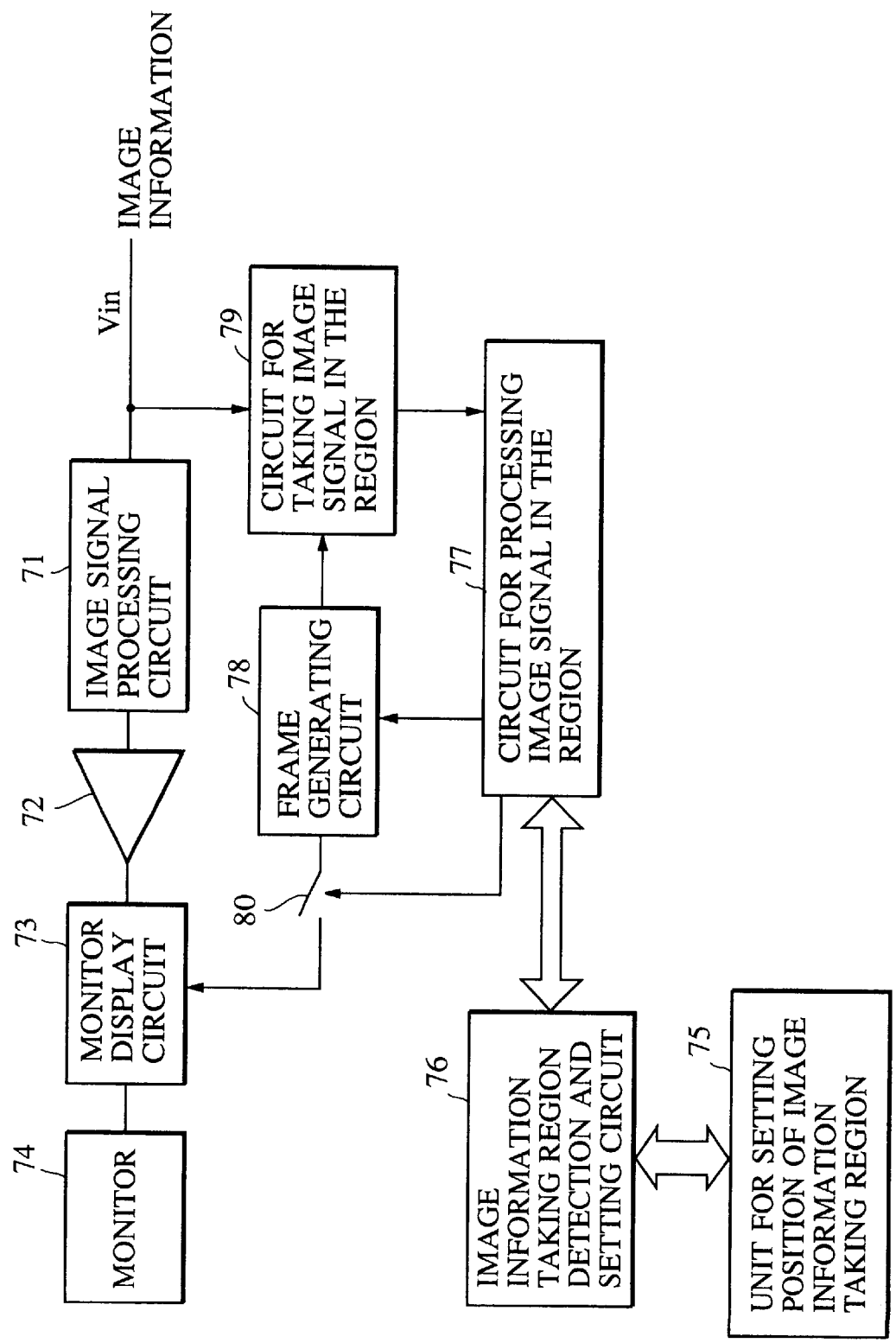
FIG. 31 is a block diagram showing a fifteenth embodiment of the present invention.

FIG. 31 is a schematic diagram of main blocks in a structure in which the concept of the present invention according to the foregoing seven embodiments is employed in an apparatus other than a video camera.

The relationship between the blocks shown in FIG. 31 and those shown in FIGS. 14 and 17 will now be described. An image signal processing circuit block 71 corresponds to the camera signal processing block 21 shown in FIGS. 14 and 17. An amplifier 72 corresponds to the amplifier 22, a monitor display circuit 73 corresponds to the LCD display circuit 23, and a monitor 74 corresponds to the electronic view finder 24.

An image-fetched-region position setting apparatus 75 corresponds to the line-of-sight detection mechanism shown in FIG. 14 or the fetched-region position setting apparatus 41 shown in FIG. 17. An image-information fetched region detection and setting circuit 76 corresponds to the line-of-sight detection circuit 6 or the fetched-region detection and setting circuit 42 shown in FIG. 17. An inside-region image-signal processing circuit 77 corresponds to the AF microcomputer 29 shown in FIGS. 14 and 17. A frame generating circuit 78 corresponds to the frame generating circuit 27 shown in FIGS. 14 and 17. An inside-region image-signal fetching circuit 79 corresponds to each gate circuit in the circuit 26 for processing the evaluated AF value and the diaphragm control circuit 25 shown in FIGS. 14 and 17.

Referring to FIG. 31, each block will now be described while making it correspond to the block diagrams shown in FIGS. 14 and 17. An image signal input through an image input terminal Vin is input to the image-signal processing circuit 71 so as to be subjected to a predetermined process so as to be demodulated into a television signal, followed by being amplified by the amplifier 72 and displayed on the monitor 74 through the monitor display circuit 73.

On the other hand, image information is also supplied to the inside-region image-signal fetching circuit 79 so that image information for a predetermined region is taken by cutting the inside-region image-signal fetching circuit 79 so as to output to the inside-region image-signal processing circuit 77. The inside-region image-signal processing circuit 77 subjects the image signal output from the region-inside image-signal fetching circuit 79 to a predetermined process in order to achieve the object thereof. For example, a variety of processes, such as edition, synthesis, enlargement, reduction, substitution and the like are performed.

When the region in which image information is fetched has been set by an operator by means of the image-information fetched-region position setting apparatus 75 and the fetched region detection and setting circuit 76, the set fetched region is transferred to the inside-region image-signal processing circuit 77. The inside-region image-signal processing circuit 77 appoints gate timing for the frame generating circuit 27.

The frame generating circuit 78 fetches the appointed region in the inside-region image-signal fetching circuit 79 by transferring gate information and the like to the inside-region image-signal fetching circuit 79 and by outputting a region-display signal to the switch 80.

The switch 28 is controlled in accordance with an appointment from the inside-region image-signal processing circuit 77. In order to display the region on the monitor 74 if necessary, the switch 28 closes the switch 80.

The monitor display circuit 73 superimposes an output signal from the amplifier 72 and an output signal from the switch 28 to display the superimposed signals on the monitor 74.

As can be understood from the description of the operation, the application of the present invention is not limited to the video camera. The present invention can be widely used in an apparatus of a type in which a portion of image information is taken and the information is processed.

FIG. 31 is a diagram showing a main portion of the apparatus above. Since the blocks shown in FIGS. 30, 14 and 17 correspond to one another, the functions shown in FIG. 30 correspond to those shown in FIGS. 14 and 17 to perform the foregoing processes in the corresponding blocks to achieve the thesis of the present invention.

As described above, according to the foregoing embodiment, if the region in which image information is fetched is fixed, or if the state of the region is not required to be confirmed, the state of the region is not displayed on the monitor. In a mode in which the region is changed, the region is displayed on the monitor. Therefore, the unnecessary display is turned off from the monitor screen if the region is not changed and, therefore, the complexity of the screen can be prevented. If the state of the region must be confirmed as in a case where the position of the region is changed, the region is displayed on the monitor screen. Thus, setting can be performed easily and precisely.

The foregoing control can easily and reliably be performed without a complicated switching operation.

Even in a mode in which the region is changed, the region is not displayed on the monitor if the region is not actually changed. Thus, a complicated display can be omitted from the monitor.

Since the display of the state of the region is not immediately turned off if the region is not changed but the display is turned off after a predetermined time has passed, the operator is able to confirm the state of the region. Therefore, the operation can be performed more accurately and reliably.

Since the display of the state of the region is performed when the region has been changed in a case where the display of the state of the region has been turned off in a state where the region is not changed, the operator is able to immediately confirm the region when the region has been changed. Therefore, quick and precise region setting can be performed.

Since the operator is able to select to turn on/off the display of the region, the region is displayed only when the operator requires it. Therefore, an effect can be provided for the operator to prevent complexity of the monitor screen.

Since the region is the focal point detection region, an AF operation can be performed with an image recording apparatus, such as a video camera, in such a manner that the intention of the operator is accurately reflected on the main subject.

Since the foregoing region is the photometry region, an AF operation can be performed with an image recording apparatus, such as a video camera in such a manner that the intention of the operator is accurately reflected on the main subject.

Since the region control means is the line-of-sight detection means for detecting the position of the line of sight of the operator, the position of the line of sight can be clearly displayed when the foregoing predetermined region is moved to the detected position of the line of sight. As a result, the region setting operation can easily and precisely be performed.

Since the region control means is the mouse or joy stick, the set position can clearly be displayed at the time of the setting operation. Thus, the region setting operatic can be performed accurately.

Since the region control means is the mouse or joy stick, scattering of the line-of-sight occurring when the line-of-sight detection apparatus is used can be eliminated. Thus, a precise setting operation can be performed.

Since the structure is arranged in such a manner that the frame indicating the region is displayed while being superimposed on image information, the range of the predetermined region can be confirmed as well as the position of the same. Consequently, a precise region setting operation can be performed.

Since the display means is the electronic view finder, a complicated switching operation can be omitted. While performing the photographing operation with the video camera, the region can be set. As a result, the ease of operation can be improved significantly.

Sixteenth Embodiment

A sixteenth embodiment of the present invention will now be described. As described above, the apparatus according to the present invention is provided with a method for varying a region to be detected, such as the range finding frame, by using detection of the line of sight or a joy stick and a method for fixing the region at the central portion of the frame.

The center fixing range finding method and the line-ofsight position detection range finding method are employed to obtain different objects and in different states. In a case where a more detailed portion of a subject is subjected to focal point detection or photometry, the region setting method using the detection of the line of sight is preferably employed. In a case where a focal point detection region of a certain subject is intended to be fixed or in a case where the operator leaves the apparatus while maintaining the photographing condition, the fixed range finding method is preferably employed.

It might therefore be feasible to compose an image pickup apparatus having a structure provided with the two methods so as to be selectable to optimally adjust the focal point and exposure regardless of the state of the subject and the photographing conditions. However, the structure in which the two methods are combined with each other creates the following problems when the focal point detection region and the photometry region can be moved by means of line of sight.

The problem is that the center fixing range finding method and the line-of-sight position detection range finding method are different from each other in the optimum setting of the focal point detection region in the frame.

Since the center fixing method raises a problem in that a main subject cannot be appropriately focused in a case where the subject is placed in a location other than the central portion of the frame, the foregoing problem can be overcome by setting the focal point detection region to have a relatively large size in the frame. However, the focal point detection method using the position of the detected line-of-sight must have a relatively small focal point detection region in the frame in order to move the focal point detection region to the position of the subject to obtain optimum focusing regardless of the position of the main subject in the frame to be photographed.

Accordingly, the applicant of the present invention has disclosed an image pickup apparatus in Japanese Patent Publication No. - which comprises a center fixed range finding method and a line-of-sight position detection range finding method such that the size of the focal point detection region and the photometry region is switched appropriately.

However, development and research performed by the applicant of the present invention resulted in unsolved problems to be further improved.

However, if similar AF control is performed with the center fixing range finding method and the line-of-sight position detection range finding method, although they are different from each other in the size and positions of the focal point detection region and the photometry region, the following problem arises as a result of the research and development performed by the applicant of the present invention.

Since the size of the focal point detection region is reduced and the focal point detection region can be moved in the frame to be photographed when the line-of-sight position detection range finding is performed, the main subject can easily be moved outside the focal point detection region due to the movement of the subject. During the movement of the focal point detection region with the movement of the position of the line of sight, the subject is sometimes not present in the focal point detection region. Therefore, the evaluated AF value to be fetched in the focal point detection region changes excessively, causing the AF operation to be made instable or to involve an erroneous operation. In the foregoing case, the performance is inferior to the AF performance of the center fixing range finding method.

The embodiment below is arranged to overcome the foregoing problem and an object of this embodiment is to provide an image pickup apparatus having an optimum AF performance in both the center fixing range finding method and the focal point detection method in which the position is set with an external input, such as the detection of the line-of-sight, capable of preventing deterioration in the AF performance in the focal point detection method with which the position is set with an external input, such as the detection of the line-ofsight, and using the characteristics of the two methods so that the main subject is appropriately focused.

That is, the apparatus according to this embodiment comprises a gate means for fetching an image pickup signal corresponding to the inside of a predetermined region in a frame to be photographed; an appointing means for appointing the set position of the predetermined region in the frame; a focal-point adjustment means that detects a predetermined frequency component from the image pickup signal fetched by the gate means and corresponding to the predetermined region so as to adjust the focal point in accordance with the state of focusing; a control means which controls the gate means in accordance with an appointment from the appointing means, which is capable of setting a first mode in which the predetermined region is set at a position in the frame appointed by the appointing means. A second mode in which the predetermined region is fixed to a predetermined position in the frame without use of the appointing means and which has different operation characteristics of focal point adjustment means than the first mode; and a selection means for selecting the first mode or the second mode.

As a result, an optimum AF operation characteristic can be realized in the first mode in which the focal point detection region can be moved by the appointing means, as well as the second mode, in which the focal point detection region is fixed, without deterioration in the AF performance.

Figure 32A:
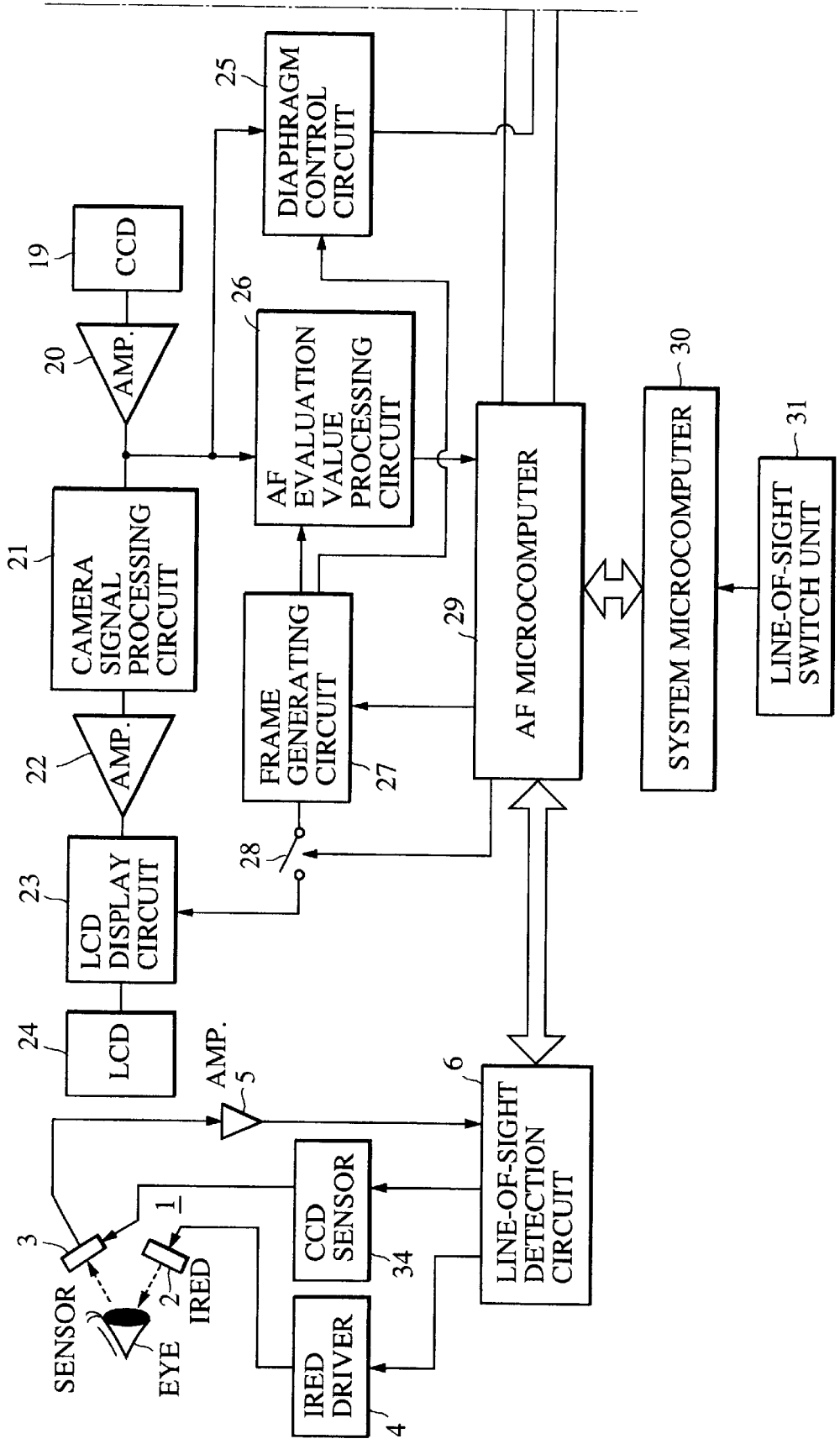
FIG. 32 is a block diagram showing the structure of a sixteenth embodiment of the present invention.

FIG. 32 is a block diagram having a structure in which this embodiment is applied to a camera having a video tape recorder integrated therewith. Since the basic structure is the same as that shown in FIG. 1, the same elements are omitted from illustration. The description will be made about the different portions.

This embodiment is different from the foregoing structure in the operation of the AF microcomputer 29 for controlling the focusing compensating lens in accordance with an output signal from the circuit 26 for processing the evaluated AF value and the movement of the magnification-varying lens 9. This embodiment performs both focusing and corrects focusing at a time of varying the magnification and for controlling the frame generating circuit 27 for changing the positions of the focal point detection region and the photometry region in the frame in accordance with information about the detected line of sight to be described later.

The AF microcomputer 29 communicates control information and data with the line-of-sight detection circuit 6 to control the line-of-sight detection circuit 6 and receives information about the position of the point of interest of an operator detected by the line-of-sight detection circuit 6. In accordance with information about the position of the line of sight of the operator received from the line-of-sight detection circuit 6, the AF microcomputer 29 moves the focal point detection region and the photometry region and performs other controls using the line of sight.

Reference numeral 30 represents a system control microcomputer (hereinafter called a "system control") for totally controlling a video camera system. Reference numeral 31 represents a line-of-sight switch connected to the system computer 30 to turn on/off the line-of-sight detection function. The state of the line-of-sight switch 31 is read by the system computer 30.

The system computer 30 is communicated with the AF microcomputer 29 to control the operation of the AF microcomputer 29 in accordance with the operation mode of the system and transfers information of the state of the line-of-sight switch 31 to the AF microcomputer 29 so that a variety of operations using the line-of-sight are controlled.

That is, the system computer 30 transfers the state of the line-of-sight switch 31 information to the AF microcomputer 29, while the AF microcomputer 29 turns on the switch 33 when the line-of-sight switch 31 is switched on. Thus, the line-of-sight detection mode is set such that display signals of the focal point detection region and the photometry region are supplied to the LCD display circuit 23 so as to be displayed on the screen of the electronic view finder.

When the line-of-sight switch 31 is switched off and thus the line-of-sight detection mode is turned off, the switch 33 interrupts the supply of the frame display signals of the focal point detection region, the line-of-sight region, and the photometry region to the LCD display circuit 23 so that display in the electronic view finder screen is turned off.

This embodiment employs a so-called television AF method (hereinafter called a "TV-AF method"), that is, a focal point adjustment method in which a band-pass filter in the circuit 26 for processing the evaluated AF value fetches the high-frequency component from the image signal. The microcomputer 29 calculates the direction in which the focusing motor is rotated and the rotational speed in a manner that the level of the high-frequency component is made maximum; the focus compensating lens motor 17 is rotated through the focus compensating lens driver 18 so that the focus compensating lens 12 is moved in the direction of the optical axis.

In the AF method, the high frequency component contained in the image signal is detected if the image signal fetched by the circuit 26 for processing the evaluated AF value contains edge portions (level changed portions). Image signals for one or more horizontal scanning line must be used. In general, a region having a predetermined area must be fetched. The foregoing region is a focal point detection region (a range finding region).

The internal structures and connections of the circuit 26 for processing the evaluated AF value, the diaphragm control circuit 25, and the frame generating circuit 27 are shown in FIG. 3.

Referring to FIG. 3, information about the size and position of the fetched region is transferred to the gate timing generating circuit 274 in the frame generating circuit 27 from the AF microcomputer 29.

The AF microcomputer 29 discriminates whether or not the mode is the line-of-sight detection mode in which the set positions of the region in which image information is fetched, such as the focal point detection region and the photometry region, are determined by detecting the point of interest in accordance with the state of the line-of-sight switch 31 supplied from the system computer 30. If the mode is the line-of-sight detection mode (the line-of-sight switch 31 is switched on), an instruction for generating a frame for setting a fetched region having a predetermined size determined in accordance with each mode is output to the frame generating circuit 27 to set the fetched region at the position at which the line of sight has been detected in the screen output from the line-of-sight detection circuit 6. If the mode is the non line-of-sight mode (the line-of-sight switch 31 is switched off), the fetched region is set at a fixed position in the central portion of the screen. The fetched region has a size determined on the basis of each mode.

FIG. 4 (*b*) is a diagram showing an example of the foregoing usual region, in which the evaluated AF value is fetched. Referring to FIG. 4 (*b*), reference numeral 401 represents a frame to be photographed, and 404 represents a focal point detection region for fetching the evaluated AF value (it may be a photometry region) which is fixed in the central portion of the frame. In this embodiment, the focal point detection region is a fetched region in a non line-of-sight detection mode.

A photographer usually photographs a subject (a main subject) intended to be photographed by placing the subject in the central portion of the frame. In order to prevent influence of another subject when a main subject is photographed, the size of the region in which the evaluated value is fetched is reduced as compared with that of the overall frame to be photographed. In order to prevent influence of the movement of the main subject and the photographing operation, the region usually has a somewhat large area. As a result, the fetched region 404 having a predetermined size is fixed in the central portion of the frame.

However, a photographer does not always photograph a subject in a manner where the main subject is fixed in the central portion of the frame. In order to photograph a main subject placed outside the central portion of the frame, the fetched region must be moved on the frame to be photographed.

Therefore, referring to FIG. 32, the AF microcomputer 29 transfers the coordinates of the position of the fetched region to the frame generating circuit 27 in order to move the fetched region to a position which is being observed by a photographer on the frame in accordance with information of the coordinates of the position of the line of sight transferred from the line-of-sight detection circuit 6 to the AF microcomputer 29 (the line-of-sight detection mode).

FIG. 4 (*a*) is a diagram showing the setting of the focal point detection region in the line-of-sight detection mode.

The evaluated-AF-value frame generating circuit 27 controls the opening/closing timing of the gate circuit in the circuit 26 for processing the evaluated AF value so as to move the fetched region to an appointed position. Furthermore, the evaluated-AF-value frame generating circuit 27 transfers a display signal indicating the fetched region to the LCD display circuit 23 in order to display the portion corresponding to the fetched region on the electronic view finder 24 (at this time the switch 33 is switched on).

The LCD display circuit 23 superimposes the image pickup signal from the amplifier 22 and a region display signal from the frame generating circuit 27 so as to supply an image signal to the electronic view finder 24. A state of an image to be displayed on the electronic view finder 24 at this time is shown in FIG. 4 (*a*).

Referring to FIG. 4 (*a*), reference numeral 405 represents the present position of a point of interest of a photographer. A fetched region 402 is set relative to the position of the point of interest. The microcomputer 29 controls both the gate circuit 261 in the circuit 26 for processing the evaluated AF value, and the gate circuit 251 in the diaphragm control circuit 25. Furthermore, the microcomputer 29 displays the fetched region 402 shown in FIG. 4 (*a*).

If the photographer then moves the viewpoint thereof to a position 405 in the frame, a fetched region 403 is set relative to the viewpoint 405 by a similar method. Then, the display of the fetched region 402 is moved to the position of the region 403 relative to the viewpoint 405.

As a result of the foregoing method, focusing of a subject being observed by the photographer, can be performed. In this case, it is preferable that the exposure of a subject, which is being observed by the photographer, be adjusted as well as performing focusing.

Therefore, this embodiment has a structure in which a signal for setting the fetched region is transferred from the frame generating circuit 27 to the diaphragm control circuit 25 as shown in FIGS. 3 and 32. As a result, in both AF and AE operations, the region in which photometry information is fetched, that is, the photometry region can be moved to the position which is being observed by the photographer to adjust the exposure on the basis of photometry information of the foregoing portion.

Since the positions of the focal point detection region and the photometry region are set in accordance with the line-of-sight of the operator to meet the desire of the operator in the line-of-sight detection mode, the regions are set to have smaller sizes compared to the sizes in the non line-of-sight detection mode in order to finely and precisely select the portion which is intended to be focused, and a portion in which photometry is chiefly performed.

Figure 33B:
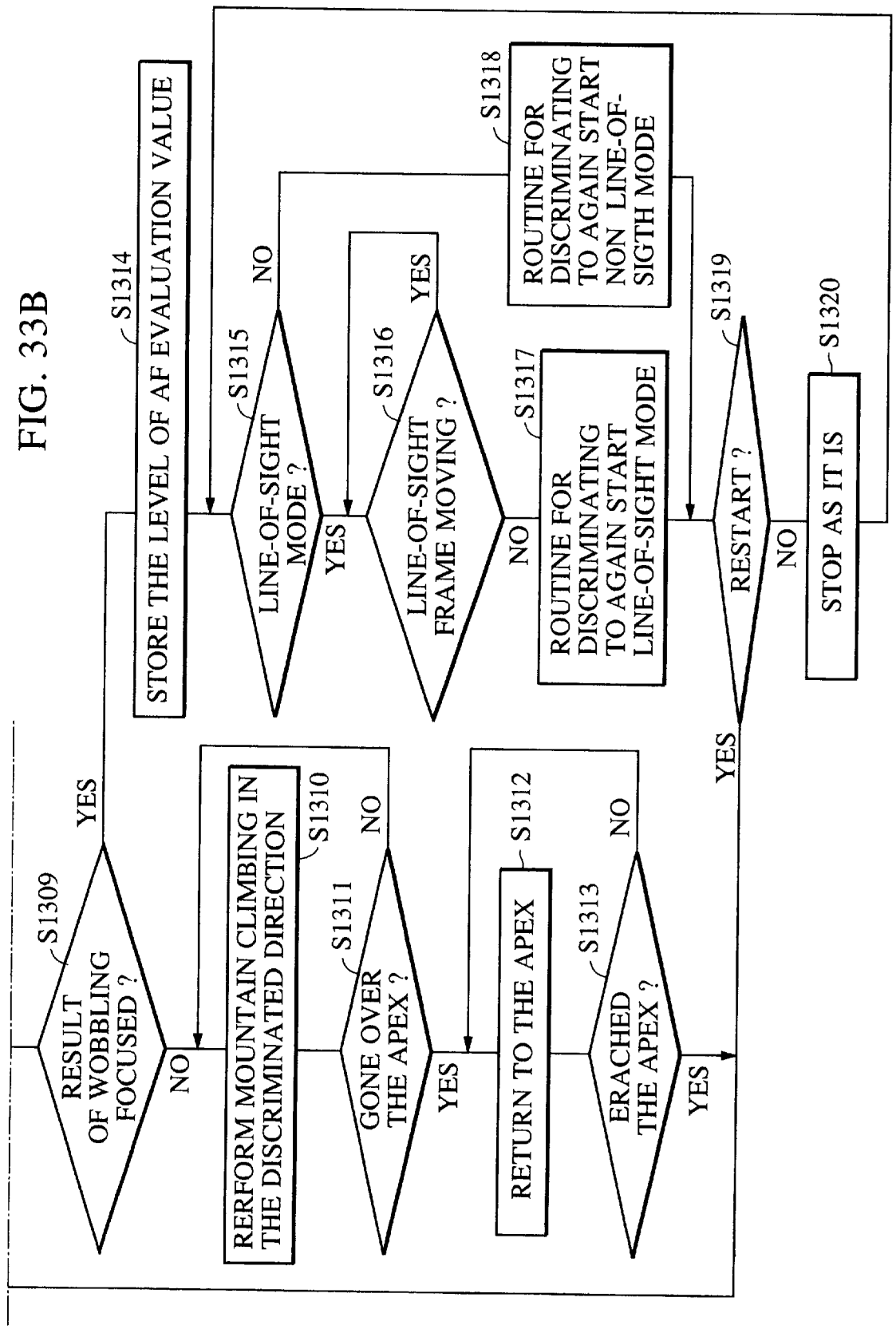
FIG. 33 is a flow chart of the operation according to the present invention.

An AF control method, which is a characteristic of the present invention, and which is capable of preventing deterioration in the AF performance in both line-of-sight detection mode and the non line-of-sight detection mode will now be described with reference to a flow chart shown in FIG. 33.

The flow chart shown in FIG. 33 shows an example of an algorithm capable of preventing the problem in AF operation due to movement of the focal point detection region in the line-of-sight detection mode where the focal point detection region is smaller than the focal point detection region in the non line-of-sight detection mode. The operation in the foregoing flow chart is performed by the AF microcomputer 29.

Referring to FIG. 33, when the operation starts, an AF control process is started in step S1301.

In step S1302, the state of the line-of-sight switch 31 obtainable through the system computer 30 is examined to discriminate whether or not the mode is the line-of-sight detection mode.

If the mode is the non-line-of-sight detection mode as a result of the discrimination performed in step S1302, the operation proceeds to step S1304 in which a wobbling operation is performed. The wobbling operation is an operation in which change in the evaluated AF value due to fine movement of a focusing lens which is forcibly and finely moved in the direction of the optical axis is fetched such that focusing has been established or an out of focus (whether front mis-focus or rear focus if the output of focus state is discriminated) image is discriminated.

If a discrimination has been performed in step S1302 that the mode is the line-of-sight detection mode, a discrimination is performed whether or not the point of interest in the frame is being moved in accordance with information about the position of the line of sight obtained from the line-of-sight detection circuit 6 (step S1303). If the point of interest is moved, a discrimination can be performed where the position of the focal point detection region is intended to be moved. Therefore, standby mode starts while stopping the focusing lens. After the movement has been completed, the wobbling operation in the line-of-sight mode is performed in step S1304.

Then, the wobbling operation in the line-of-sight mode/non line-of-sight mode will now be described with reference to FIG. 35.

Figure 35A:
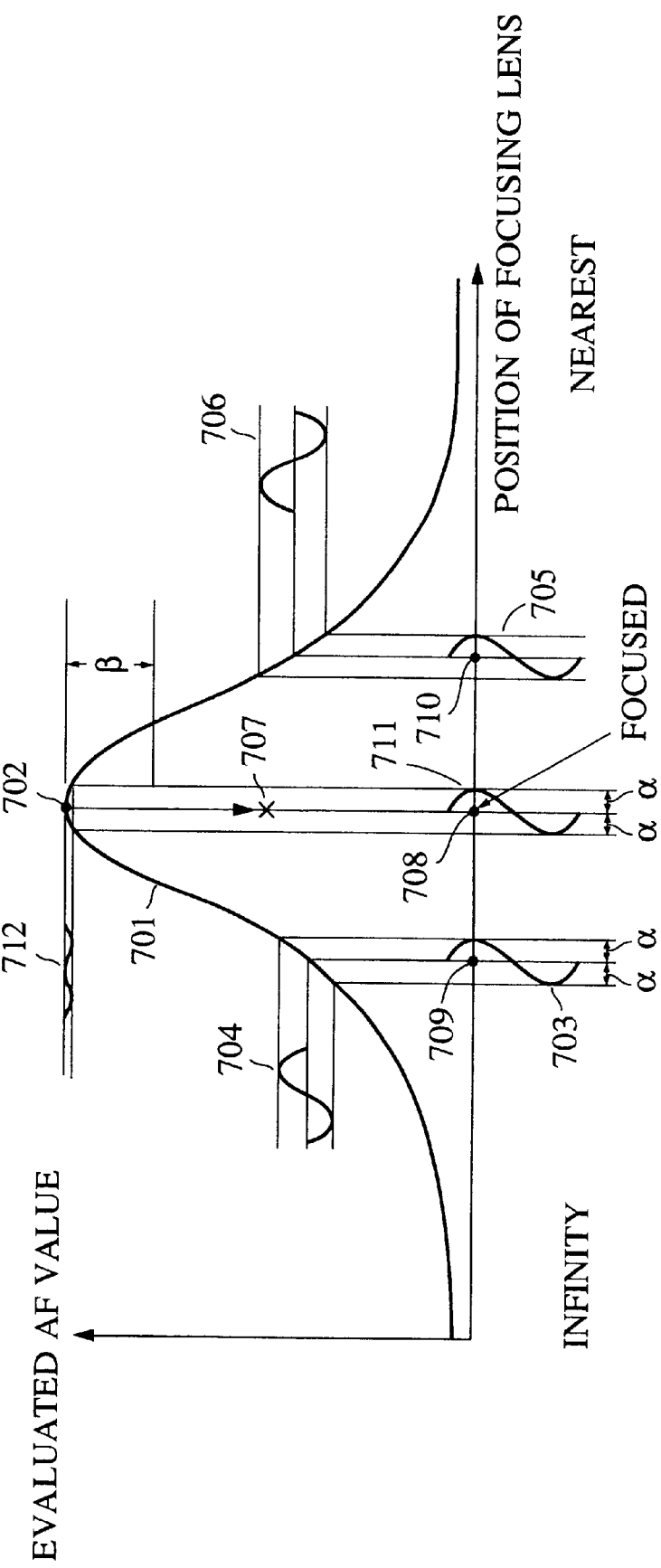
FIG. 35 is a diagram showing the operation of the present invention.

FIG. 35 (*a*) shows a state (701) where the level of the evaluated AF value is changed due to movement of the focusing lens from an infinite position to a nearest position with respect to a certain subject. The axis of abscissa stands for the positions of the focusing lens, while the axis of ordinate stands for the levels of the evaluated AF value.

The focal point is a point indicated by reference numeral 702 at which the level of the evaluated AF value is the highest (the position of the focusing lens in the focused state is indicated by reference numeral 708). In order to maximize the level of the evaluated AF value, the position of the focusing lens is controlled. The wobbling operation is performed to discriminate whether the focal point is present in the nearest direction or the infinite direction.

The wobbling operation is an operation to discriminate whether the present state is a focused state or out-of-focus state (whether front mis-focus or rear focus if the state is the out-of-focus state) by fetching the evaluated AF value while finely moving the focusing lens.

In a case where the present focus position is present on the infinite side (at position 709) with respect to the focal point, the wobbling operation is performed such that the lens is finely moved from the nearest position (the focusing lens is moved as indicated by waveform 703: the time axis runs downward with respect to the drawing sheet). As a result, obtainable evaluated AF value changes as indicated by waveform 704.

If the position of the focusing lens is positioned on the nearest side with respect to the focal point (at position 710), the fine movement of the focusing lens as indicated by waveform 705 changes the evaluated AF value as indicated by reference numeral 706.

Since the waveforms 704 and 706 have opposite phases, discrimination of the phase enables the direction in which the focusing moves (front mis-focus or rear focus) in which the focal point is present to be discriminated.

If the fine movement of the focusing lens is performed at the apex of the waveform 701 of the evaluated AF value (waveform 711), the obtained evaluated AF value (waveform 712) has a small amplitude and different shape such that on out-of-focus or focused state can be detected.

Since wobbling near the focal point causes out of focus images to take place depending upon the amount of amplitude (a shown in FIG. 35 (*a*)) due to the fine movement, the amount of the amplitude must be made minimum so a satisfactory evaluated value can be obtained.

Since a satisfactory amplitude of the evaluated AF value to discriminate the direction cannot sometimes be obtained near the foot of the evaluated AF value 701, it is preferable that the amplitude of the movement of the lens be made larger.

In the case of the non line-of-sight detection mode, it is expected that the subject to be photographed is changed considerably due to the camera operation, such as panning by the photographer. At this time, the evaluated AF value is changed from the apex of the waveform at which a certain subject is focused to the level of the foot of the waveform of another subject.

Therefore, the amplitude $\alpha$ of the small movement in the wobbling operation must be made somewhat large.

In the case of the line-of-sight detection mode, it is expected that the photographer moves the viewpoint with respect to the subject imaged on the finder. Therefore, an allowable evaluated AF value can be obtained even if the main subject is moved. As a result, it is preferable that the amplitude $\alpha$ of the movement be minimized.

Accordingly, the movement amplitude $\alpha$ in the wobbling operation is set as shown in FIG. 35 (*b*) in the lineof-sight mode and the non line-of-sight mode in accordance with the depth of field (the aperture). Referring to FIG. 35 (*b*), symbol $\delta$ indicates a minimum circle of confusion which is a quantity where out of focus images do not occur if the position of the focusing lens is moved from the focal point by $\delta$.

That is, in step S1307, $\alpha$ in the non-line-of-sight detection mode shown in FIG. 35 (*b*) is used to perform wobbling. In step S1304, the wobbling amplitude is set with a from the line-of-sight mode. As a result, the wobbling operation can be performed with the optimum characteristic in the line-of-sight mode and the nonline-sight mode.

Referring back to a flow chart shown in FIG. 33, during the movement of the focal point detection region, the wobbling operation is, as described in step S1303, not performed.

During movement of the point of interest to the main subject intended by the photographer, focusing of a subject which is positioned at an intermediate position of the movement, does not meet the intention of a photographer. During the movement of the focal point detection region, a subject is not present in the focal point detection region. If the subject is present, a satisfactory output of a focus evaluation signal cannot be obtained because the focal point detection region is being moved. Furthermore, the signal is changed considerably. Therefore, even if the wobbling operation is performed in the foregoing state, the direction cannot be discriminated correctly and thus an error is made in the operation. Therefore, the wobbling operation is not performed to prevent out of focus images.

In step S1305 shown in FIG. 33, a discrimination is performed whether a subject is present in the present focal point detection region (the range-finding frame) or a portion in which no subject is being observed in accordance with the level of the evaluated AF value fetched during the wobbling operation in step S1304. If the level of the evaluated AF value is lower than a noise level, a discrimination is performed that the photographer observes a portion in which no subject is present. Then, the operation returns to the process starting at step S1302.

If the level of the evaluated AF value is higher than the noise level, a discrimination is performed that a subject is present in the focal point detection region (the range-finding frame), and the process starting at step S1306 is performed. The reason for this is that focusing performed in the case where no subject is present at the point of interest causes undesirable out of focus images to appear.

In step S1306, the focus moving speed for climbing in the line-of-sight detection mode is set.

If a discrimination has been performed in step S1302 that the mode is the non-line-of-sight detection mode, the foregoing wobbling operation is performed in step S1307. In step S1308, the focusing speed for climbing in the non-line-of-sight mode is set.

Since the non-line-of-sight detection mode, as described above, easily goes out of focus due to the camera operation such as panning, the operation must be performed from the foot of the evaluated AF value 701 to the focal point shown in FIG. 35. In order to shorten the time taken to establish focusing, it is preferable that the focusing lens be moved at the highest speed.

In the line-of-sight detection mode, the degree of change in the evaluated AF value is small as compared with that in the non-line-of-sight mode (however, the change takes place frequently because the focal point detection region is small) and movement is usually started at the halfway of the evaluated AF value 701. Therefore, if the climbing speed is raised excessively, then out of focus images occur if the direction of the climbing is erroneously selected. Thus, an erroneous determination of the focusing direction will be recognized by the photographer (in the nonline-of-sight mode, the photographer cannot easily recognize the error because an excessive out of focus state has been realized even if the direction is erroneously selected in the direction opposing the focusing direction).

Accordingly, the focus moving speed for climbing is set to the line-of-sight mode or the non-line-of-sight mode as shown in FIG. 35 (d).

In step S1309, a discrimination is performed whether the present photographing state is a focused state or an out of focus state as a result of the wobbling operation in step S1307. If the state is the focused state, the movement of the focusing lens is stopped and the operation proceeds to a routine for supervising the restart which starts in step S1304.

If a discrimination is made in step S1309 that the state is in the non-focused state, the operation proceeds to step S1310 in which climbing is performed in the direction discriminated in the wobbling operation at a focusing speed set in step S1306 or step S1308.

In step S1311, a discrimination is performed whether or not the focusing has been established, that is, whether or not the movement has passed the apex of the focus evaluating signal. If the movement has not passed the apex, climbing is continued. If it has passed the apex, the focusing lens is returned to the apex (steps S1312 and S1313).

Since the subject is sometimes changed due to panning or the like during the return to the apex operation, a discrimination is performed whether or not the present position is the apex. The discrimination determines whether or not focusing has been established after the focusing lens has been moved to the apex by returning the operation to the process in step S1302 in which the line of sight, that is, the movement of the focal point detection region, is supervised. Then, the wobbling operation is again performed.

If a discrimination has been made in step S1309 that focusing has been established, the operation proceeds to step S1314 at which a routine for supervising restart starts.

Initially, in step S1314 the level of the evaluated AF value at the time of focusing is stored.

In step S1315, the mode is discriminated similarly to that in step S1302. If the mode is the nonline-of-sight detection mode, the restart of the nonline-of-sight mode is discriminated in step S1318.

If a discrimination has been performed in step S1315 that the mode is the line-of-sight detection mode, step S1316 discriminates whether or not the point of interest is moving. If the point of interest is being moved, the operation is brought to a standby mode. If the point of interest is not being moved, the restart of the line-of-sight mode is discriminated in step S1317.

Since the focal point detection region is small in the line-of-sight detection mode, the evaluated AF value is changed frequently due to the introduction and exit of the subject to and from the focal point detection region. Therefore, the restart operation cannot be easily performed in step S1317 as compared with the center fixed range finding frame in the nonline-of-sight mode so as to stabilize the line-of-sight AF operation.

Referring to FIG. 35, an assumption is made that the focusing lens is at position 708 as shown in FIG. 35 (a) and the level of the evaluated AF value is as indicated by reference numeral 702. The level 702 corresponds to the level of the evaluated AF value stored in step S1314 shown in FIG. 33.

An assumption is made that the level of the evaluated AF value has been lowered from the level 702 to level 707. Whether or not restart is performed at this time is discriminated as follows.

If the level of the evaluated value has changed from the level 702 by threshold β for discriminating the restart, the restart is performed. If the amount of the change in the evaluated value is smaller than the threshold β for discriminating the restart, the restart is not performed.

As shown in FIG. 35 (c), the threshold β is individually set for the line-of-sight mode and the non-line-of-sight mode (between the process in step S1317 and that in step S1318 shown in FIG. 33). If a change takes place in the line-of-sight mode by 40% or more from the reference evaluated AF value level in the focused state stored in step S1314, and if change takes place by 20% or more in the non-line-of-sight mode, setting is made such that the restart is performed.

Referring back to the flow chart shown in FIG. 33, the process in step S1306 shown in FIG. 16 has been described.

The reason why step S1317, in which the restart is discriminated, is not performed in step S1316 during the movement of the focal point detection region in accordance with the movement of the line-of-sight is that undesirable restart whenever the point of interest is moved must be prevented because the evaluated AF value signal obtained from the inside of the focal point detection region is changed during the movement of the focal point detection region. Thus, the AF operation can be stabilized and an error in operation can be prevented.

If the discrimination of the restart is permitted during the movement of the point of interest, the evaluated AF value is changed due to the movement of the focal point detection region even though the focusing lens is not required to be moved in a case where the line of sight has been moved with respect to a subject, whose distance has not been changed. Thus, restart is undesirably performed, causing out of focus images to occur.

The result of the discrimination in step S1317 or step S1318 is discriminated in the restart discrimination process in step S1319. If the restart is not performed, the focusing lens is stopped (step S1320), and the operation returns to step S1315 in which supervisory of the restart is again performed.

If a discrimination has been made in step S1319 that the restart is performed, the operation returns to step S1302 in which the wobbling operation is again performed to discriminate the direction of the movement. By repeating the foregoing operation, the focusing lens is moved to always maintain focusing.

By controlling the AF operation in accordance with the algorithm shown in FIG. 33, an erroneous AF operation can be prevented and stability can be improved.

Seventeenth Embodiment

A seventeenth embodiment will now be described.

Figure 34A:
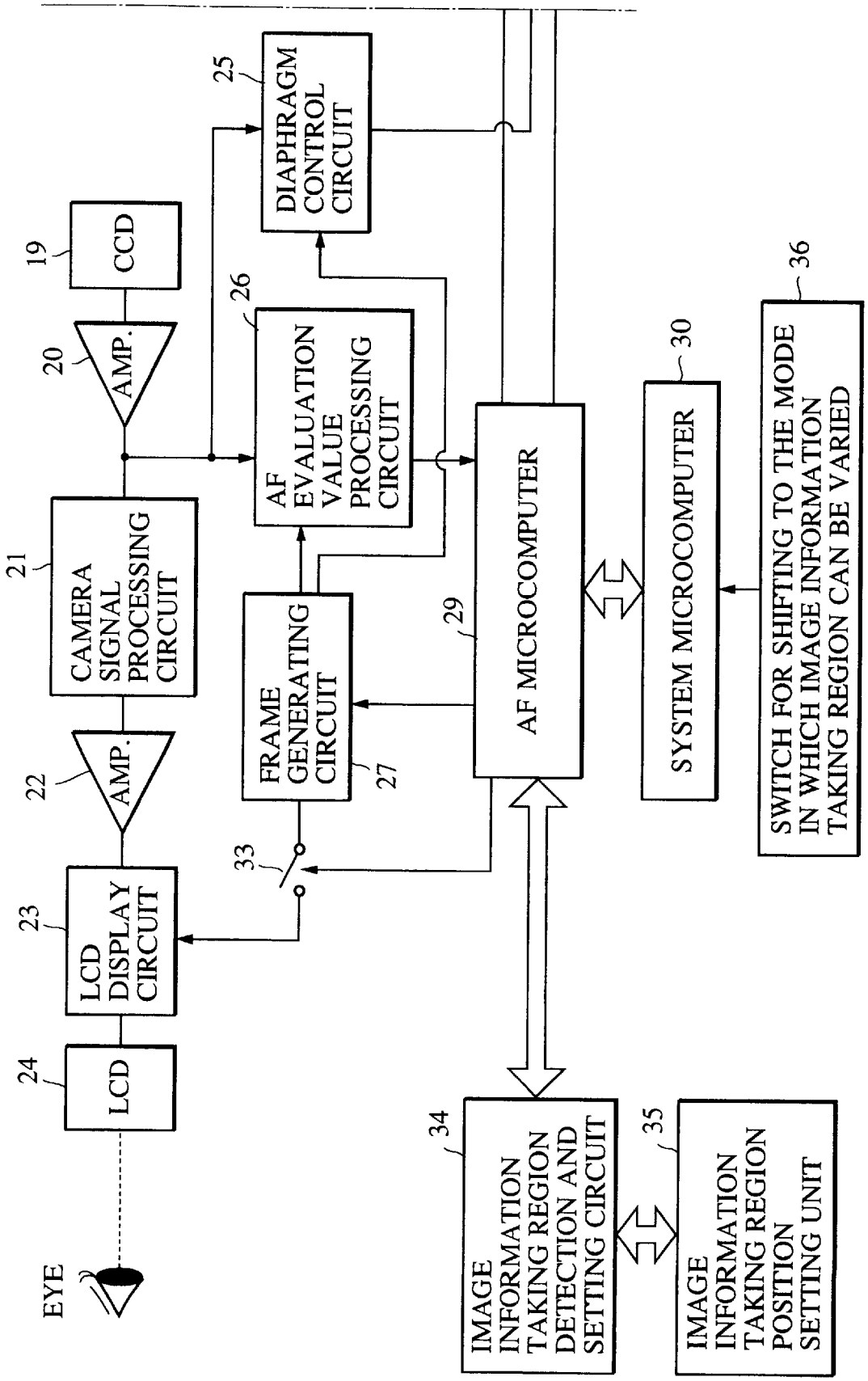
FIG. 34 is a block diagram showing the structure of a seventeenth embodiment of the present invention.
Figure 34B:
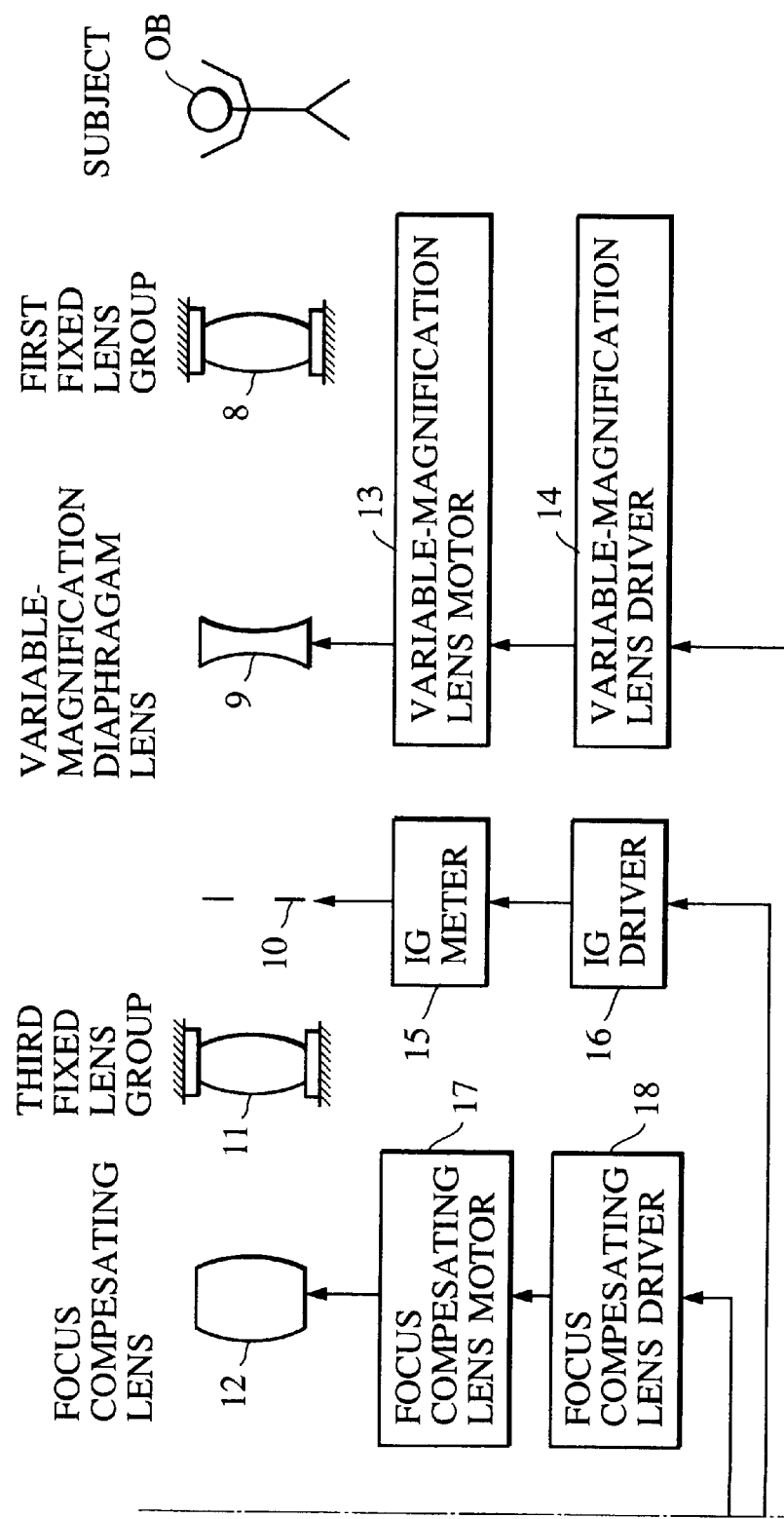

FIG. 34 is a diagram showing the structure of the seventeenth embodiment, in which an external input means is used in place of the input of the line-of-sight to determine the region, in which image information is fetched.

Information about the position of the region in which image information is fetched and which has been fetched by the position setting apparatus 35 for the region in which image information is fetched is processed by an image-information fetching region detection setting circuit 34 so as to be transferred to the AF microcomputer 29.

The AF microcomputer 29 follows the switch 36 for shifting to the mode in which the region in which image information is fetched, and which has been read through the system microcomputer 30, can be varied to determine whether or not the region, in which image information is fetched, from the image-information fetching region detection setting circuit 34 is used. The AF microcomputer 29 transfers information about the position and the size of the frame to the frame generating circuit 27 and performs the same control as that performed in the sixteenth embodiment.

The position setting apparatus 35 for the region in which image information is fetched, may be a keyboard, mouse, track ball or a joy stick, which are usual input devices for a computer. In the case where the finder screen is spaced from the eye of the operator and therefore the line-of-sight detection cannot be performed, the foregoing method is advantageous.

As described above, according to the foregoing embodiment, a first mode in which a predetermined region for detecting a focused state at a position in a frame appointed by the appointing means, and a second mode in which the appointing means is not used and the predetermined region is fixed to a predetermined position in the frame, can be set. Furthermore, the operation characteristic of the focal point adjustment means is made different between the first mode and the second mode. Therefore, optimum AF performance can be maintained in both the first and second modes. In particular, the AF performance cannot deteriorate in the focal point detection method in which the position is set by an appointing means. Thus, the characteristics of the two methods are used so that the focal point adjustment can be performed appropriately with respect to a main subject.

Since the appointing means comprises a line-of-sight detection means, an optimum AF operation characteristic can be realized without deterioration in the AF performance in both first mode, in which the focal point detection region is moved to the position of the point of interest in the frame, and the second mode, in which the focal point detection region is fixed.

Since the appointing means is an external input means, such as a joy stick, a mouse, a track ball or keyboard, an optimum AF operation characteristic can be realized without deterioration in the AF performance in both the first mode in which the focal point detection region can be moved to the position of the point of interest in the frame by a manual appointing means, and the second mode in which the focal point detection region is fixed.

Since the predetermined region is made smaller in the first mode as compared with that in the second mode where the predetermined region is fixed to the central portion of the frame in the second mode, the focal point detection region can be made smaller and therefore the portion intended to be focused can precisely be selected in the first mode in which the focal point detection region can be moved to the position of the point of interest in the frame by an external input means using detection of the line-of-sight. In the second mode in which the focal point detection region is fixed, the focal point detection region is set to have a relatively large area so that a stable AF operation is performed in the central portion of the frame.

The moving speed of the focusing lens included in the focal-point adjustment means is made different between the first mode and second mode. Therefore, an optimum AF characteristic can be obtained in both the first mode, in which the probability of initial and excessive out of focus is low because the portion to be focused has been made clear due to the arrangement that the focal point detection region is set to the position of a point of interest in the frame by an external input means using the detected line of sight and the second mode, in which excessive out of focus easily takes place due to a camera operation, such as panning, because the focal point detection region is fixed in the screen without the external input means and which requires high speed adjustment of the focal point.

Since the moving speed of the focusing lens is lowered in the first mode as compared with the speed in the second mode, the focusing lens can move at low speed to stop at the focal point stably, accurately, and precisely in the first mode in which precise and stable focal point adjustment is required because the probability of initial and excessive out of focus is low due to the fact that the portion to be focused has been cleared because the focal point detection region is set to the position of the point of interest in the screen by an external input means using the detected line-of-sight. In the second mode, in which the focal point detection region is fixed in the frame without the external input means and therefore excess out of focus easily takes place due to camera operation, such as panning, the focusing lens is able to move at high speed so that focusing is established in a short time even if excessive out of focus takes place.

The control means has a structure in which the conditions for discriminating whether or not restart is performed after focusing of the focal-point adjustment means has been established are made different between the first and second modes. Therefore, in the first mode in which the focal point detection region can be moved to the position of the point of interest in the frame by an external input means using the detected line-of-sight, the portion intended to be focused can be selected finely and precisely by reducing the area of the focal point detection region. Furthermore, an erroneous restart can be prevented, which occurs due to the reduction in the area of the focal point detection region that causes an increase in the change in the evaluated AF value taking place due to introduction and discharge of the subject, by changing the conditions for discriminating the restart after focusing. Therefore, a stable AF operation can be performed.

The restart is discriminated in accordance with the result of discrimination of whether or not the evaluated focal point value has been changed from the evaluated focal point value at the time of focusing from a predetermined value. Furthermore, the foregoing predetermined value is made larger in the first mode as compared with the predetermined value in the second mode. Therefore, in the first mode in which the focal point detection region can be moved to the position of the point of interest in the frame by an external input means using the detected line-of-sight, the portion intended to be focused can be selected finely and precisely by reducing the area of the focal point detection region. Furthermore, an erroneous restart can be prevented, which occurs due to the reduction in the area of the focal point detection region that causes an increase in the change in the evaluated AF value taking place frequently due to introduction and exit of the subject by enlarging the threshold for the restart to prevent easy restart. Therefore, the AF operation can be stabilized.

The focal-point adjustment means comprises a focusing-direction discriminating means by slightly moving the focusing lens in the direction of the optical axis to discriminate the direction of the focusing direction. Furthermore, the amplitude of the movement of the focusing lens caused by the focusing-direction discriminating means is made to be different between the first mode and the second mode. Therefore, the amplitude of the wobbling operation can be made different between the first mode in which initial and excessive out of focus can be prevented because the portion to be focused has been made clear due to the arrangement in which the focal point detection region is set to the position of the point of interest in the frame by the external input means using the detected line-of-sight. Also, a somewhat satisfactory level of the evaluated focal point can be prevented in the second mode in which the focal point detection region is fixed to the central portion of the frame without the external input means and therefore excess out of focus easily takes place due to camera operation, such as panning. Therefore, the AF characteristic can be optimized.

Since the amplitude of the movement of the focusing lens by means of the focusing direction discriminating means is made smaller in the first mode as compared with that in the second mode, the moving amplitude at the time of wobbling is made smaller in the first mode in which initial and excessive out of focus can be prevented because the portion to be focused has been made clear due to the arrangement in which the focal point detection region is set to the position of the point of interest in the frame by the external input means using the detected line-of-sight and with which a somewhat satisfactory level of the evaluated focal point can be prevented. Therefore, out of focus due to small vibrations can be prevented. In the second mode, the focal point detection region is fixed to the central portion of the frame without the external input means and therefore excess out of focus easily results due to a camera operation, such as panning, the amplitude of the movement in the wobbling operation is made larger. Therefore, the direction can accurately be discriminated even in an excessive out of focus state.

Since the operation of the focal-point adjustment means is inhibited during the change of the predetermined region in the first mode, an error in the AF operation can be prevented which is caused by introduction of a subject which is not intended to be focused into the foregoing predetermined region.

If the level of the predetermined frequency component corresponding to the predetermined region detected by the focal-point adjustment means is lower than a predetermined level in a state where the first mode has been set, the operation of the focal-point adjustment means is inhibited. Therefore, even if a main subject is moved outside a predetermined region and thus the state of focusing has been changed during the movement of the predetermined region, the focal-point adjustment means is restarted. Thus, an erroneous operation, such as output of focus of the main subject, can be prevented.

Eighteenth Embodiment

An eighteenth embodiment of the present invention will now be described. In this embodiment, a means for movably setting a region to be detected in a frame is used to control exposure.

Figure 36:
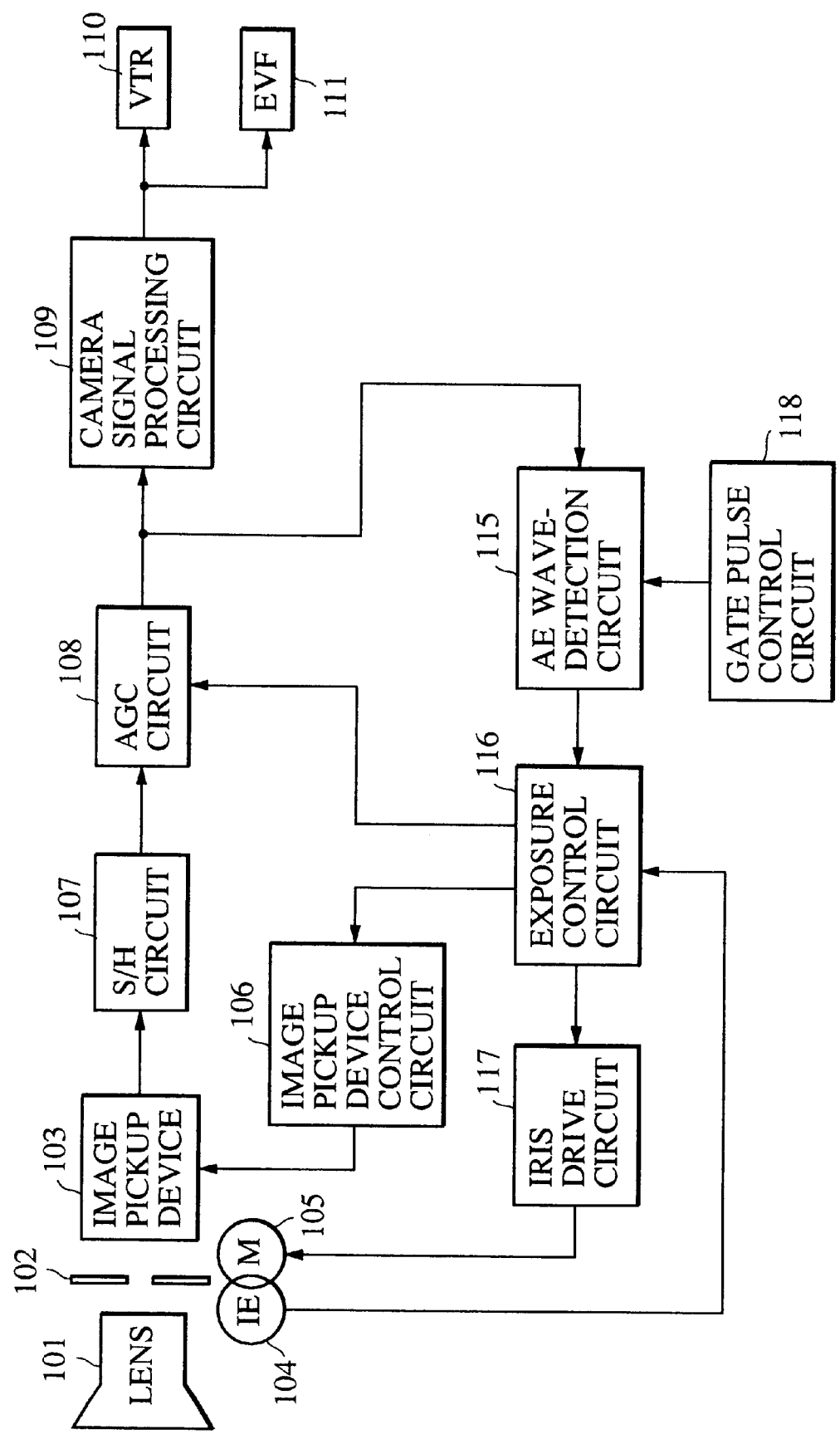
FIG. 36 is a block diagram showing the structure of a usual image pickup apparatus.
Figure 37:
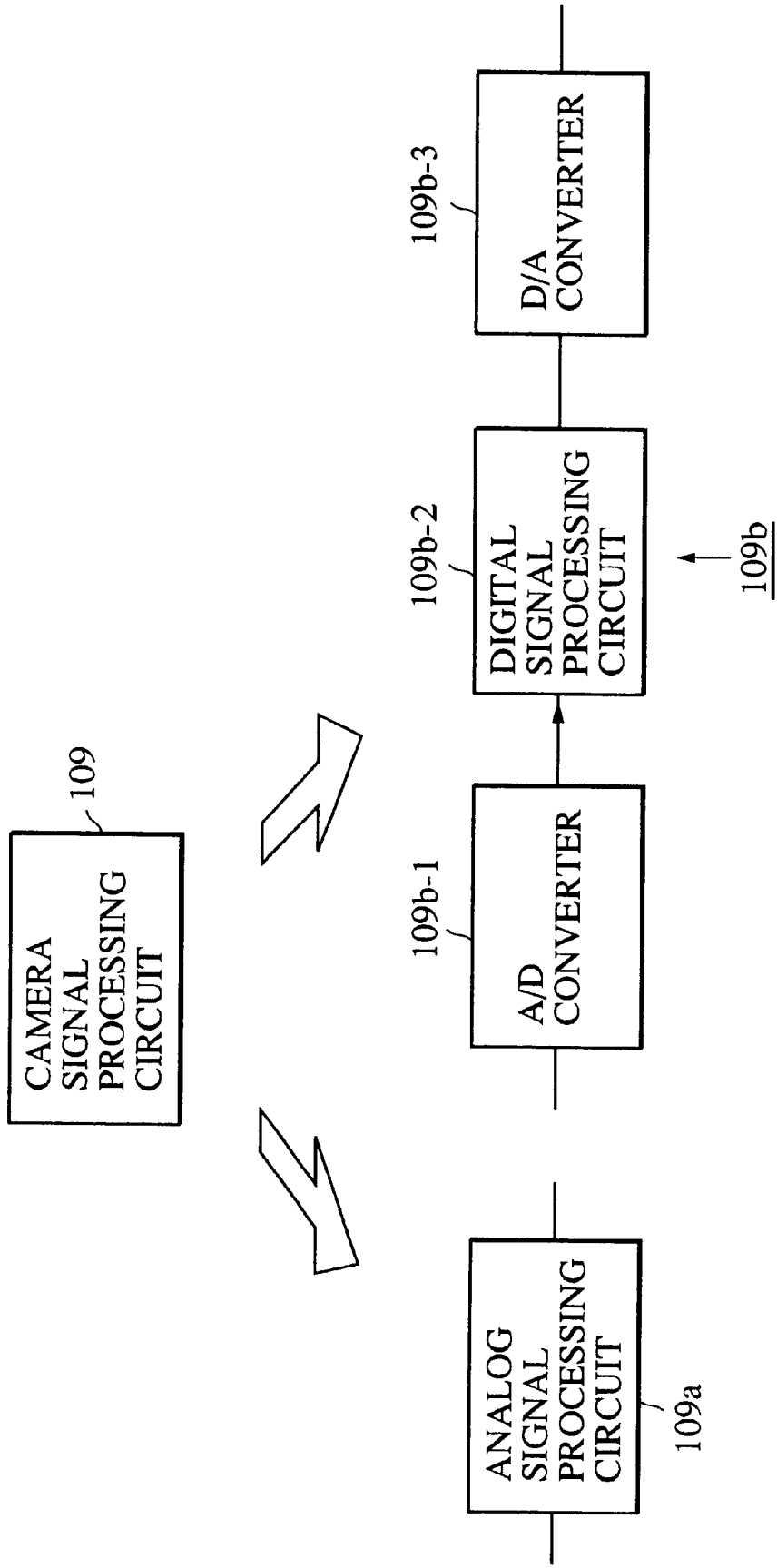
FIG. 37 is a structural view showing types of a camera signal processing circuit.

FIG. 36 is a block diagram showing the structure of a usual image pickup apparatus. Referring to FIG. 36, reference numeral 101 represents a lens group for imaging a subject, 102 represents a diaphragm mechanism, such as an iris, for controlling the quantity of incidental light, and 103 represents an image pickup device for photoelectrically converting incidental light. Reference numeral 104 represents a diaphragm detection means which detects the state of the diaphragm mechanism 102 and which comprises a Hall element. Reference numeral 105 represents a drive motor, such as an IG meter for operating the diaphragm mechanism 102. Reference numeral 106 represents an image pickup device control circuit that controls the image pickup device 103 to read a converted signal photoelectrically and controls a so-called electronic shutter function for controlling the signal storage time. Reference numeral 107 represents a sample holding circuit for sampling photoelectrically the converted signal by the image pickup device 103. Reference numeral 108 represents an automatic gain control circuit (hereinafter called an "AGC circuit") for electrically amplifying the signal. Reference numeral 109 represents a camera signal processing circuit, which subjects the signal to gamma correction, color separation, and different color matrix processes which adds a synchronizing signal to produce a standard TV signal. The camera signal processing circuit is, as shown in FIG. 37, exemplified by an analog signal processing circuit 109*a*, which performs the process in an analog-signal state and a digital signal processing circuit 109*b*, which converts the image signal from analog to digital and performs the process in a digital-signal state. In this embodiment, a description will be made about the structure in which the analog signal processing circuit 109*a* is employed.

Reference numeral 110 represents a video tape recorder (hereinafter called a "VTR") for recording the image signal from the camera signal processing circuit 109 on a magnetic tape. Reference numeral 111 represents an electronic view finder for monitoring the image signal, and 115 represents an AE wave-detection circuit for gating an output signal from the AGC circuit 108 if necessary to perform photometry such as center-weighted photometry for controlling the exposure. Reference numeral 116 represents an exposure control circuit that uses an output signal from the AE wave-detection circuit 115 to control the diaphragm mechanism 102, the shutter speed of the electronic shutter that is controlled by the image pickup device control circuit 106, and the gain of the AGC circuit 108. Reference numeral 117 represents an iris drive circuit for rotating the motor 105 for operating the diaphragm mechanism 102 in accordance with an output from the exposure control circuit 116. Reference numeral 118 represents a gate-pulse control circuit for generating a gate pulse for gating an image region required for the detection performed by the AE wave-detection circuit 115.

Figure 38:
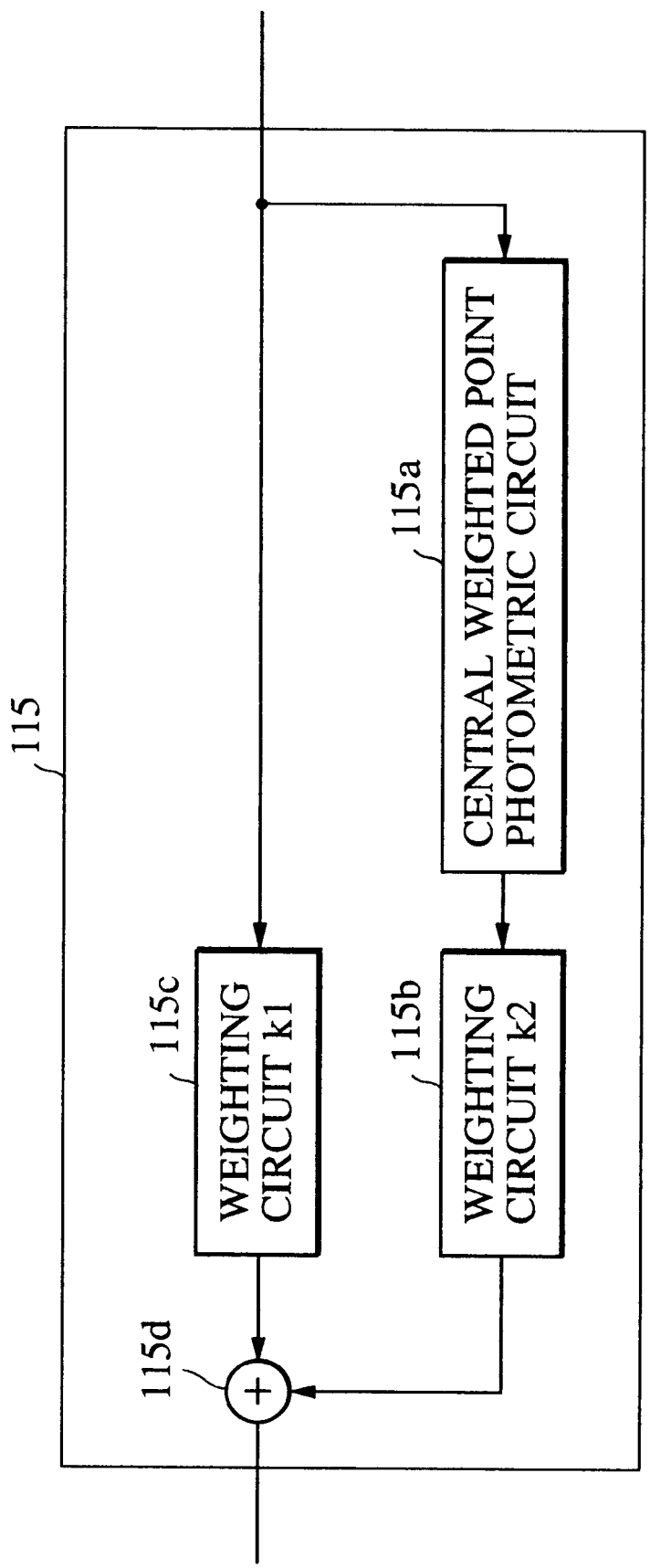
FIG. 38 is a block diagram showing the structure of an AE wave-detection circuit.

The AE wave-detection circuit 115, as shown in FIG. 38, comprises a center-weighted photometry circuit 115a, weighting circuits 115b and 115c, and an adder 115d. The AE wave-detection circuit 115 and the exposure control circuit 116 constitute exposure control means.

In order to perform an optimum photographing operation in a variety of portions and under a variety of conditions, the image pickup apparatus has a structure such that the AE wave-detection circuit 115 detects changes in the exposure from the image signal occurring due to changes in the subject. The exposure control circuit 116 selects exposure control parameters such as the diaphragm mechanism 102, the storage time of the image pickup device 103, the gain of the AGC circuit 108, and determines the amount of correction of each parameter in accordance with a signal detected by the AE wave-detection circuit 115. Thus, control is performed in such a manner that a stable and optimum exposure can be obtained.

Furthermore, the AE wave-detection circuit 115 controls the photometry distribution by setting the photometry region of an image signal for controlling the exposure set by the gate pulse control circuit 118 and the detection position so that optimum photography is enabled. For example, so-called average photometry as shown in FIG. 42 (a) can be performed in which the overall image region is detected and the exposure is controlled to make the detection signal have a predetermined level. Furthermore, center-weighted photometry as shown in FIG. 42 (b) can be performed in which only the central portion of the image region is detected and the exposure is controlled to make the detection signal have a predetermined level.

As shown in FIG. 38 in the AE wave-detection circuit 115, detection data of the overall image region and detection data of the center-weighted region are weighted by weighting circuits 115b and 115c. Exposure is controlled on the basis of detection data obtained by adding each data at a predetermined ratio by the adder 115d. Thus, the exposure can be controlled by photometry by combining the average photometry and the center-weighted photometry. Therefore, problems of respective photometry methods can be compensated and therefore optimum exposure can be obtained.

As shown in FIG. 42 (c), the frame is divided so that an image of each divided region is detected to limit the detected data region for use in controlling the exposure to be adaptable to the subject and the photographing conditions or to change the weight. Thus, more precise exposure control can be performed.

However, exposure control using any of the foregoing photometry methods is usually performed on the assumption that an aimed subject is present in the central portion of the frame and the result of signal detection obtained by detecting the brightness of the central portion is attached with greater importance. Therefore, the region in which the signal is detected is fixed to the central portion. If the subject which is intended to be photographed by the photographer is positioned outside the central portion, a problem arises in that optimum exposure of the subject aimed by the photographer cannot be realized.

This embodiment is intended to overcome the foregoing problem. An object of the same is to provide an image pickup apparatus which is capable of performing optimum exposure with respect to a subject intended to be photographed by the photographer. The image pickup apparatus according to this embodiment comprises an image pickup device having a photoelectrical conversion function; a two-dimensional position selection means for selecting at least a portion of image signals obtained from the image pickup device; an exposure control means for controlling the exposure state of the image signal; and a system control means that outputs a control signal for controlling the position of the photometry region for performing exposure in accordance with position information obtained from the twodimensional position selection means to supply the control signal to the exposure control means.

The image pickup apparatus according to this embodiment comprises an image pickup device having a photoelectrical conversion function; an electronic view finder for displaying an image signal obtained from the image pickup device; an interest-point position detection means for detecting the position of a point of interest of a photographer on the frame of the electronic view finder; an exposure control means for controlling the exposure state of the image signal; and a system control means, which outputs a control signal for controlling the position of the photometry region for performing exposure in accordance with position information obtained from the interest-point position detection means, so as to supply the control signal to the exposure control means.

As a result, photometry of a position of a main subject selected by a photographer can be performed, and exposure is performed correspondingly. Therefore, influence of light in portions other than the main subject can be eliminated, and optimum exposure of the main subject can be performed.

When the photographer observes the main subject through the electronic view finder, photometry of the position of the main subject is automatically performed. Furthermore, exposure is performed correspondingly so that influence of light in portions except the main subject is eliminated and optimum exposure of the main subject is performed.

Nineteenth Embodiment

A nineteenth embodiment of the present invention will now be described with reference to the drawings.

The nineteenth embodiment of the present invention comprises an electronic view finder serving as a monitor that is a two-dimensional position selection means; and a point-of-interest position detection means for detecting the point of interest of a photographer in the screen of the electronic view finder. Information of the position of the point-of-interest, which is a detection signal obtained from the point-of-interest position detection means, is considered to be the position of the main subject, which is being observed by the photographer. In accordance with the position information, the exposure is controlled.

Prior to describing this embodiment, an example of the method of detecting the position of the point-ofinterest will now be described.

Figure 43:
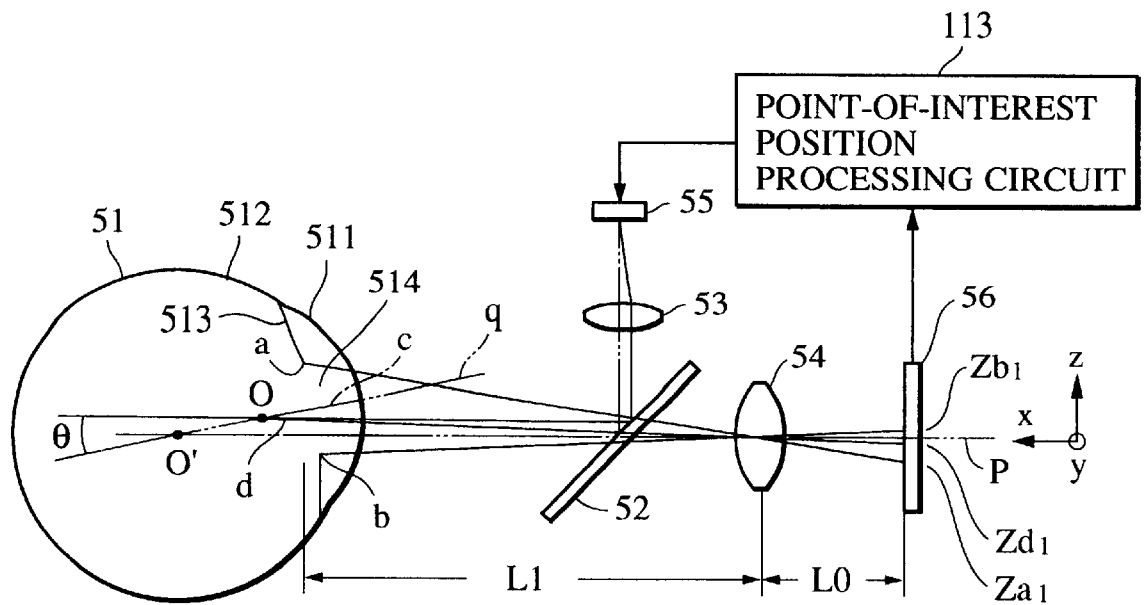
FIG. 43 is a structural view showing the schematic structure of an optical system for detecting the point of interest.
Figure 44:
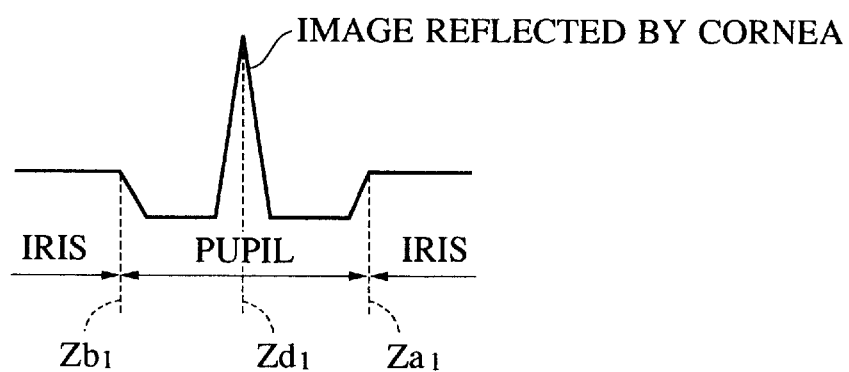
FIG. 44 is a graph showing the intensities of output signals from a photoelectric conversion array.

In the detection method, the front portion of the eyeball is irradiated with parallel beams from a light source, and images reflected by the cornea and the imaging position of the pupil are used to obtain the visual line. FIGS. 43 and 44 show the principle of the method used for detecting the point-of-interest. FIG. 43 is a schematic view of a point-of-interest detection optical system, while FIG. 44 is a graph showing intensities of output signals from a photoelectrical device array 56. Referring to FIG. 43, reference numeral 55 represents a light source such as a light emitting diode that emits infrared rays which cannot be sensed by the photographer. The light source 55 is disposed on the focal plane of the light projecting lens 53 which is operated by the interest-point position processing circuit 13.

Infrared rays emitted from the light source 55 are made to be parallel beams by the projecting lens 53, followed by being reflected by a half mirror 52 so that the cornea 511 of the eyeball 51 is irradiated with the infrared rays. Image d reflected by the cornea 511 formed by a portion of the infrared rays reflected by the surface of the cornea 511 is imaged such that images of ends a and b are formed at positions $Za_1$ and $Zb_1$ on the photoelectrical device array 56 through a light receiving lens 54. If the rotational angle θ of optical axis q with respect to the optical axis (optical axis p) of the light receiving lens 54 is small, coordinate Zc of the central portion c of the iris 513 is expressed as follows assuming that Z coordinates of the ends a and b of the iris 513 are Za and Zb:

$$Zc=(Za+Zb)/2 \quad \ldots (1)$$

Assuming that the Z coordinate of the position d, at which the image reflected by the cornea is formed, is Zd and the distance from curvature center O of the cornea 511 to center C of the iris 513 is OC, the rotational angle θ of the optical axis q of the eyeball substantially satisfies the following relationship:

$$OC \times \sin\theta = Zc - Zd \quad \ldots (2)$$

where the Z coordinate Zd of the position d of the image reflected by the cornea and the Z coordinate Z of the curvature center O of the cornea 511 coincide with each other. Accordingly, detection of the positions of the respective specific points (the image d reflected by the cornea and the ends a and b of the iris 513) projected on the surface of the photoelectrical conversion device array 56 by the interest point position processing circuit 13 enables the rotational angle θ of the optical axis q of the eyeball to be obtained. At this time, equation (1) can be rewritten as follows:

$$\beta \times OC \times \sin\theta = (Za1=Zb1)/2 - Zd1 \quad \ldots (3)$$

wherein β is a magnification determined by distance L1 from the position d, at which the image reflected by the cornea is formed, to the light receiving lens 54 and distance L0 from the light receiving lens 54 to the photoelectrical conversion device array 56, the magnification β being usually made a constant value.

Figure 45:
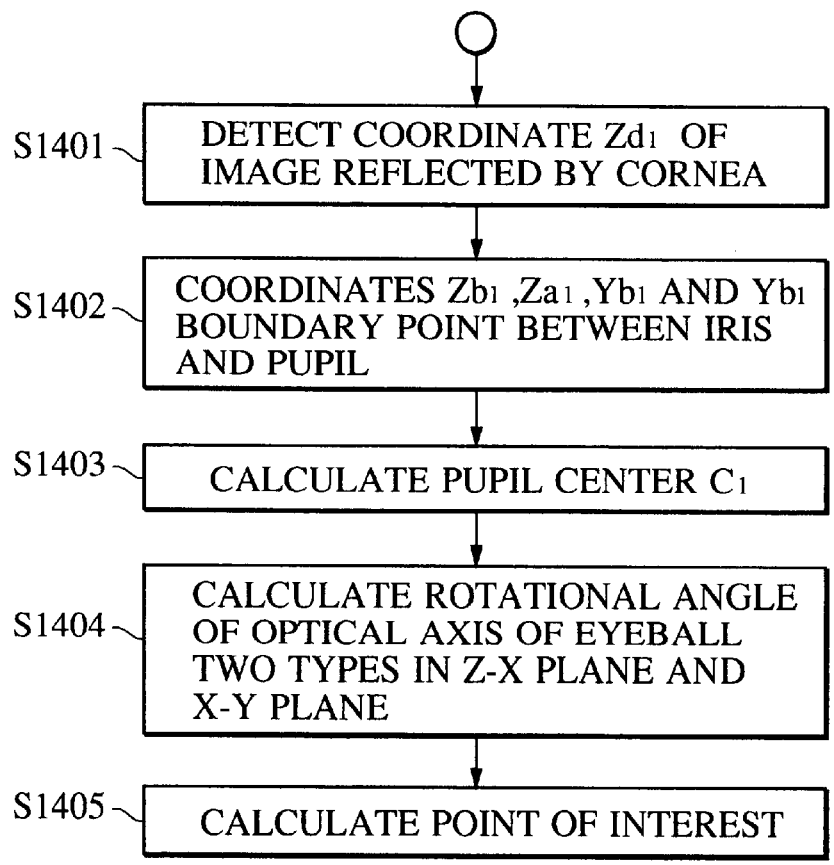
FIG. 45 is a flow chart showing the method of calculating the point of interest.
Figure 46:
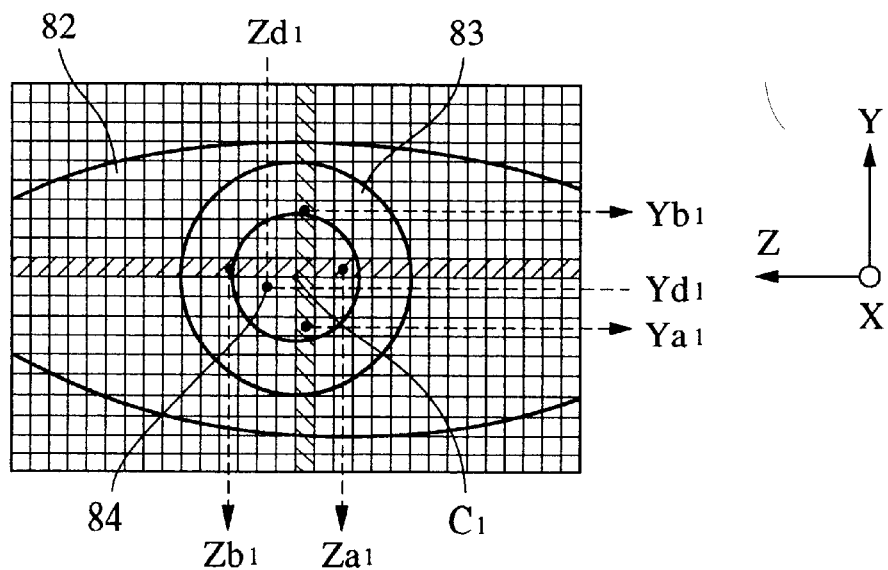
FIG. 46 is a structure view showing an image reflected by the eyeball on the surface of the photoelectric conversion array.

A method of calculating the point of interest will now be described. FIG. 45 is a flow chart of a process for calculating the point of interest according to this method. FIG. 46 shows an image reflected by the eyeball and formed on the surface of the photoelectric conversion device array. Referring to FIG. 46, Za1, Zb1, and Zd1 represent the foregoing labels, C1 represents the position of the central portion of the pupil, Yb1 and Ya1 represent the top and bottom coordinates of the pupil circle, and Yd1 represents the Y coordinate of the image reflected by the cornea.

Referring to FIG. 45, initially, the coordinate Zd1 or the image reflected by the cornea shown in FIG. 46 is detected (step S1401). Then, coordinates Zb1, Za1, Yb1 and Ya1 of boundary points between the iris and the pupil are detected (step S1402). In accordance with data obtained in step S1402, the center C1 of the pupil is calculated (step S1403). In accordance with data above, the rotational angle of the eyeball is calculated (step S1404) such that the rotational angle in the Z-X plane (horizontal direction) and that in the X-Y plane (vertical direction) are obtained. In accordance with the rotational angle θ obtained finally, the point of interest is calculated (step S1405).

The structure of the nineteenth embodiment of the present invention will now be described with reference to FIG. 39 in which an electronic view finder 111 serves as the interest point position detection means.

Figure 39:
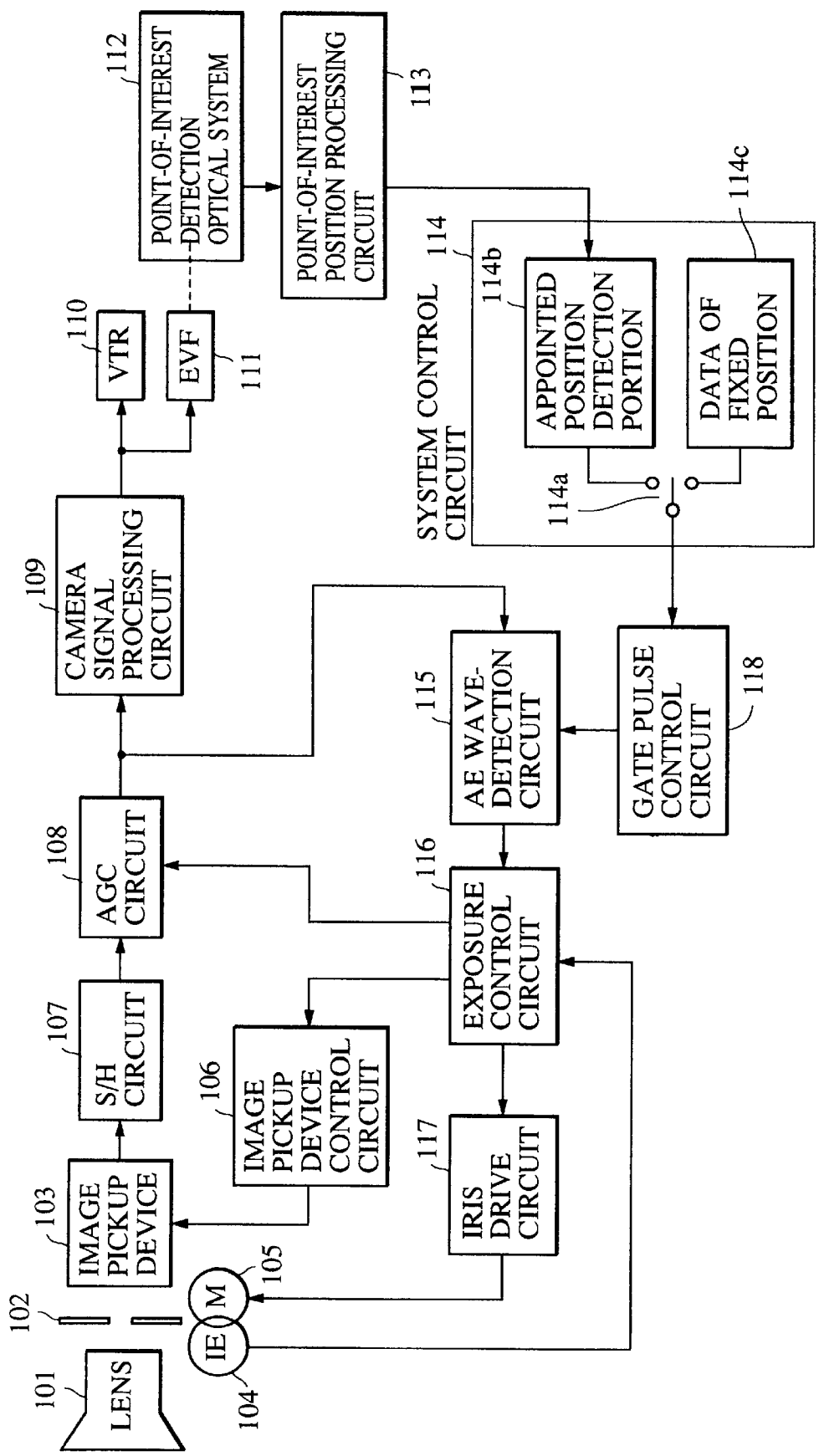
FIG. 39 is a block diagram showing the structure of an eighteenth embodiment of the present invention.

Referring to FIG. 39, portions given the same reference numerals as those shown in FIG. 36 have the same functions, and the following elements are added to the structure shown in FIG. 36: an interest-point detection optical system 112, an interest-point position processing circuit 113, and a system control circuit 114.

Usually, a photographer photographs an image while observing an image displayed on the electronic view finder 111 in such a manner that the aimed subject is observed. In this structure, the position on the screen of the electronic view finder 111 which is being observed by a photographer is considered as the position of a main subject aimed by the photographer. The interest-point detection optical system 112 is provided for the electronic view finder 111. In accordance with a detection signal from the interest-point detection optical system 112, the interest-point position processing circuit 113 obtains the position observed by the photographer.

Information about the position of the point-of-interest obtained by the interest-point position processing circuit 113 is supplied to the system control circuit 114. The system control circuit 114 controls a gate-pulse control circuit 118 which outputs a gate pulse serving as a control signal for setting an image region in which detection is performed when the AE wave-detection circuit 115 detects an image signal for controlling exposure so as to control the movement. Thus, the region, in which image is detected (photometry), and the position are set.

The system control circuit 114 includes a switch circuit portion 114a. Thus, a switching is enabled in a case where the position of the pulse of the gate-pulse control circuit 118 is controlled by the appointed-position detection portion 114b in accordance with information about the position of the point-ofinterest and also a case where the gate pulse is always set to the same fixed position in accordance with fixed-position data 114c regardless of information about the position of the point of interest. In the case where the switch circuit portion 114a has selected fixing of the gate pulse position, a center-weighted gate pulse for performing so-called center-weighted photometry is output from the gate-pulse control circuit 18, the center-weighted gate pulse being used to detect the central region of the frame as shown in FIG. 42 (b).

In a case where the switch circuit portion 114a is selected such that the gate pulse position follows information about the position of the point-ofinterest, setting is performed as shown in FIG. 42 (d) in such a manner that the position of the center-weighted gate pulse follows information about the position of the point-of-interest obtained by the interest-point position processing circuit 113. Thus, even if the subject which is being observed by a photographer comes off the center of the frame, the subject which is being observed is still subjected to photometry to control the exposure.

In the case where the position of the center-weighted gate pulse position follows the information about the position of the point-of-interest, the ratio of the region of the center-weighted gate pulse in the frame is made different from the case where the same does not follow the information. In the case where the position does not follow the information about the position of the point of interest, the center-weighted region has a specific area width in order to prevent excessive change in the exposure, causing the main subject to encounter so-called highlight error. In the case where the position follows the information about the position of the point of interest, the area of the centerweighted region is reduced as compared with the case where the position does not follow the information as shown in FIG. 42(*e*). As a result, in the case where the center-weighted region is set not to follow the information about the position of the point of interest as shown in FIG. 42 (*d*), the state of exposure of the subject which is being observed cannot accurately be detected if the observed subject is smaller than the region in which image is detected, because the image detection region is too wide. By reducing the area of the center-weighted region as shown in FIG. 42 (*e*), exposure information of the observed subject can accurately be obtained. Therefore, optimum exposure of the subject can be performed.

In the AE wave-detection circuit 115, data obtained by photometry of the overall region of the frame and data obtained by photometry of the region set with the center-weighted gate pulse are weighted to determine the ratio of respective data with respect to the exposure control. By setting the weighting to be different between the case where the position of the center-weighted gate pulse follows the information about the position of the point-of-interest and the case where the same does not follow the information, further optimum exposure control can be performed. In the case where the position does not follow the information about the position of the point-ofinterest, data weighting coefficients are set as follows: in a case where data is obtained by photometry of the overall region, weighting coefficient K1 is 0.8 and for data obtained from the center-weighted photometry region weighting coefficient k2 is 0.2. The weighting coefficient kl in the case where the center-weighted gate pulse position follows the information about the position of the point-of-interest is set to 0.6 and k2 is set to 0.4. Thus, data obtained from the center-weighted region is attached with greater importance. As a result, the ratio of exposure information of the subject portion corresponding to the information about the position of the point-of-interest is increased so that exposure control following the information about the position of the point-of-interest is performed.

If the setting of each control parameter is changed to enhance the effect of the exposure control following the information about the position of the point-ofinterest, a problem easily arises when exposure control is performed in the state of exposure of the surrounding subject if the eye is spaced from the main subject.

Therefore, in the case where exposure control is performed to follow the information about the position of the point-of-interest, the response of the diaphragm mechanism. AGC and the electronic shutter is lowered to perform setting in a manner different from that in the case where the exposure control does not follow the information such that the foregoing problem is prevented. Furthermore, the state of exposure of the image region corresponding to the information about the position of the point-of-interest and the state of exposure of the surrounding image region are detected to discriminate the state of the subject in accordance with the result of the detection to change the set response so that further suitable exposure control is performed.

The nineteenth embodiment has the arrangement where the set position of the gate pulse for detecting an image for the purpose of control of exposure is allowed to follow the information about the position of the pointof-interest. Also the level of the gate pulse, weight of the data in the gate pulse region, the response of the diaphragm mechanism, the AGC, and the electronic shutter are made different between the case where the gate pulse position is allowed to follow the information about the position of point-of-interest and the case where the position does not follow the information so that further suitable exposure of the subject corresponding to the position of the point-ofinterest is performed. However, the present invention is not limited to this. Setting the control parameter relating to the exposure control is different between the case where the position is allowed to follow the information about the position of the point-of-interest and the case where the position does not follow the information. Thus, an optimum setting is performed when exposure control following the information about the position of the point-of-interest is performed. Therefore, optimum exposure control can be performed.

Twentieth Embodiment

Figure 40:
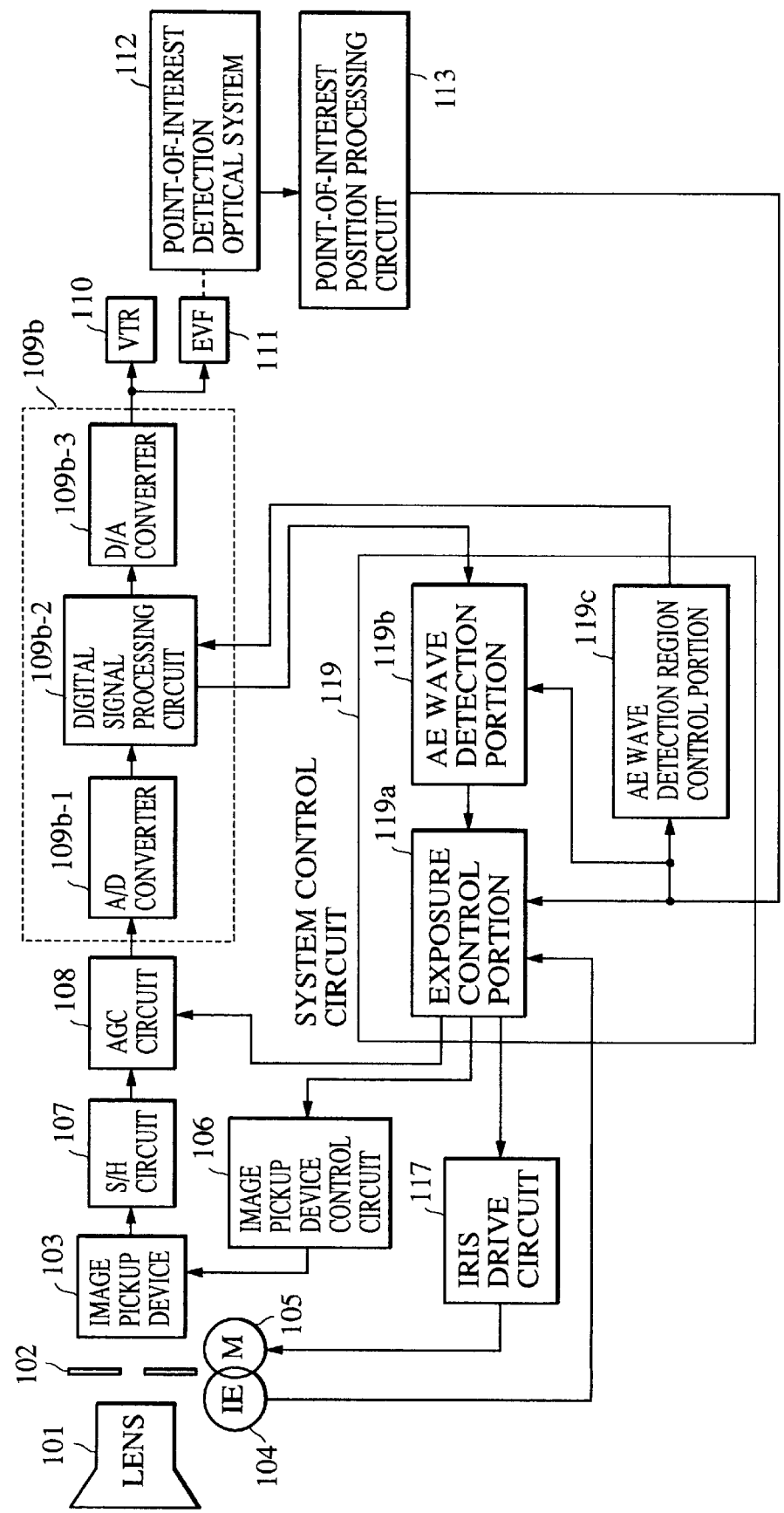
FIG. 40 is a block diagram showing the structure of a nineteenth embodiment of the present invention.

FIG. 40 is a block diagram showing the structure of a twentieth embodiment of the present invention.

In the eighteenth embodiment, the camera signal processing circuit 109 comprises the analog signal processing circuit 109 shown in FIG. 37. In the twentieth embodiment, a digital signal processing circuit 109*b* is employed which, as shown in FIG. 37, comprises an analog-digital converter 109*b*-1, a digital-analog converter 109*b*-3, and a digital signal processing circuit 109*b*-2 so that a signal is processed in a state of digital data.

Furthermore, the AE wave-detection circuit 115, the exposure control circuit 116 and the gate pulse control circuit 118 are included in a system control circuit 119, the internal process of which is different from the system control circuit 1014 according to the eighteenth embodiment. Also, the process in each circuit portion is performed in the digital data state. In the foregoing case, an exposure control portion 119*a* is provided, and the AE wave-detection circuit 115 is composed of an AE wave-detection portion 119*b* and an AE wave-detection region control portion 119*c*. The process in each circuit portion is the same as that according to the nineteenth embodiment except the digital signal process is used to obtain a similar effect to that according to the nineteenth embodiment.

Twenty First Embodiment

Figure 41A:
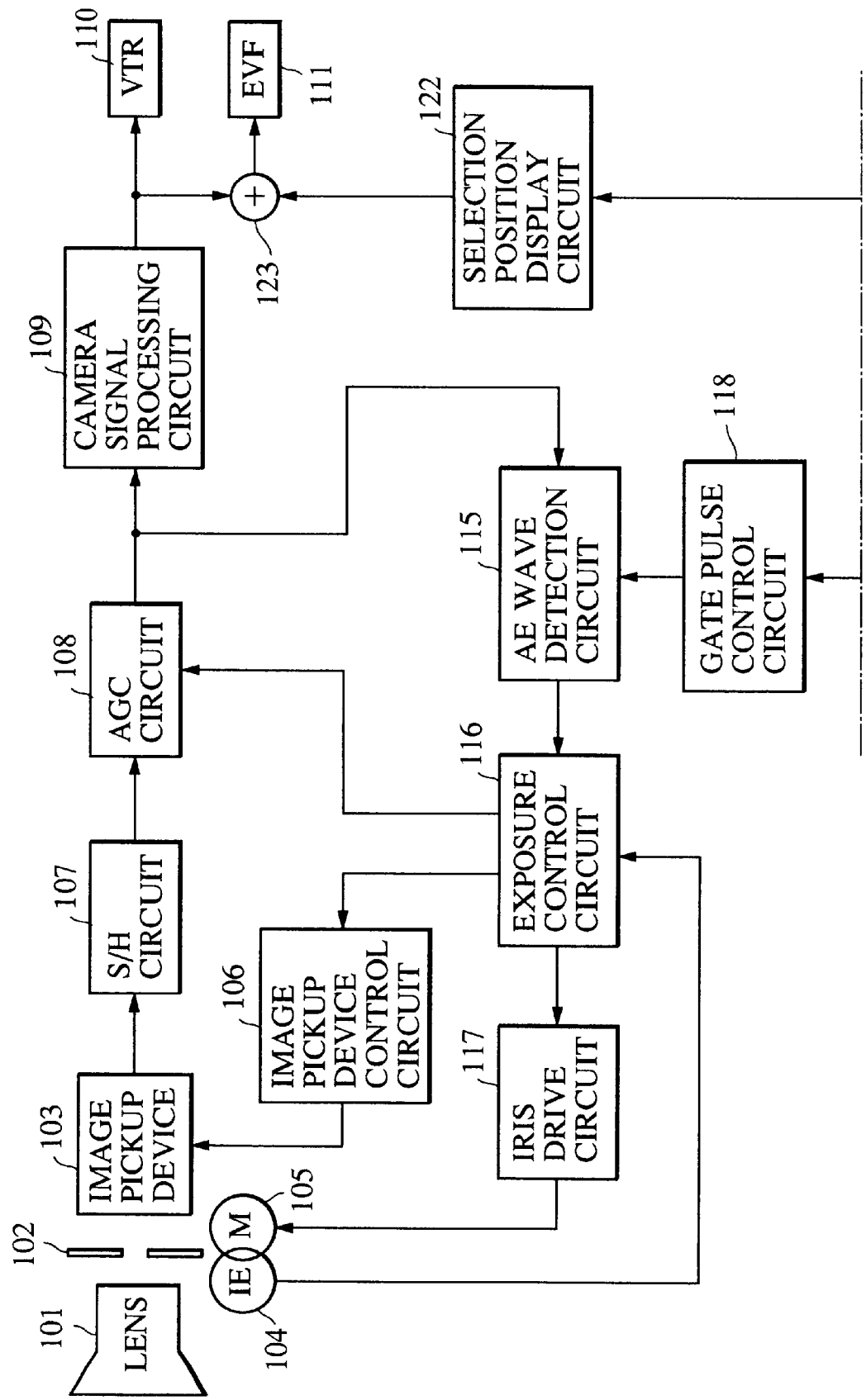
FIG. 41 is a block diagram showing the structure of a twentieth embodiment of the present invention.
Figure 42C:
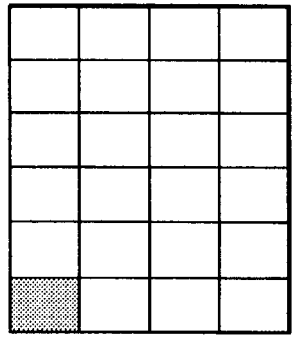
FIG. 42 is a structural view showing an image detection region for each photometry method.
Figure 42B:
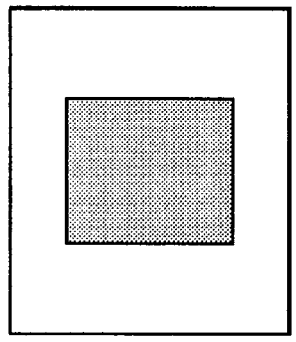
Figure 42A:
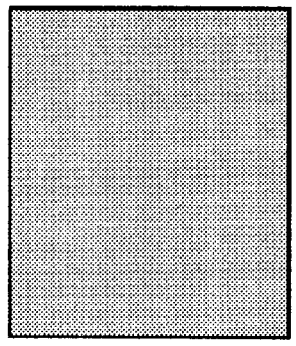
Figure 42E:
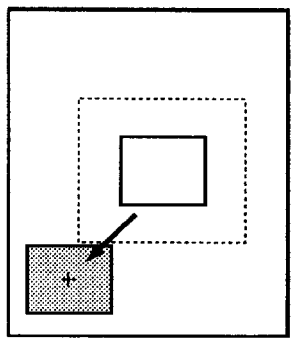
Figure 42D:
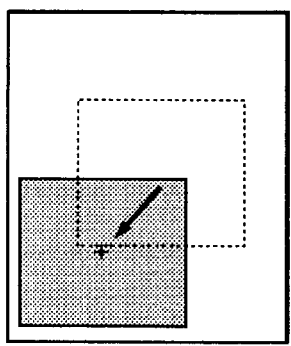

FIG. 41 is a block diagram showing the structure according to the twenty first embodiment of the present invention.

Although the basic structure is similar to that according to the eighteenth embodiment such that the analog signal processing circuit 109*a* shown in FIG. 37 is employed as the camera signal processing circuit 109, the digital signal processing circuit 109*b* may be employed as employed in the twentieth embodiment. The characteristic of the twenty first embodiment is that an external key input means 120 which is operated by a photographer and which serves as a two-dimensional position selection means is used to set the position of the image region to information about the position is used. A system control circuit 121 to which the position information is input is provided. The system control circuit 121 is composed of a key detection portion 121*a*, a selected position detection portion 121*b*, fixed-position data 121*c*, and a switch circuit 121*d*. A signal representing the detected position information from the selected position detection portion 121*b* is supplied to an adder 123 through a selection and display circuit 122 so as to be added to an image signal from the camera signal processing circuit 109 so as to be displayed on the electronic view finder 111.

As a result, the gate pulse is set to follow information about the detected position from the key input means 120 similar to the nineteenth and twentieth embodiments in which the interest-point position detection means of the electronic view finder 11 is used. Furthermore, the level, weighting ratio, response of the exposure control, and the parameter for the exposure control are made to be different between the following operation and non-following operation. Thus, the exposure of a subject aimed by a photographer can be optimally controlled.

The two-dimensional position selection means includes a joy stick, a track ball, a mouse, and a touch panel in it's category thereof with which the operation can be performed easily and the cost can be reduced.

As described above, according to this embodiment, the two-dimensional position selection means is provided which selects an image region intended by a photographer. Exposure control of the image region corresponding to the position information from the two-dimensional position selection means is performed. Therefore, the exposure of a main subject aimed by the photographer can be optimally controlled. Thus, an effect can be obtained in that an image intended by a photographer can be formed.

The interest-point position detection means for detecting the point-of-interest of a photographer on the frame of the electronic view finder is provided. The exposure control is performed in accordance with the position information. Therefore, the exposure of a main subject portion can be automatically performed only when the photographer observes the electronic view finder to see the main subject aimed by the photographer. As a result, the exposure of the main subject can be controlled optimally without interruption of the photographing operation. Thus, an effect can be obtained in that an image intended by a photographer can be formed.

Although the invention has been described in its preferred form with a certain degree of particularity, it is understood that the present disclosure of the preferred form can be changed in the details of construction and the combination and arrangement of parts may be resorted to without departing from the spirit and the scope of the invention as hereinafter claimed.

What is claimed is:

1. An image pickup apparatus comprising:
   monitor means for displaying an image signal obtained by image pickup means;
   position appointing means for appointing an arbitrary position on a display frame of said monitor means;
   detection means for detecting an error in appointment made by said position appointing means;
   image-signal fetching control means connected to receive position signals from said position appointing means and to extract an image signal in a region including the position appointed by said position appointing means, said image-signal fetching control means also being connected to receive error signals from said detection means and, in response to error signals being continued for a predetermined time duration, to extract the image signal in a predetermined fixed region in the display means regardless of the position appointed by said position appointing means; and
   adjustment means for adjusting image pickup conditions of said image pickup means in accordance with the image signal fetched by said image signal fetching control means.

2. An image pickup apparatus according to claim 1, wherein if said detection means has detected the error in appointment, then a frame indicating the predetermined region of the image signal is displayed, and if said detection means has detected normal operation, then a frame indicating the region including the position appointed by said position appointing means is displayed in such a manner that each of said frames is displayed on said monitor means together with the image signal obtained by said image pickup means.

3. An image pickup apparatus according to claim 1, wherein said adjustment means includes focal-point adjustment means that performs focal-point adjustment by using the image signal fetched by said image-signal fetching control means.

4. An image pickup apparatus according to claim 1, wherein said adjustment means includes photometry means that performs a photometry operation by using the image signal fetched by said image-signal fetching control means.

5. An image processing apparatus comprising:
   detection means for detecting a visual line of an operator in a display frame;
   region setting means for setting a region, in which a signal is processed, at a position of the visual line in said display frame detected by said detection means; and
   control means connected to receive error signals from said detecting means, said control means being responsive to error occurring durations exceeding a predetermined time period to fix the region in which the signal is processed, at a predetermined position in said frame regardless of the position set by said region setting means, said control means further being responsive to error signals which do not exceed said predetermined time period to fix the region at a position immediately before the error has occurred instead of at the position set by said region setting means.

6. An image processing apparatus according to claim 5, wherein if said line-of-sight position detection means has detected the error, then display indicating the region in which the signal is processed is performed on said display frame, and if said line-of-sight position detection means has detected normal operation, then display indicating the region in which the signal is processed, including the position of the line-of-sight detected by said line-of-sight position detection means is performed on said display frame.

7. An image processing apparatus according to claim 5 further comprising image pickup means, wherein said display frame displays an output image signal from said image pickup means.

8. An image processing apparatus according to claim 7 further comprising the focal-point adjustment means for performing a focal-point adjustment operation by using the image signal corresponding to the inside of said region in which the signal is processed.

9. An image processing apparatus according to claim 7 further comprising photometry means for performing a photometry operation by using the image signal corresponding to the inside of said region in which the signal is processed.

10. An image processing apparatus comprising:
    gate means for extracting an image signal corresponding to the inside of a predetermined region in a frame;
    appointing means for inputtting position setting information for appointing a set position of said predetermined region in said frame;
    position setting means that controls said gate means in accordance with an output from said appointing means to control the position of said predetermined region in said frame; and control means connected to receive signals indicating the occurrence of an error in the setting of the position of said predetermined region by said appointing means and, in response to an error occurring state continuing for less than a predetermined time, to maintain said predetermined region at a position immediately before said error occurs regardless of the set position appointed by said appointing means, said control means further being responsive to an error which continues for a time greater than said predetermined time to set said predetermined region at a predetermined fixed position regardless of the position appointed by said appointing means.

11. An image processing apparatus according to claim 10 further comprising image pickup means, wherein said gate means extracts from the image signals output from said image pickup means, an image signal corresponding to the inside of said predetermined region in an image pickup frame of said image pickup means.

12. An image processing apparatus according to claim 11 further comprising a monitor for monitoring said image pickup frame, wherein said appointing means is line-of-sight detection means for detecting the position of the line of sight of an operator in said monitor frame, and said position setting means sets said predetermined region at a position of the line of sight detected by said line-of-sight detection means.

13. An image processing apparatus according to claim 11, wherein said appointing means is a manual input device, such as a joy stick or a mouse.

14. An image processing apparatus according to claim 12, wherein said monitor is an electronic view finder.

15. An image processing apparatus according to claim 12 further comprising adjustment means that detects an image pickup state from image signals in said predetermined region extracted by said gate means to adjust the image pickup state in accordance with a result of the detection.

16. An image processing apparatus according to claim 15, wherein said adjustment means is focal-point adjustment means that detects a focal-point signal, which is changed in accordance with a state of a focal point from image signals in said predetermined region extracted by said gate means to adjust the state of the focal point in response to said focal-point signal.

17. An image processing apparatus according to claim 15, wherein said adjustment means is exposure adjustment means that detects a state of exposure from image signals in said predetermined region extracted by said gate means to adjust the state of exposure in accordance with the detected state of exposure.

18. An image processing apparatus comprising:

gate means for extracting an image signal corresponding to the inside of a predetermined region in a frame;

appointing means for inputting set position information for appointing a set position of said predetermined region in said frame;

position setting means that controls said appointing means to control the position of said predetermined region in said frame; and region control means connected to respond to errors in the operation of setting the position inputted by said appointing means and, in response to error occurring states continuing for greater than a predetermined period, to forcibly move said predetermined region to a predetermined fixed position in said frame regardless of the position input by said appointing means, said region control means also being responsive to error occurring states continuing for less than said predetermined period to keep said predetermined region at a position immediately before the error occurs regardless of at the position input by said appointing means.

19. An image processing apparatus according to claim 18, wherein said predetermined position is set in a central portion of said frame, and said region means moves said predetermined region to said predetermined position and enlarges said predetermined region.

20. An image processing apparatus according to claim 18 further comprising image pickup means, wherein said gate means extracts an image signal from image signals output from said image pickup means that corresponds to the inside of said predetermined region in an image pickup frame of said image pickup means.

21. An image processing apparatus according to claim 20 further comprising a monitor for monitoring said image pickup frame, wherein said appointing means is line-of-sight detection means for detecting a line-of-sight of an operator in said monitor frame, and said position setting means sets said predetermined region at a position of the line-of-sight detected by said line-of-sight detection means.

22. An image processing apparatus according to claim 20 further comprising adjustment means that detects an image pickup state from the image signal in said predetermined region extracted by said gate means to adjust said image pickup state in accordance with a result of the detection.

23. An image processing apparatus according to claim 22, wherein said adjustment means is focal-point adjustment means that detects a focal-point signal which is changed in accordance with a state of a focal point from image signals in said predetermined region extracted by said gate means to adjust the state of the focal point in response to said focal-point signal.

24. An image processing apparatus according to claim 22, wherein said adjustment means is exposure adjustment means that detects an exposure state from image signals in said predetermined region extracted by said gate means to adjust the exposure state in accordance with the detected exposure state.

25. An image-signal processing apparatus comprising:

gate means for extracting an image signal corresponding to the inside of a predetermined region in a frame;

appointing means for inputting set position information for appointing a set position of said predetermined region in said frame;

position setting means that controls said gate means in accordance with an output from said appointing means to control the position of said predetermined region in said frame; and position determining means connected to respond to errors which occur in the operation of setting the position of said predetermined region inputted by said appointing means and, in response to error occurring durations within a predetermined time period, to maintain said predetermined region in the position in which it is located immediately before said error occurred regardless of the position input by said appointing means, said position detecting means further being responsive to error occurring states continuing beyond said predetermined time period to forcibly move said predetermined region to a predetermined position in said rame regardless of the position input by said appointing means.

\* \* \* \* \*

UNITED STATES PATENT AND TRADEMARK OFFICE
CERTIFICATE OF CORRECTION

PATENT NO. : 6,388,707 B1
DATED : May 14, 2002
INVENTOR(S) : Hirofumi Suda

It is certified that error appears in the above-identified patent and that said Letters Patent is hereby corrected as shown below:

Drawings,
Sheet 2, FIG. 1B, "COMPESATING" (all occurrences) should read
-- COMPENSATING --.
Sheet 8, FIG. 6B, "COMPESATING" (all occurrences) should read
-- COMPENSATING --.
Sheet 12, FIG. 8B, "COMPESATING" (all occurrences) should read
-- COMPENSATING --.
Sheet 21, FIG. 14B, "COMPESATING" (all occurrences) should read
-- COMPENSATING --.
Sheet 26, FIG. 17B, "COMPESATING" (all occurrences) should read
-- COMPENSATING --.
Sheet 47, FIG. 32B, "COMPESATING" (all occurrences) should read
-- COMPENSATING --.
Sheet 49, FIG. 33B, "ERACHED" should read -- REACHED --; and "SIGTH" should read -- SIGHT --.
Sheet 51, FIG. 34B, "COMPESATING" (all occurrences) should read
-- COMPENSATING --.

Column 1,
Line 24, "quality. Since" should read -- quality. ¶ Since --;
Line 29, "is" (second occurrence) should be deleted.

Column 7,
Line 23, "Figure 6A," should read -- Figure 1A, --.

Column 10,
Line 12, "method,(called" should read -- method, (called --.

Column 14,
Line 37, "is" should be deleted;
Line 59, "set. If" should read -- set. ¶ If --.

Column 18,
Line 35, "in" should be deleted.

Column 19,
Line 17, "input-positionlimiting" should read -- input-position-limiting --;
Line 18, "input-positionlimiting" should read -- input-position-limiting --.

UNITED STATES PATENT AND TRADEMARK OFFICE
CERTIFICATE OF CORRECTION

PATENT NO. : 6,388,707 B1
DATED : May 14, 2002
INVENTOR(S) : Hirofumi Suda

It is certified that error appears in the above-identified patent and that said Letters Patent is hereby corrected as shown below:

Column 24,
Line 43, "limited" should read -- limited to --.

Column 28,
Line 48, "Ncreen" should read -- screen --;
Line 59, "linof-sight" should read -- line-of-sight --.

Column 30,
Line 35, "points" should read -- point is --.

Column 31,
Line 44, "1"" should read -- "1" --.

Column 33,
Line 44, "line-ofsight" should read -- line-of-sight --.

Column 42,
Line 64, "circuit 77. The" should read -- circuit. ¶ The --.

Column 44,
Line 19, "operatic" should read -- operation --;
Line 45, "ofsight" should read -- of-sight --.

Column 45,
Line 41, "instable" should read -- unstable --;
Line 54, "line-ofsight" should read -- line-of-sight --.

Column 50,
Line 43, "lineof-sight" should read -- line-of-sight --;
Line 55, "nonline-sight" should read -- non-line-sight --.

Column 51,
Line 47, "nonline-sight" should read -- non-line-sight --.

Column 58,
Line 19, "twodi-" should read -- two- --;
Line 20, "mensional" should read -- dimensional --;
Line 63, "point-ofinterest" should read -- point-of-interest --.

UNITED STATES PATENT AND TRADEMARK OFFICE
CERTIFICATE OF CORRECTION

PATENT NO. : 6,388,707 B1
DATED : May 14, 2002
INVENTOR(S) : Hirofumi Suda

It is certified that error appears in the above-identified patent and that said Letters Patent is hereby corrected as shown below:

Column 60,
Line 46, "point-ofinterest" should read -- point-of-interest --;
Line 58, "point-ofinterest" should read -- point-of-interest --.

Column 61,
Line 10, "centerweighted" should read -- center-weighted --;
Line 12, "Fig. 42(e). As" should read -- Fig. 42(e). ¶ As --;
Line 34, "point-ofinterest" should read -- point-of-interest --;
Line 50, "point-ofinterest" should read -- point-of-interest --.

Column 62,
Line 4, "pointof-interest" should read -- point-of-interest --;
Line 12, "point-ofinterest" should read -- point-of-interest --.

Column 65,
Line 24, "line of sight" should read -- line-of-sight --;
Line 27, "line of sight" should read -- line-of-sight --.

Column 66,
Line 6, "at" should be deleted;
Line 8, "region" should read -- region control --;
Line 64, "rame" should read -- frame --.

Signed and Sealed this

Twenty-ninth Day of October, 2002

*Attest:*

JAMES E. ROGAN
*Attesting Officer*  *Director of the United States Patent and Trademark Office*